(12) United States Patent
Raleigh et al.

(10) Patent No.: US 11,750,477 B2
(45) Date of Patent: *Sep. 5, 2023

(54) ADAPTIVE AMBIENT SERVICES

(71) Applicant: Headwater Research LLC, Tyler, TX (US)

(72) Inventors: Gregory G. Raleigh, Woodside, CA (US); Rob Rightmyer, Ithaca, NY (US); Vladislav Kudelin, Mountain View, CA (US)

(73) Assignee: HEADWATER RESEARCH LLC, Tyler, TX (US)

( * ) Notice: Subject to any disclaimer, the term of this patent is extended or adjusted under 35 U.S.C. 154(b) by 257 days.

This patent is subject to a terminal disclaimer.

(21) Appl. No.: 17/106,648

(22) Filed: Nov. 30, 2020

(65) Prior Publication Data

US 2021/0152441 A1    May 20, 2021

Related U.S. Application Data

(63) Continuation of application No. 16/272,198, filed on Feb. 11, 2019, now Pat. No. 10,855,559, which is a
(Continued)

(51) Int. Cl.
*H04L 41/5041* (2022.01)
*H04W 4/50* (2018.01)
(Continued)

(52) U.S. Cl.
CPC ..... *H04L 41/5041* (2013.01); *G06Q 30/0601* (2013.01); *G06Q 50/10* (2013.01);
(Continued)

(58) Field of Classification Search
CPC ... H04L 47/803; H04L 67/28; H04L 41/0806; H04L 45/306; H04L 69/24;
(Continued)

(56) References Cited

U.S. PATENT DOCUMENTS

| 5,131,020 A | 7/1992 | Liebesny et al. |
| 5,283,904 A | 2/1994 | Carson et al. |

(Continued)

FOREIGN PATENT DOCUMENTS

| CA | 2688553 A1 | 12/2008 |
| CN | 1310401 A | 8/2001 |

(Continued)

OTHER PUBLICATIONS

Rivadeneyra et al., "A communication architecture to access data services through GSM," San Sebastian, Spain, 1998.
(Continued)

*Primary Examiner* — Andrew Joseph Rudy
(74) *Attorney, Agent, or Firm* — Farjami & Farjami LLP

(57) ABSTRACT

Adaptive ambient services are provided. In some embodiments, an adaptive ambient service includes providing an ambient service profile. In some embodiments, an ambient service includes implementing an ambient service profile for assisting control of the communications device use of an ambient service on a wireless network, in which the ambient service profile includes a plurality of service policy settings, and in which the ambient service profile is associated with an ambient service plan that provides for initial access to the ambient service with limited service capabilities prior to activation of a new service plan; monitoring use of the ambient service based on the ambient service profile; and adapting the ambient service profile based on the monitored use of the ambient service.

20 Claims, 7 Drawing Sheets

Related U.S. Application Data continuation of application No. 15/400,768, filed on Jan. 6, 2017, now Pat. No. 10,237,146, which is a continuation of application No. 14/612,073, filed on Feb. 2, 2015, now Pat. No. 9,544,397, which is a continuation of application No. 14/256,593, filed on Apr. 18, 2014, now Pat. No. 8,948,025, which is a continuation of application No. 13/588,965, filed on Aug. 17, 2012, now Pat. No. 8,868,455, which is a continuation of application No. 12/695,020, filed on Jan. 27, 2010, now Pat. No. 8,406,748, which is a continuation-in-part of application No. 12/380,780, filed on Mar. 2, 2009, now Pat. No. 8,839,388.

(60) Provisional application No. 61/237,753, filed on Aug. 28, 2009, provisional application No. 61/275,208, filed on Aug. 25, 2009, provisional application No. 61/207,739, filed on Feb. 13, 2009, provisional application No. 61/207,393, filed on Feb. 10, 2009, provisional application No. 61/206,944, filed on Feb. 4, 2009, provisional application No. 61/206,354, filed on Jan. 28, 2009.

(51) Int. Cl.

| | | |
|---|---|---|
| *G06Q 30/0601* | (2023.01) | |
| *G06Q 50/10* | (2012.01) | |
| *H04L 41/0893* | (2022.01) | |
| *H04L 67/306* | (2022.01) | |
| *H04L 67/04* | (2022.01) | |
| *H04L 67/53* | (2022.01) | |
| *H04L 67/56* | (2022.01) | |
| *H04L 67/50* | (2022.01) | |
| *H04W 72/29* | (2023.01) | |
| *H04W 72/53* | (2023.01) | |
| *H04L 41/0806* | (2022.01) | |
| *H04L 45/302* | (2022.01) | |
| *H04W 8/24* | (2009.01) | |
| *H04L 67/00* | (2022.01) | |
| *H04W 8/18* | (2009.01) | |
| *H04W 48/14* | (2009.01) | |
| *H04L 47/80* | (2022.01) | |
| *H04L 47/70* | (2022.01) | |
| *H04L 69/24* | (2022.01) | |
| *H04L 41/5054* | (2022.01) | |
| *H04W 80/04* | (2009.01) | |

(52) U.S. Cl.
CPC ...... *H04L 41/0806* (2013.01); *H04L 41/0893* (2013.01); *H04L 41/5045* (2013.01); *H04L 45/306* (2013.01); *H04L 47/803* (2013.01); *H04L 47/824* (2013.01); *H04L 67/04* (2013.01); *H04L 67/306* (2013.01); *H04L 67/34* (2013.01); *H04L 67/53* (2022.05); *H04L 67/535* (2022.05); *H04L 67/56* (2022.05); *H04L 69/24* (2013.01); *H04W 4/50* (2018.02); *H04W 8/18* (2013.01); *H04W 8/24* (2013.01); *H04W 48/14* (2013.01); *H04W 72/29* (2023.01); *H04W 72/53* (2023.01); *H04L 41/5054* (2013.01); *H04W 80/04* (2013.01)

(58) Field of Classification Search
CPC ..... H04L 41/0893; H04L 67/34; H04L 67/22; H04L 63/105; H04L 67/30; H04L 67/04; H04L 41/5054; H04L 67/20; H04L 47/824; H04W 4/244; H04W 4/50; H04W 72/0433; H04W 8/24; H04W 80/04; H04W 8/18; H04W 72/0493; H04W 48/14; G06Q 50/10; G06Q 30/0601
USPC .................................... 705/28; 709/216–225
See application file for complete search history.

(56) References Cited

U.S. PATENT DOCUMENTS

| | | | |
|---|---|---|---|
| 5,325,532 | A | 6/1994 | Crosswy et al. |
| 5,572,528 | A | 11/1996 | Shuen |
| 5,577,100 | A | 11/1996 | McGregor et al. |
| 5,594,777 | A | 1/1997 | Makkonen et al. |
| 5,617,539 | A | 4/1997 | Ludwig et al. |
| 5,630,159 | A | 5/1997 | Zancho |
| 5,633,484 | A | 5/1997 | Zancho et al. |
| 5,633,868 | A | 5/1997 | Baldwin et al. |
| 5,754,953 | A | 5/1998 | Briancon et al. |
| 5,774,532 | A | 6/1998 | Gottlieb et al. |
| 5,794,142 | A | 8/1998 | Vanttila et al. |
| 5,814,798 | A | 9/1998 | Zancho |
| 5,889,477 | A | 3/1999 | Fastenrath |
| 5,892,900 | A | 4/1999 | Ginter et al. |
| 5,903,845 | A | 5/1999 | Buhrmann et al. |
| 5,915,008 | A | 6/1999 | Dulman |
| 5,915,226 | A | 6/1999 | Martineau |
| 5,933,778 | A | 8/1999 | Buhrmann et al. |
| 5,940,472 | A | 8/1999 | Newman et al. |
| 5,974,439 | A | 10/1999 | Bollella |
| 5,983,270 | A | 11/1999 | Abraham et al. |
| 6,035,281 | A | 3/2000 | Crosskey et al. |
| 6,038,452 | A | 3/2000 | Strawczynski et al. |
| 6,038,540 | A | 3/2000 | Krist et al. |
| 6,047,268 | A | 4/2000 | Bartoli et al. |
| 6,058,434 | A | 5/2000 | Wilt et al. |
| 6,061,571 | A | 5/2000 | Tamura |
| 6,064,878 | A | 5/2000 | Denker et al. |
| 6,078,953 | A | 6/2000 | Vaid et al. |
| 6,081,591 | A | 6/2000 | Skoog |
| 6,098,878 | A | 8/2000 | Dent et al. |
| 6,104,700 | A | 8/2000 | Haddock et al. |
| 6,115,823 | A | 9/2000 | Velasco et al. |
| 6,119,933 | A | 9/2000 | Wong et al. |
| 6,125,391 | A | 9/2000 | Meltzer et al. |
| 6,141,565 | A | 10/2000 | Feuerstein et al. |
| 6,141,686 | A | 10/2000 | Jackowski et al. |
| 6,148,336 | A | 11/2000 | Thomas et al. |
| 6,154,738 | A | 11/2000 | Call |
| 6,157,636 | A | 12/2000 | Voit et al. |
| 6,185,576 | B1 | 2/2001 | McIntosh |
| 6,198,915 | B1 | 3/2001 | McGregor et al. |
| 6,219,786 | B1 | 4/2001 | Cunningham et al. |
| 6,226,277 | B1 | 5/2001 | Chuah |
| 6,246,870 | B1 | 6/2001 | Dent et al. |
| 6,263,055 | B1 | 7/2001 | Garland et al. |
| 6,292,828 | B1 | 9/2001 | Williams |
| 6,317,584 | B1 | 11/2001 | Abu-Amara et al. |
| 6,370,139 | B2 | 4/2002 | Redmond |
| 6,381,316 | B2 | 4/2002 | Joyce et al. |
| 6,393,014 | B1 | 5/2002 | Daly et al. |
| 6,397,259 | B1 | 5/2002 | Lincke et al. |
| 6,401,113 | B2 | 6/2002 | Lazaridis et al. |
| 6,418,147 | B1 | 7/2002 | Wiedeman |
| 6,438,575 | B1 | 8/2002 | Khan et al. |
| 6,445,777 | B1 | 9/2002 | Clark |
| 6,449,479 | B1 | 9/2002 | Sanchez |
| 6,466,984 | B1 | 10/2002 | Naveh et al. |
| 6,477,670 | B1 | 11/2002 | Ahmadvand |
| 6,502,131 | B1 | 12/2002 | Vaid et al. |
| 6,505,114 | B2 | 1/2003 | Luciani |
| 6,510,152 | B1 | 1/2003 | Gerszberg et al. |
| 6,522,629 | B1 | 2/2003 | Anderson, Sr. |
| 6,532,235 | B1 | 3/2003 | Benson et al. |
| 6,532,579 | B2 | 3/2003 | Sato et al. |
| 6,535,855 | B1 | 3/2003 | Cahill et al. |
| 6,535,949 | B1 | 3/2003 | Parker |
| 6,539,082 | B1 | 3/2003 | Lowe et al. |

(56) References Cited

U.S. PATENT DOCUMENTS

| | | |
|---|---|---|
| 6,542,500 B1 | 4/2003 | Gerszberg et al. |
| 6,542,992 B1 | 4/2003 | Peirce et al. |
| 6,546,016 B1 | 4/2003 | Gerszberg et al. |
| 6,563,806 B1 | 5/2003 | Yano et al. |
| 6,570,974 B1 | 5/2003 | Gerszberg et al. |
| 6,574,321 B1 | 6/2003 | Cox et al. |
| 6,574,465 B2 | 6/2003 | Marsh et al. |
| 6,578,076 B1 | 6/2003 | Putzolu |
| 6,581,092 B1 | 6/2003 | Motoyama |
| 6,591,098 B1 | 7/2003 | Shieh et al. |
| 6,598,034 B1 | 7/2003 | Kloth |
| 6,601,040 B1 | 7/2003 | Kolls |
| 6,603,969 B1 | 8/2003 | Vuoristo et al. |
| 6,603,975 B1 | 8/2003 | Inouchi et al. |
| 6,606,744 B1 | 8/2003 | Mikurak |
| 6,615,034 B1 | 9/2003 | Alloune et al. |
| 6,628,934 B2 | 9/2003 | Rosenberg et al. |
| 6,631,122 B1 | 10/2003 | Arunachalam et al. |
| 6,636,721 B2 | 10/2003 | Threadgill et al. |
| 6,639,975 B1 | 10/2003 | O'Neal et al. |
| 6,640,097 B2 | 10/2003 | Corrigan et al. |
| 6,640,334 B1 | 10/2003 | Rasmussen |
| 6,650,887 B2 | 11/2003 | McGregor et al. |
| 6,651,101 B1 | 11/2003 | Gai et al. |
| 6,654,786 B1 | 11/2003 | Fox et al. |
| 6,654,814 B1 | 11/2003 | Britton et al. |
| 6,658,254 B1 | 12/2003 | Purdy et al. |
| 6,662,014 B1 | 12/2003 | Walsh |
| 6,678,516 B2 | 1/2004 | Nordman et al. |
| 6,683,853 B1 | 1/2004 | Kannas et al. |
| 6,684,244 B1 | 1/2004 | Goldman et al. |
| 6,690,918 B2 | 2/2004 | Evans et al. |
| 6,694,362 B1 | 2/2004 | Secor et al. |
| 6,697,821 B2 | 2/2004 | Ziff et al. |
| 6,725,031 B2 | 4/2004 | Watler et al. |
| 6,725,256 B1 | 4/2004 | Albal et al. |
| 6,732,176 B1 | 5/2004 | Stewart et al. |
| 6,735,206 B1 | 5/2004 | Oki et al. |
| 6,748,195 B1 | 6/2004 | Phillips |
| 6,748,437 B1 | 6/2004 | Mankude et al. |
| 6,751,296 B1 | 6/2004 | Albal et al. |
| 6,754,470 B2 | 6/2004 | Hendrickson et al. |
| 6,757,717 B1 | 6/2004 | Goldstein |
| 6,760,417 B1 | 7/2004 | Wallenius |
| 6,763,000 B1 | 7/2004 | Walsh |
| 6,763,226 B1 | 7/2004 | McZeal, Jr. |
| 6,765,864 B1 | 7/2004 | Natarajan et al. |
| 6,765,925 B1 | 7/2004 | Sawyer et al. |
| 6,782,412 B2 | 8/2004 | Brophy et al. |
| 6,785,889 B1 | 8/2004 | Williams |
| 6,792,461 B1 | 9/2004 | Hericourt |
| 6,829,596 B1 | 12/2004 | Frazee |
| 6,829,696 B1 | 12/2004 | Balmer et al. |
| 6,839,340 B1 | 1/2005 | Voit et al. |
| 6,842,628 B1 | 1/2005 | Arnold et al. |
| 6,873,988 B2 | 3/2005 | Herrmann et al. |
| 6,876,653 B2 | 4/2005 | Ambe et al. |
| 6,879,825 B1 | 4/2005 | Daly |
| 6,882,718 B1 | 4/2005 | Smith |
| 6,885,997 B1 | 4/2005 | Roberts |
| 6,901,440 B1 | 5/2005 | Bimm et al. |
| 6,920,455 B1 | 7/2005 | Weschler |
| 6,922,562 B2 | 7/2005 | Ward et al. |
| 6,928,280 B1 | 8/2005 | Xanthos et al. |
| 6,934,249 B1 | 8/2005 | Bertin et al. |
| 6,934,751 B2 | 8/2005 | Jayapalan et al. |
| 6,947,723 B1 | 9/2005 | Gumani et al. |
| 6,947,985 B2 | 9/2005 | Hegli et al. |
| 6,952,428 B1 | 10/2005 | Necka et al. |
| 6,957,067 B1 | 10/2005 | Iyer et al. |
| 6,959,202 B2 | 10/2005 | Heinonen et al. |
| 6,959,393 B2 | 10/2005 | Hollis et al. |
| 6,965,667 B2 | 11/2005 | Frabandt et al. |
| 6,965,872 B1 | 11/2005 | Grdina |
| 6,967,958 B2 | 11/2005 | Ono et al. |
| 6,970,692 B2 | 11/2005 | Tysor |
| 6,970,927 B1 | 11/2005 | Stewart et al. |
| 6,982,733 B1 | 1/2006 | McNally et al. |
| 6,983,370 B2 | 1/2006 | Eaton et al. |
| 6,996,062 B1 | 2/2006 | Freed et al. |
| 6,996,076 B1 | 2/2006 | Forbes et al. |
| 6,996,393 B2 | 2/2006 | Pyhalammi et al. |
| 6,998,985 B2 | 2/2006 | Reisman et al. |
| 7,002,920 B1 | 2/2006 | Ayyagari et al. |
| 7,007,295 B1 | 2/2006 | Rose et al. |
| 7,013,469 B2 | 3/2006 | Smith et al. |
| 7,017,189 B1 | 3/2006 | DeMello et al. |
| 7,024,200 B2 | 4/2006 | McKenna et al. |
| 7,024,460 B2 | 4/2006 | Koopmas et al. |
| 7,027,055 B2 | 4/2006 | Anderson et al. |
| 7,027,408 B2 | 4/2006 | Nabkel et al. |
| 7,031,733 B2 | 4/2006 | Alminana et al. |
| 7,032,072 B1 | 4/2006 | Quinn et al. |
| 7,039,027 B2 | 5/2006 | Bridgelall |
| 7,039,037 B2 | 5/2006 | Wang et al. |
| 7,039,403 B2 | 5/2006 | Wong |
| 7,039,713 B1 | 5/2006 | Van Gunter et al. |
| 7,042,988 B2 | 5/2006 | Juitt et al. |
| 7,043,225 B1 | 5/2006 | Patel et al. |
| 7,043,226 B2 | 5/2006 | Yamauchi |
| 7,043,268 B2 | 5/2006 | Yukie et al. |
| 7,047,276 B2 | 5/2006 | Liu et al. |
| 7,058,022 B1 | 6/2006 | Carolan et al. |
| 7,058,968 B2 | 6/2006 | Rowland et al. |
| 7,068,600 B2 | 6/2006 | Cain |
| 7,069,248 B2 | 6/2006 | Huber |
| 7,082,422 B1 | 7/2006 | Zirngibl et al. |
| 7,084,775 B1 | 8/2006 | Smith |
| 7,092,696 B1 | 8/2006 | Hosain et al. |
| 7,095,754 B2 | 8/2006 | Benveniste |
| 7,102,620 B2 | 9/2006 | Harries et al. |
| 7,110,753 B2 | 9/2006 | Campen |
| 7,113,780 B2 | 9/2006 | Mckenna et al. |
| 7,113,997 B2 | 9/2006 | Jayapalan et al. |
| 7,120,133 B1 | 10/2006 | Joo et al. |
| 7,133,386 B2 | 11/2006 | Holur et al. |
| 7,133,695 B2 | 11/2006 | Beyda |
| 7,136,361 B2 | 11/2006 | Benveniste |
| 7,139,569 B2 | 11/2006 | Kato |
| 7,142,876 B2 | 11/2006 | Trossen et al. |
| 7,149,229 B1 | 12/2006 | Leung |
| 7,149,521 B2 | 12/2006 | Sundar et al. |
| 7,151,764 B1 | 12/2006 | Heinonen et al. |
| 7,158,792 B1 | 1/2007 | Cook et al. |
| 7,162,237 B1 | 1/2007 | Silver et al. |
| 7,165,040 B2 | 1/2007 | Ehrman et al. |
| 7,167,078 B2 | 1/2007 | Pourchot |
| 7,174,156 B1 | 2/2007 | Mangal |
| 7,174,174 B2 | 2/2007 | Boris et al. |
| 7,177,919 B1 | 2/2007 | Truong et al. |
| 7,180,855 B1 | 2/2007 | Lin |
| 7,181,017 B1 | 2/2007 | Nagel et al. |
| 7,191,248 B2 | 3/2007 | Chattopadhyay et al. |
| 7,197,321 B2 | 3/2007 | Erskine et al. |
| 7,200,112 B2 | 4/2007 | Sundar et al. |
| 7,200,551 B1 | 4/2007 | Senez |
| 7,203,169 B1 | 4/2007 | Okholm et al. |
| 7,203,721 B1 | 4/2007 | Ben-Efraim et al. |
| 7,203,752 B2 | 4/2007 | Rice et al. |
| 7,212,491 B2 | 5/2007 | Koga |
| 7,219,123 B1 | 5/2007 | Fiechter et al. |
| 7,222,190 B2 | 5/2007 | Klinker et al. |
| 7,222,304 B2 | 5/2007 | Beaton et al. |
| 7,224,968 B2 | 5/2007 | Dobson et al. |
| 7,228,354 B2 | 6/2007 | Chambliss et al. |
| 7,236,780 B2 | 6/2007 | Benco |
| 7,242,668 B2 | 7/2007 | Kan et al. |
| 7,242,920 B2 | 7/2007 | Morris |
| 7,245,901 B2 | 7/2007 | McGregor et al. |
| 7,248,570 B2 | 7/2007 | Bahl et al. |
| 7,251,218 B2 | 7/2007 | Jorgensen |
| 7,260,382 B1 | 8/2007 | Lamb et al. |
| 7,266,371 B1 | 9/2007 | Amin et al. |
| 7,269,157 B2 | 9/2007 | Klinker et al. |

(56) References Cited

U.S. PATENT DOCUMENTS

| | | |
|---|---|---|
| 7,271,765 B2 | 9/2007 | Stilp et al. |
| 7,272,660 B1 | 9/2007 | Powers et al. |
| 7,280,816 B2 | 10/2007 | Fratti et al. |
| 7,280,818 B2 | 10/2007 | Clayton |
| 7,283,561 B1 | 10/2007 | Picher-Dempsey |
| 7,283,963 B1 | 10/2007 | Fitzpatrick et al. |
| 7,286,834 B2 | 10/2007 | Walter |
| 7,286,848 B2 | 10/2007 | Vireday et al. |
| 7,289,489 B1 | 10/2007 | Kung et al. |
| 7,290,283 B2 | 10/2007 | Copeland, III |
| 7,310,424 B2 | 12/2007 | Gehring et al. |
| 7,313,237 B2 | 12/2007 | Bahl et al. |
| 7,315,892 B2 | 1/2008 | Freimuth et al. |
| 7,317,699 B2 | 1/2008 | Godfrey et al. |
| 7,318,050 B1 | 1/2008 | Musgrave |
| 7,318,111 B2 | 1/2008 | Zhao |
| 7,320,029 B2 | 1/2008 | Rinne et al. |
| 7,322,044 B2 | 1/2008 | Hrastar |
| 7,324,447 B1 | 1/2008 | Morford |
| 7,325,037 B2 | 1/2008 | Lawson |
| 7,336,960 B2 | 2/2008 | Zavalkovsky et al. |
| 7,340,772 B2 | 3/2008 | Panasyuk et al. |
| 7,346,410 B2 | 3/2008 | Uchiyama |
| 7,349,695 B2 | 3/2008 | Oommen et al. |
| 7,353,533 B2 | 4/2008 | Wright et al. |
| 7,356,011 B1 | 4/2008 | Waters et al. |
| 7,356,337 B2 | 4/2008 | Florence |
| 7,366,497 B2 | 4/2008 | Nagata |
| 7,366,654 B2 | 4/2008 | Moore |
| 7,366,934 B1 | 4/2008 | Narayan et al. |
| 7,369,848 B2 | 5/2008 | Jiang |
| 7,369,856 B2 | 5/2008 | Ovadia |
| 7,373,136 B2 | 5/2008 | Watler et al. |
| 7,373,179 B2 | 5/2008 | Stine et al. |
| 7,379,731 B2 | 5/2008 | Natsuno et al. |
| 7,388,950 B2 | 6/2008 | Elsey et al. |
| 7,389,412 B2 | 6/2008 | Sharma et al. |
| 7,391,724 B2 | 6/2008 | Makoski et al. |
| 7,395,056 B2 | 7/2008 | Petermann |
| 7,395,244 B1 | 7/2008 | Kingsford |
| 7,401,338 B1 | 7/2008 | Bowen et al. |
| 7,403,763 B2 | 7/2008 | Maes |
| 7,409,447 B1 | 8/2008 | Assadzadeh |
| 7,409,569 B2 | 8/2008 | Illowsky et al. |
| 7,411,930 B2 | 8/2008 | Montojo et al. |
| 7,418,253 B2 | 8/2008 | Kavanah |
| 7,418,257 B2 | 8/2008 | Kim |
| 7,421,004 B2 | 9/2008 | Feher |
| 7,423,971 B1 | 9/2008 | Mohaban et al. |
| 7,428,750 B1 | 9/2008 | Dunn et al. |
| 7,433,362 B2 | 10/2008 | Mallya et al. |
| 7,436,816 B2 | 10/2008 | Mehta et al. |
| 7,440,433 B2 | 10/2008 | Rink et al. |
| 7,444,669 B1 | 10/2008 | Bahl et al. |
| 7,450,591 B2 | 11/2008 | Korling et al. |
| 7,450,927 B1 | 11/2008 | Creswell et al. |
| 7,454,191 B2 | 11/2008 | Dawson et al. |
| 7,457,265 B2 | 11/2008 | Julka et al. |
| 7,457,870 B1 | 11/2008 | Lownsbrough et al. |
| 7,460,837 B2 | 12/2008 | Diener |
| 7,466,652 B2 | 12/2008 | Lau et al. |
| 7,467,160 B2 | 12/2008 | McIntyre |
| 7,472,189 B2 | 12/2008 | Mallya et al. |
| 7,478,420 B2 | 1/2009 | Wright et al. |
| 7,486,185 B2 | 2/2009 | Culpepper et al. |
| 7,486,658 B2 | 2/2009 | Kumar |
| 7,493,659 B1 | 2/2009 | Wu et al. |
| 7,496,652 B2 | 2/2009 | Pezzutti |
| 7,499,438 B2 | 3/2009 | Hinman et al. |
| 7,499,537 B2 | 3/2009 | Elsey et al. |
| 7,502,672 B1 | 3/2009 | Kolls |
| 7,505,756 B2 | 3/2009 | Bahl |
| 7,505,795 B1 | 3/2009 | Lim et al. |
| 7,508,799 B2 | 3/2009 | Sumner et al. |
| 7,512,128 B2 | 3/2009 | DiMambro et al. |
| 7,512,131 B2 | 3/2009 | Svensson et al. |
| 7,515,608 B2 | 4/2009 | Yuan et al. |
| 7,515,926 B2 | 4/2009 | Bu et al. |
| 7,516,219 B2 | 4/2009 | Moghaddam et al. |
| 7,522,549 B2 | 4/2009 | Karaoguz et al. |
| 7,522,576 B2 | 4/2009 | Du et al. |
| 7,526,541 B2 | 4/2009 | Roese et al. |
| 7,529,204 B2 | 5/2009 | Bourlas et al. |
| 7,535,880 B1 | 5/2009 | Hinman et al. |
| 7,536,695 B2 | 5/2009 | Alam et al. |
| 7,539,132 B2 | 5/2009 | Werner et al. |
| 7,539,862 B2 | 5/2009 | Edgett et al. |
| 7,540,408 B2 | 6/2009 | Levine et al. |
| 7,545,782 B2 | 6/2009 | Rayment et al. |
| 7,546,460 B2 | 6/2009 | Maes |
| 7,546,629 B2 | 6/2009 | Albert et al. |
| 7,548,875 B2 | 6/2009 | Mikkelsen et al. |
| 7,548,976 B2 | 6/2009 | Bahl et al. |
| 7,551,921 B2 | 6/2009 | Petermann |
| 7,551,922 B2 | 6/2009 | Roskowski et al. |
| 7,554,983 B1 | 6/2009 | Muppala |
| 7,555,757 B2 | 6/2009 | Smith et al. |
| 7,561,899 B2 | 7/2009 | Lee |
| 7,562,213 B1 | 7/2009 | Timms |
| 7,564,799 B2 | 7/2009 | Holland et al. |
| 7,565,141 B2 | 7/2009 | Macaluso |
| 7,574,509 B2 | 8/2009 | Nixon et al. |
| 7,574,731 B2 | 8/2009 | Fascenda |
| 7,577,431 B2 | 8/2009 | Jiang |
| 7,580,356 B1 | 8/2009 | Mishra et al. |
| 7,580,857 B2 | 8/2009 | VanFleet et al. |
| 7,583,964 B2 | 9/2009 | Wong |
| 7,584,298 B2 | 9/2009 | Klinker et al. |
| 7,585,217 B2 | 9/2009 | Lutnick et al. |
| 7,586,871 B2 | 9/2009 | Hamilton et al. |
| 7,593,417 B2 | 9/2009 | Wang et al. |
| 7,593,730 B2 | 9/2009 | Khandelwal et al. |
| 7,596,373 B2 | 9/2009 | Mcgregor et al. |
| 7,599,288 B2 | 10/2009 | Cole et al. |
| 7,599,714 B2 | 10/2009 | Kuzminskiy |
| 7,602,746 B2 | 10/2009 | Calhoun et al. |
| 7,606,918 B2 | 10/2009 | Holzman et al. |
| 7,607,041 B2 | 10/2009 | Kraemer et al. |
| 7,609,650 B2 | 10/2009 | Roskowski et al. |
| 7,609,700 B1 | 10/2009 | Ying et al. |
| 7,610,047 B2 | 10/2009 | Hicks, III et al. |
| 7,610,057 B2 | 10/2009 | Bahl et al. |
| 7,610,328 B2 | 10/2009 | Haase et al. |
| 7,610,396 B2 | 10/2009 | Taglienti et al. |
| 7,614,051 B2 | 11/2009 | Glaum et al. |
| 7,616,962 B2 | 11/2009 | Oswal et al. |
| 7,617,516 B2 | 11/2009 | Huslak et al. |
| 7,620,041 B2 | 11/2009 | Dunn et al. |
| 7,620,065 B2 | 11/2009 | Falardeau |
| 7,620,162 B2 | 11/2009 | Aaron et al. |
| 7,620,383 B2 | 11/2009 | Taglienti et al. |
| 7,627,314 B2 | 12/2009 | Carlson et al. |
| 7,627,600 B2 | 12/2009 | Citron et al. |
| 7,627,767 B2 | 12/2009 | Sherman et al. |
| 7,627,872 B2 | 12/2009 | Hebeler et al. |
| 7,633,438 B2 | 12/2009 | Tysowski |
| 7,634,388 B2 | 12/2009 | Archer et al. |
| 7,636,574 B2 | 12/2009 | Poosala |
| 7,636,626 B2 | 12/2009 | Oesterling et al. |
| 7,643,411 B2 | 1/2010 | Andreasen et al. |
| 7,644,151 B2 | 1/2010 | Jerrim et al. |
| 7,644,267 B2 | 1/2010 | Ylikoski et al. |
| 7,644,414 B2 | 1/2010 | Smith et al. |
| 7,647,047 B2 | 1/2010 | Moghaddam et al. |
| 7,650,137 B2 | 1/2010 | Jobs et al. |
| 7,653,394 B2 | 1/2010 | McMillin |
| 7,656,271 B2 | 2/2010 | Ehrman et al. |
| 7,657,920 B2 | 2/2010 | Arseneau et al. |
| 7,660,419 B1 | 2/2010 | Ho |
| 7,661,124 B2 | 2/2010 | Ramanathan et al. |
| 7,664,494 B2 | 2/2010 | Jiang |
| 7,668,176 B2 | 2/2010 | Chuah |
| 7,668,612 B1 | 2/2010 | Okkonen |
| 7,668,903 B2 | 2/2010 | Edwards et al. |

(56) References Cited

U.S. PATENT DOCUMENTS

| | | |
|---|---|---|
| 7,668,966 B2 | 2/2010 | Klinker et al. |
| 7,676,673 B2 | 3/2010 | Weller et al. |
| 7,680,086 B2 | 3/2010 | Eglin |
| 7,681,226 B2 | 3/2010 | Kraemer et al. |
| 7,684,370 B2 | 3/2010 | Kezys |
| 7,685,131 B2 | 3/2010 | Batra et al. |
| 7,685,254 B2 | 3/2010 | Pandya |
| 7,685,530 B2 | 3/2010 | Sherrard et al. |
| 7,688,792 B2 | 3/2010 | Babbar et al. |
| 7,693,107 B2 | 4/2010 | De Froment |
| 7,693,720 B2 | 4/2010 | Kennewick et al. |
| 7,697,540 B2 | 4/2010 | Haddad et al. |
| 7,710,932 B2 | 5/2010 | Muthuswamy et al. |
| 7,711,848 B2 | 5/2010 | Maes |
| 7,719,966 B2 | 5/2010 | Luft et al. |
| 7,720,206 B2 | 5/2010 | Devolites et al. |
| 7,720,464 B2 | 5/2010 | Batta |
| 7,720,505 B2 * | 5/2010 | Gopi ............ H04W 12/06 455/425 |
| 7,720,960 B2 | 5/2010 | Pruss et al. |
| 7,721,296 B2 | 5/2010 | Ricagni |
| 7,724,716 B2 | 5/2010 | Fadell |
| 7,725,570 B1 | 5/2010 | Lewis |
| 7,729,326 B2 | 6/2010 | Sekhar |
| 7,730,123 B1 | 6/2010 | Erickson et al. |
| 7,734,784 B1 | 6/2010 | Araujo et al. |
| 7,742,406 B1 | 6/2010 | Muppala |
| 7,746,854 B2 | 6/2010 | Ambe et al. |
| 7,747,240 B1 | 6/2010 | Briscoe et al. |
| 7,747,699 B2 | 6/2010 | Prueitt et al. |
| 7,747,730 B1 | 6/2010 | Harlow |
| 7,752,330 B2 | 7/2010 | Olsen et al. |
| 7,756,056 B2 | 7/2010 | Kim et al. |
| 7,756,534 B2 | 7/2010 | Anupam et al. |
| 7,756,757 B1 * | 7/2010 | Oakes, III ............ G06Q 30/02 705/26.1 |
| 7,760,137 B2 | 7/2010 | Martucci et al. |
| 7,760,711 B1 | 7/2010 | Kung et al. |
| 7,760,861 B1 | 7/2010 | Croak et al. |
| 7,765,294 B2 | 7/2010 | Edwards et al. |
| 7,769,397 B2 | 8/2010 | Funato et al. |
| 7,770,785 B2 | 8/2010 | Jha et al. |
| 7,774,323 B2 | 8/2010 | Helfman |
| 7,774,412 B1 | 8/2010 | Schnepel |
| 7,774,456 B1 | 8/2010 | Lownsbrough et al. |
| 7,778,176 B2 | 8/2010 | Morford |
| 7,778,643 B2 | 8/2010 | Laroia et al. |
| 7,792,257 B1 | 9/2010 | Vanier et al. |
| 7,792,538 B2 | 9/2010 | Kozisek |
| 7,792,708 B2 | 9/2010 | Alva |
| 7,797,019 B2 | 9/2010 | Friedmann |
| 7,797,060 B2 | 9/2010 | Grgic et al. |
| 7,797,204 B2 | 9/2010 | Balent |
| 7,797,401 B2 | 9/2010 | Stewart et al. |
| 7,801,523 B1 | 9/2010 | Kenderov |
| 7,801,783 B2 | 9/2010 | Kende et al. |
| 7,801,985 B1 | 9/2010 | Pitkow et al. |
| 7,802,724 B1 | 9/2010 | Nohr |
| 7,805,140 B2 | 9/2010 | Friday et al. |
| 7,805,522 B2 | 9/2010 | Schlüter et al. |
| 7,805,606 B2 | 9/2010 | Birger et al. |
| 7,809,351 B1 | 10/2010 | Panda et al. |
| 7,809,372 B2 | 10/2010 | Rajaniemi |
| 7,813,746 B2 | 10/2010 | Rajkotia |
| 7,817,615 B1 | 10/2010 | Breau et al. |
| 7,817,983 B2 | 10/2010 | Cassett et al. |
| 7,822,837 B1 | 10/2010 | Urban et al. |
| 7,822,849 B2 | 10/2010 | Titus |
| 7,826,427 B2 | 11/2010 | Sood et al. |
| 7,826,607 B1 | 11/2010 | De Carvalho Resende et al. |
| 7,835,275 B1 | 11/2010 | Swan et al. |
| 7,843,831 B2 | 11/2010 | Morrill et al. |
| 7,843,843 B1 | 11/2010 | Papp, III et al. |
| 7,844,034 B1 | 11/2010 | Oh et al. |
| 7,844,728 B2 | 11/2010 | Anderson et al. |
| 7,848,768 B2 | 12/2010 | Omori et al. |
| 7,849,161 B2 | 12/2010 | Koch et al. |
| 7,849,170 B1 | 12/2010 | Hargens et al. |
| 7,849,477 B2 | 12/2010 | Cristofalo et al. |
| 7,853,255 B2 | 12/2010 | Karaoguz et al. |
| 7,853,656 B2 | 12/2010 | Yach et al. |
| 7,856,226 B2 | 12/2010 | Wong et al. |
| 7,860,088 B2 | 12/2010 | Lioy |
| 7,865,182 B2 | 1/2011 | Macaluso |
| 7,865,187 B2 | 1/2011 | Ramer et al. |
| 7,868,778 B2 | 1/2011 | Kenwright |
| 7,873,001 B2 | 1/2011 | Silver |
| 7,873,344 B2 | 1/2011 | Bowser et al. |
| 7,873,346 B2 | 1/2011 | Petersson et al. |
| 7,873,540 B2 | 1/2011 | Arumugam |
| 7,873,705 B2 | 1/2011 | Kalish |
| 7,877,090 B2 | 1/2011 | Maes |
| 7,881,199 B2 | 2/2011 | Krstulich |
| 7,881,697 B2 | 2/2011 | Baker et al. |
| 7,882,029 B2 | 2/2011 | White |
| 7,882,247 B2 | 2/2011 | Sturniolo et al. |
| 7,882,560 B2 | 2/2011 | Kraemer et al. |
| 7,886,047 B1 | 2/2011 | Potluri |
| 7,889,384 B2 | 2/2011 | Armentrout et al. |
| 7,890,084 B1 | 2/2011 | Dudziak et al. |
| 7,890,111 B2 | 2/2011 | Bugenhagen |
| 7,894,431 B2 | 2/2011 | Goring et al. |
| 7,899,039 B2 | 3/2011 | Andreasen et al. |
| 7,899,438 B2 | 3/2011 | Baker et al. |
| 7,903,553 B2 | 3/2011 | Liu |
| 7,907,970 B2 | 3/2011 | Park et al. |
| 7,908,358 B1 | 3/2011 | Prasad et al. |
| 7,911,975 B2 | 3/2011 | Droz et al. |
| 7,912,025 B2 | 3/2011 | Pattenden et al. |
| 7,912,056 B1 | 3/2011 | Brassem |
| 7,920,529 B1 | 4/2011 | Mahler et al. |
| 7,921,463 B2 | 4/2011 | Sood et al. |
| 7,925,740 B2 | 4/2011 | Nath et al. |
| 7,925,778 B1 | 4/2011 | Wijnands et al. |
| 7,929,959 B2 | 4/2011 | DeAtley et al. |
| 7,929,960 B2 | 4/2011 | Martin et al. |
| 7,929,973 B2 | 4/2011 | Zavalkovsky et al. |
| 7,930,327 B2 | 4/2011 | Craft et al. |
| 7,930,446 B2 | 4/2011 | Kesselman et al. |
| 7,930,553 B2 | 4/2011 | Satarasinghe et al. |
| 7,933,274 B2 | 4/2011 | Verma et al. |
| 7,936,736 B2 | 5/2011 | Proctor, Jr. et al. |
| 7,937,069 B2 | 5/2011 | Rassam |
| 7,937,450 B2 | 5/2011 | Janik |
| 7,940,685 B1 | 5/2011 | Breslau et al. |
| 7,940,751 B2 | 5/2011 | Hansen |
| 7,941,184 B2 | 5/2011 | Prendergast et al. |
| 7,944,948 B2 | 5/2011 | Chow et al. |
| 7,945,238 B2 | 5/2011 | Baker et al. |
| 7,945,240 B1 | 5/2011 | Klock et al. |
| 7,945,945 B2 | 5/2011 | Graham et al. |
| 7,948,952 B2 | 5/2011 | Hurtta et al. |
| 7,948,953 B2 | 5/2011 | Melkote et al. |
| 7,948,968 B2 | 5/2011 | Voit et al. |
| 7,949,529 B2 | 5/2011 | Weider et al. |
| 7,953,808 B2 | 5/2011 | Sharp et al. |
| 7,953,877 B2 | 5/2011 | Vemula et al. |
| 7,957,020 B2 | 6/2011 | Mine et al. |
| 7,957,381 B2 | 6/2011 | Clermidy et al. |
| 7,957,511 B2 | 6/2011 | Drudis et al. |
| 7,958,029 B1 | 6/2011 | Bobich et al. |
| 7,962,622 B2 | 6/2011 | Friend et al. |
| 7,965,983 B1 | 6/2011 | Swan et al. |
| 7,966,405 B2 | 6/2011 | Sundaresan et al. |
| 7,969,950 B2 | 6/2011 | Iyer et al. |
| 7,970,350 B2 | 6/2011 | Sheynman |
| 7,970,426 B2 | 6/2011 | Poe et al. |
| 7,974,624 B2 | 7/2011 | Gallagher et al. |
| 7,975,184 B2 | 7/2011 | Goff et al. |
| 7,978,627 B2 | 7/2011 | Taylor et al. |
| 7,978,686 B2 | 7/2011 | Goyal et al. |
| 7,979,069 B2 | 7/2011 | Hupp et al. |
| 7,979,889 B2 | 7/2011 | Gladstone et al. |
| 7,979,896 B2 | 7/2011 | McMurtry et al. |

(56) References Cited

U.S. PATENT DOCUMENTS

| | | |
|---|---|---|
| 7,984,130 B2 | 7/2011 | Bogineni et al. |
| 7,984,511 B2 | 7/2011 | Kocher et al. |
| 7,986,935 B1 | 7/2011 | D'Souza et al. |
| 7,987,496 B2 | 7/2011 | Bryce et al. |
| 7,987,510 B2 | 7/2011 | Kocher et al. |
| 3,000,276 A1 | 8/2011 | Scherzer et al. |
| 3,000,318 A1 | 8/2011 | Wiley et al. |
| 3,005,009 A1 | 8/2011 | McKee et al. |
| 3,005,459 A1 | 8/2011 | Balsillie |
| 7,990,049 B2 | 8/2011 | Shioya |
| 8,005,726 B1 | 8/2011 | Bao |
| 8,005,913 B1 | 8/2011 | Carlander |
| 8,005,988 B2 | 8/2011 | Maes |
| 8,010,080 B1 | 8/2011 | Thenthiruperai et al. |
| 8,010,081 B1 | 8/2011 | Roskowski |
| 8,010,082 B2 | 8/2011 | Sutaria et al. |
| 8,010,990 B2 | 8/2011 | Ferguson et al. |
| 8,015,133 B1 | 9/2011 | Wu et al. |
| 8,015,234 B2 | 9/2011 | Lum et al. |
| 8,015,249 B2 | 9/2011 | Nayak et al. |
| 8,019,687 B2 | 9/2011 | Wang et al. |
| 8,019,820 B2 | 9/2011 | Son et al. |
| 8,019,846 B2 | 9/2011 | Roelens et al. |
| 8,019,868 B2 | 9/2011 | Rao et al. |
| 8,019,886 B2 | 9/2011 | Harrang et al. |
| 8,023,425 B2 | 9/2011 | Raleigh |
| 8,024,397 B1 | 9/2011 | Erickson et al. |
| 8,024,424 B2 | 9/2011 | Freimuth et al. |
| 8,027,339 B2 | 9/2011 | Short et al. |
| 8,031,601 B2 | 10/2011 | Feroz et al. |
| 8,032,168 B2 | 10/2011 | Ikaheimo |
| 8,032,409 B1 | 10/2011 | Mikurak |
| 8,032,899 B2 | 10/2011 | Archer et al. |
| 8,036,387 B2 | 10/2011 | Kudelski et al. |
| 8,036,600 B2 | 10/2011 | Garrett et al. |
| 8,044,792 B2 | 10/2011 | Orr et al. |
| 8,045,973 B2 | 10/2011 | Chambers |
| 8,046,449 B2 | 10/2011 | Yoshiuchi |
| 8,050,275 B1 | 11/2011 | Iyer |
| 8,050,690 B2 | 11/2011 | Neeraj |
| 8,050,705 B2 | 11/2011 | Sicher et al. |
| 8,059,530 B1 | 11/2011 | Cole |
| 8,060,017 B2 | 11/2011 | Schlicht et al. |
| 8,060,463 B1 | 11/2011 | Spiegel |
| 8,060,603 B2 | 11/2011 | Caunter et al. |
| 8,064,418 B2 | 11/2011 | Maki |
| 8,064,896 B2 | 11/2011 | Bell et al. |
| 8,065,365 B2 | 11/2011 | Saxena et al. |
| 8,068,824 B2 | 11/2011 | Shan et al. |
| 8,068,829 B2 | 11/2011 | Lemond et al. |
| 8,073,427 B2 | 12/2011 | Koch et al. |
| 8,073,721 B1 | 12/2011 | Lewis |
| 8,078,140 B2 | 12/2011 | Baker et al. |
| 8,078,163 B2 | 12/2011 | Lemond et al. |
| 8,082,459 B2 * | 12/2011 | Araujo, Jr. ............ G06F 1/3203 713/323 |
| 8,085,808 B2 | 12/2011 | Brusca et al. |
| 8,086,398 B2 | 12/2011 | Sanchez et al. |
| 8,086,497 B1 | 12/2011 | Oakes, III |
| 8,086,791 B2 | 12/2011 | Caulkins |
| 8,090,359 B2 | 1/2012 | Proctor, Jr. et al. |
| 8,090,361 B2 | 1/2012 | Hagan |
| 8,090,616 B2 | 1/2012 | Proctor, Jr. et al. |
| 8,091,087 B2 | 1/2012 | Ali et al. |
| 8,094,551 B2 | 1/2012 | Huber et al. |
| 8,095,112 B2 | 1/2012 | Chow et al. |
| 8,095,124 B2 | 1/2012 | Balia |
| 8,095,640 B2 | 1/2012 | Guingo et al. |
| 8,095,666 B2 | 1/2012 | Schmidt et al. |
| 8,098,579 B2 | 1/2012 | Ray et al. |
| 8,099,077 B2 | 1/2012 | Chowdhury et al. |
| 8,099,517 B2 | 1/2012 | Jia et al. |
| 8,102,814 B2 | 1/2012 | Rahman et al. |
| 8,103,285 B2 | 1/2012 | Kalhan |
| 8,104,080 B2 | 1/2012 | Burns et al. |
| 8,107,953 B2 | 1/2012 | Zimmerman et al. |
| 8,108,520 B2 | 1/2012 | Ruutu et al. |
| 8,108,680 B2 | 1/2012 | Murray |
| 8,112,435 B2 | 2/2012 | Epstein et al. |
| 8,116,223 B2 | 2/2012 | Tian et al. |
| 8,116,749 B2 | 2/2012 | Proctor, Jr. et al. |
| 8,116,781 B2 | 2/2012 | Chen et al. |
| 8,122,128 B2 | 2/2012 | Burke, II et al. |
| 8,122,249 B2 | 2/2012 | Falk et al. |
| 8,125,897 B2 | 2/2012 | Ray et al. |
| 8,126,123 B2 | 2/2012 | Cai et al. |
| 8,126,396 B2 | 2/2012 | Bennett |
| 8,126,476 B2 | 2/2012 | Vardi et al. |
| 8,126,722 B2 | 2/2012 | Robb et al. |
| 8,130,793 B2 | 3/2012 | Edwards et al. |
| 8,131,256 B2 | 3/2012 | Martti et al. |
| 8,131,281 B1 | 3/2012 | Hildner et al. |
| 8,131,840 B1 | 3/2012 | Denker |
| 8,131,858 B2 | 3/2012 | Agulnik et al. |
| 8,132,256 B2 | 3/2012 | Bari |
| 8,134,954 B2 | 3/2012 | Godfrey et al. |
| 8,135,388 B1 | 3/2012 | Gailloux et al. |
| 8,135,392 B2 | 3/2012 | Marcelling et al. |
| 8,135,657 B2 | 3/2012 | Kapoor et al. |
| 8,140,690 B2 | 3/2012 | Ly et al. |
| 8,144,591 B2 | 3/2012 | Ghai et al. |
| 8,145,194 B2 | 3/2012 | Yoshikawa et al. |
| 8,146,142 B2 | 3/2012 | Lortz et al. |
| 8,149,748 B2 | 4/2012 | Bata et al. |
| 8,149,823 B2 | 4/2012 | Turcan et al. |
| 8,150,394 B2 | 4/2012 | Bianconi et al. |
| 8,150,431 B2 | 4/2012 | Wolovitz et al. |
| 8,151,205 B2 | 4/2012 | Follmann et al. |
| 8,155,155 B1 | 4/2012 | Chow et al. |
| 8,155,620 B2 | 4/2012 | Wang et al. |
| 8,155,666 B2 | 4/2012 | Alizadeh-Shabdiz |
| 8,155,670 B2 | 4/2012 | Fullam et al. |
| 8,156,206 B2 | 4/2012 | Kiley et al. |
| 8,159,520 B1 | 4/2012 | Dhanoa et al. |
| 8,160,015 B2 | 4/2012 | Rashid et al. |
| 8,160,056 B2 | 4/2012 | Van der Merwe et al. |
| 8,160,598 B2 | 4/2012 | Savoor |
| 8,165,576 B2 | 4/2012 | Raju et al. |
| 8,166,040 B2 | 4/2012 | Brindisi et al. |
| 8,166,554 B2 | 4/2012 | John |
| 8,170,553 B2 | 5/2012 | Bennett |
| 8,174,378 B2 | 5/2012 | Richman et al. |
| 8,174,970 B2 | 5/2012 | Adamczyk et al. |
| 8,175,574 B1 | 5/2012 | Panda et al. |
| 8,180,333 B1 | 5/2012 | Wells et al. |
| 8,180,881 B2 | 5/2012 | Seo et al. |
| 8,180,886 B2 | 5/2012 | Overcash et al. |
| 8,184,530 B1 | 5/2012 | Swan et al. |
| 8,184,590 B2 | 5/2012 | Rosenblatt |
| 8,185,088 B2 | 5/2012 | Klein et al. |
| 8,185,093 B2 | 5/2012 | Jheng et al. |
| 8,185,127 B1 | 5/2012 | Cai et al. |
| 8,185,152 B1 | 5/2012 | Goldner |
| 8,185,158 B2 | 5/2012 | Tamura et al. |
| 8,190,087 B2 | 5/2012 | Fisher et al. |
| 8,190,122 B1 | 5/2012 | Alexander et al. |
| 8,190,675 B2 | 5/2012 | Tribbett |
| 8,191,106 B2 | 5/2012 | Choyi et al. |
| 8,191,116 B1 | 5/2012 | Gazzard |
| 8,191,124 B2 | 5/2012 | Wynn et al. |
| 8,194,549 B2 | 6/2012 | Huber et al. |
| 8,194,553 B2 | 6/2012 | Liang et al. |
| 8,194,572 B2 | 6/2012 | Horvath et al. |
| 8,194,581 B1 | 6/2012 | Schroeder et al. |
| 8,195,093 B2 | 6/2012 | Garrett et al. |
| 8,195,153 B1 | 6/2012 | Frencel et al. |
| 8,195,163 B2 | 6/2012 | Gisby et al. |
| 8,195,661 B2 | 6/2012 | Kalavade |
| 8,196,199 B2 | 6/2012 | Hrastar et al. |
| 8,200,163 B2 | 6/2012 | Hoffman |
| 8,200,200 B1 | 6/2012 | Belser et al. |
| 8,200,509 B2 | 6/2012 | Kenedy et al. |
| 8,200,775 B2 | 6/2012 | Moore |
| 8,200,818 B2 | 6/2012 | Freund et al. |

(56) References Cited

U.S. PATENT DOCUMENTS

| | | |
|---|---|---|
| 8,204,190 B2 | 6/2012 | Bang et al. |
| 8,204,505 B2 | 6/2012 | Jin et al. |
| 8,208,788 B2 | 6/2012 | Ando et al. |
| 8,208,919 B2 | 6/2012 | Kotecha |
| 8,213,296 B2 | 7/2012 | Shannon et al. |
| 8,213,363 B2 | 7/2012 | Ying et al. |
| 8,214,536 B2 | 7/2012 | Zhao |
| 8,214,890 B2 | 7/2012 | Kirovski et al. |
| 8,219,134 B2 | 7/2012 | Maharajh et al. |
| 8,223,655 B2 | 7/2012 | Heinz et al. |
| 8,223,741 B1 | 7/2012 | Bartlett et al. |
| 8,224,382 B2 | 7/2012 | Bultman |
| 8,224,773 B2 | 7/2012 | Spiegel |
| 8,228,818 B2 | 7/2012 | Chase et al. |
| 8,229,394 B2 | 7/2012 | Karlberg |
| 8,229,914 B2 | 7/2012 | Ramer et al. |
| 8,233,433 B2 | 7/2012 | Kalhan |
| 8,233,883 B2 | 7/2012 | De Froment |
| 8,233,895 B2 | 7/2012 | Tysowski |
| 8,234,583 B2 | 7/2012 | Sloo et al. |
| 8,238,287 B1 | 8/2012 | Gopi et al. |
| 8,238,913 B1 | 8/2012 | Bhattacharyya et al. |
| 8,239,520 B2 | 8/2012 | Grah |
| 8,242,959 B2 | 8/2012 | Mia et al. |
| 8,244,241 B2 | 8/2012 | Montemurro |
| 8,249,601 B2 | 8/2012 | Emberson et al. |
| 8,254,880 B2 | 8/2012 | Aaltonen et al. |
| 8,254,915 B2 | 8/2012 | Kozisek |
| 8,255,515 B1 | 8/2012 | Melman et al. |
| 8,255,534 B2 | 8/2012 | Assadzadeh |
| 8,255,689 B2 | 8/2012 | Kim et al. |
| 8,259,692 B2 | 9/2012 | Bajko |
| 8,260,252 B2 | 9/2012 | Agarwal |
| 8,264,965 B2 | 9/2012 | Dolganow et al. |
| 8,265,004 B2 | 9/2012 | Toutonghi |
| 8,266,249 B2 | 9/2012 | Hu |
| 8,266,681 B2 | 9/2012 | Deshpande et al. |
| 8,270,955 B2 | 9/2012 | Ramer et al. |
| 8,270,972 B2 | 9/2012 | Otting et al. |
| 8,271,025 B2 | 9/2012 | Brisebois et al. |
| 8,271,045 B2 | 9/2012 | Parolkar et al. |
| 8,271,049 B2 | 9/2012 | Silver et al. |
| 8,271,992 B2 | 9/2012 | Chatley et al. |
| 8,275,415 B2 | 9/2012 | Huslak |
| 8,275,830 B2 | 9/2012 | Raleigh |
| 8,279,067 B2 | 10/2012 | Berger et al. |
| 8,279,864 B2 | 10/2012 | Wood |
| 8,280,354 B2 | 10/2012 | Smith et al. |
| 8,284,740 B2 | 10/2012 | O'Connor |
| 8,285,249 B2 | 10/2012 | Baker et al. |
| 8,285,992 B2 | 10/2012 | Mathur et al. |
| 8,290,820 B2 | 10/2012 | Plastina et al. |
| 8,291,238 B2 | 10/2012 | Ginter et al. |
| 8,291,439 B2 | 10/2012 | Jethi et al. |
| 8,296,404 B2 | 10/2012 | McDysan et al. |
| 8,300,575 B2 | 10/2012 | Willars |
| 8,306,518 B1 | 11/2012 | Gailloux |
| 8,306,741 B2 | 11/2012 | Tu |
| 8,307,067 B2 | 11/2012 | Ryan |
| 8,307,404 B2* | 11/2012 | Vinberg ............... G06Q 10/06 726/1 |
| 8,310,943 B2 | 11/2012 | Mehta et al. |
| 8,315,198 B2 | 11/2012 | Corneille et al. |
| 8,315,593 B2 | 11/2012 | Gallant et al. |
| 8,315,594 B1 | 11/2012 | Mauser et al. |
| 8,315,718 B2 | 11/2012 | Caffrey et al. |
| 8,315,999 B2 | 11/2012 | Chatley et al. |
| 8,320,244 B2 | 11/2012 | Muqattash et al. |
| 8,320,949 B2 | 11/2012 | Matta |
| 8,325,638 B2 | 12/2012 | Jin et al. |
| 8,325,906 B2 | 12/2012 | Fullarton et al. |
| 8,326,319 B2 | 12/2012 | Davis |
| 8,326,828 B2 | 12/2012 | Zhou et al. |
| 8,331,223 B2 | 12/2012 | Hill et al. |
| 8,331,293 B2 | 12/2012 | Sood |
| 8,332,375 B2 | 12/2012 | Chatley et al. |
| 8,339,991 B2 | 12/2012 | Biswas et al. |
| 8,340,625 B1 | 12/2012 | Johnson et al. |
| 8,340,628 B2 | 12/2012 | Taylor et al. |
| 8,340,678 B1 | 12/2012 | Pandey |
| 8,340,718 B2 | 12/2012 | Colonna et al. |
| 8,346,210 B2 | 1/2013 | Balsan et al. |
| 8,346,225 B2 | 1/2013 | Raleigh |
| 8,346,923 B2 | 1/2013 | Rowles et al. |
| 8,347,104 B2 | 1/2013 | Pathiyal |
| 8,347,362 B2 | 1/2013 | Cai et al. |
| 8,347,378 B2 | 1/2013 | Merkin et al. |
| 8,350,700 B2 | 1/2013 | Fast et al. |
| 8,351,592 B2 | 1/2013 | Freeny, Jr. et al. |
| 8,351,898 B2 | 1/2013 | Raleigh |
| 8,352,360 B2 | 1/2013 | De Judicibus et al. |
| 8,352,980 B2 | 1/2013 | Howcroft |
| 8,353,001 B2 | 1/2013 | Herrod |
| 8,355,570 B2 | 1/2013 | Karsanbhai et al. |
| 8,355,696 B1 | 1/2013 | Olding et al. |
| 8,356,336 B2 | 1/2013 | Johnston et al. |
| 8,358,638 B2 | 1/2013 | Scherzer et al. |
| 8,358,975 B2 | 1/2013 | Bahl et al. |
| 8,363,658 B1 | 1/2013 | Delker et al. |
| 8,363,799 B2 | 1/2013 | Gruchala et al. |
| 8,364,089 B2 | 1/2013 | Phillips |
| 8,364,806 B2 | 1/2013 | Short et al. |
| 8,369,274 B2 | 2/2013 | Sawai |
| 8,370,477 B2 | 2/2013 | Short et al. |
| 8,370,483 B2 | 2/2013 | Choong et al. |
| 8,374,090 B2 | 2/2013 | Morrill et al. |
| 8,374,592 B2 | 2/2013 | Proctor, Jr. et al. |
| 8,375,128 B2 | 2/2013 | Tofighbakhsh et al. |
| 8,375,136 B2 | 2/2013 | Roman et al. |
| 8,380,247 B2 | 2/2013 | Engstrom |
| 8,385,199 B1 | 2/2013 | Coward et al. |
| 8,385,896 B2 | 2/2013 | Proctor, Jr. et al. |
| 8,385,964 B2 | 2/2013 | Haney |
| 8,385,975 B2 | 2/2013 | Forutanpour et al. |
| 8,386,386 B1 | 2/2013 | Zhu |
| 8,391,262 B2 | 3/2013 | Maki et al. |
| 8,391,834 B2 | 3/2013 | Raleigh |
| 8,392,982 B2 | 3/2013 | Harris et al. |
| 8,396,458 B2 | 3/2013 | Raleigh |
| 8,396,929 B2 | 3/2013 | Helfman et al. |
| 8,401,968 B1 | 3/2013 | Schattauer et al. |
| 8,402,165 B2 | 3/2013 | Deu-Ngoc et al. |
| 8,402,540 B2 | 3/2013 | Kapoor et al. |
| 8,406,427 B2 | 3/2013 | Chand et al. |
| 8,406,736 B2 | 3/2013 | Das et al. |
| 8,407,763 B2 | 3/2013 | Weller et al. |
| 8,411,587 B2 | 4/2013 | Curtis et al. |
| 8,411,691 B2 | 4/2013 | Aggarwal |
| 8,412,798 B1 | 4/2013 | Wang |
| 8,413,245 B2 | 4/2013 | Kraemer et al. |
| 8,418,168 B2 | 4/2013 | Tyhurst et al. |
| 8,422,988 B1 | 4/2013 | Keshav |
| 8,423,016 B2 | 4/2013 | Buckley et al. |
| 8,429,403 B2 | 4/2013 | Moret et al. |
| 8,437,734 B2 | 5/2013 | Ray et al. |
| 8,442,015 B2 | 5/2013 | Behzad et al. |
| 8,446,831 B2 | 5/2013 | Kwan et al. |
| 8,447,324 B2 | 5/2013 | Shuman et al. |
| 8,447,607 B2 | 5/2013 | Weider et al. |
| 8,447,980 B2 | 5/2013 | Godfrey et al. |
| 8,448,015 B2 | 5/2013 | Gerhart |
| 8,452,858 B2 | 5/2013 | Wu et al. |
| 8,457,603 B2 | 6/2013 | El-Kadri et al. |
| 8,461,958 B2 | 6/2013 | Saenz et al. |
| 8,463,194 B2 | 6/2013 | Erlenback et al. |
| 8,463,232 B2 | 6/2013 | Tuli et al. |
| 8,468,337 B2 | 6/2013 | Gaur et al. |
| 8,472,371 B1 | 6/2013 | Bari et al. |
| 8,477,778 B2 | 7/2013 | Lehmann, Jr. et al. |
| 8,478,840 B2 | 7/2013 | Skutela et al. |
| 8,483,057 B2 | 7/2013 | Cuervo |
| 8,483,135 B2 | 7/2013 | Cai et al. |
| 8,483,694 B2 | 7/2013 | Lewis et al. |
| 8,484,327 B2 | 7/2013 | Werner et al. |

(56) References Cited

U.S. PATENT DOCUMENTS

| | | |
|---|---|---|
| 8,488,597 B2 | 7/2013 | Nie et al. |
| 8,489,110 B2 | 7/2013 | Frank et al. |
| 8,489,720 B1 | 7/2013 | Morford et al. |
| 8,494,559 B1 | 7/2013 | Malmi |
| 8,495,181 B2 | 7/2013 | Venkatraman et al. |
| 8,495,207 B2 | 7/2013 | Lee |
| 8,495,227 B2 | 7/2013 | Kaminsky et al. |
| 8,495,360 B2 | 7/2013 | Falk et al. |
| 8,495,700 B2 | 7/2013 | Shahbazi |
| 8,495,743 B2 | 7/2013 | Kraemer et al. |
| 8,499,087 B2 | 7/2013 | Hu |
| RE44,412 E | 8/2013 | Naqvi et al. |
| 8,500,533 B2 | 8/2013 | Lutnick et al. |
| 8,503,358 B2 | 8/2013 | Hanson et al. |
| 8,503,455 B2 | 8/2013 | Heikens |
| 8,504,032 B2 | 8/2013 | Lott et al. |
| 8,504,574 B2 | 8/2013 | Dvorak et al. |
| 8,504,687 B2 | 8/2013 | Maffione et al. |
| 8,504,690 B2 | 8/2013 | Shah et al. |
| 8,504,729 B2 | 8/2013 | Pezzutti |
| 8,505,073 B2 | 8/2013 | Taglienti et al. |
| 8,509,082 B2 | 8/2013 | Heinz et al. |
| 8,514,927 B2 | 8/2013 | Sundararajan et al. |
| 8,516,552 B2 | 8/2013 | Raleigh |
| 8,520,589 B2 | 8/2013 | Bhatt et al. |
| 8,520,595 B2 | 8/2013 | Yadav et al. |
| 8,521,110 B2 | 8/2013 | Rofougaran |
| 8,521,775 B1 | 8/2013 | Poh et al. |
| 8,522,039 B2 | 8/2013 | Hyndman et al. |
| 8,522,249 B2 | 8/2013 | Beaule |
| 8,522,337 B2 | 8/2013 | Adusumilli et al. |
| 8,523,547 B2 | 9/2013 | Pekrul |
| 8,526,329 B2 | 9/2013 | Mahany et al. |
| 8,526,350 B2 | 9/2013 | Xue et al. |
| 8,527,013 B2 | 9/2013 | Guba et al. |
| 8,527,410 B2 | 9/2013 | Markki et al. |
| 8,527,662 B2 | 9/2013 | Biswas et al. |
| 8,528,068 B1 | 9/2013 | Weglein et al. |
| 8,531,954 B2 | 9/2013 | McNaughton et al. |
| 8,531,995 B2 | 9/2013 | Khan et al. |
| 8,532,610 B2 | 9/2013 | Manning Cassett et al. |
| 8,533,775 B2 | 9/2013 | Alcorn et al. |
| 8,535,160 B2 | 9/2013 | Lutnick et al. |
| 8,538,394 B2 | 9/2013 | Zimmerman et al. |
| 8,538,421 B2 | 9/2013 | Brisebois et al. |
| 8,538,458 B2 | 9/2013 | Haney |
| 8,539,544 B2 | 9/2013 | Garimella et al. |
| 8,543,265 B2 | 9/2013 | Ekhaguere et al. |
| 8,543,814 B2 | 9/2013 | Laitinen et al. |
| 8,544,105 B2 | 9/2013 | Mclean et al. |
| 8,548,427 B2 | 10/2013 | Chow et al. |
| 8,549,173 B1 | 10/2013 | Wu et al. |
| 8,554,876 B2 | 10/2013 | Winsor |
| 8,559,369 B2 | 10/2013 | Barkan |
| 8,561,138 B2 | 10/2013 | Rothman et al. |
| 8,565,746 B2 | 10/2013 | Hoffman |
| 8,566,236 B2 | 10/2013 | Busch |
| 8,571,474 B2 | 10/2013 | Chavez et al. |
| 8,571,501 B2 | 10/2013 | Miller et al. |
| 8,571,598 B2 | 10/2013 | Valavi |
| 8,571,993 B2 | 10/2013 | Kocher et al. |
| 8,572,117 B2 | 10/2013 | Rappaport |
| 8,572,256 B2 | 10/2013 | Babbar |
| 8,583,499 B2 | 11/2013 | De Judicibus et al. |
| 8,588,240 B2 | 11/2013 | Ramankutty et al. |
| 8,589,955 B2 | 11/2013 | Roundtree et al. |
| 8,594,665 B2 | 11/2013 | Anschutz |
| 8,595,186 B1 | 11/2013 | Mandyam et al. |
| 8,600,895 B2 | 12/2013 | Felsher |
| 8,601,125 B2 | 12/2013 | Huang et al. |
| 8,605,691 B2 | 12/2013 | Soomro et al. |
| 8,615,507 B2 | 12/2013 | Varadarajulu et al. |
| 8,619,735 B2 | 12/2013 | Montemurro et al. |
| 8,620,257 B2 | 12/2013 | Qiu et al. |
| 8,630,630 B2 | 1/2014 | Raleigh |
| 8,630,925 B2 | 1/2014 | Bystrom et al. |
| 8,631,428 B2 | 1/2014 | Scott et al. |
| 8,634,425 B2 | 1/2014 | Gorti et al. |
| 8,635,164 B2 | 1/2014 | Rosenhaf et al. |
| 8,639,215 B2 | 1/2014 | McGregor et al. |
| 8,644,702 B1 | 2/2014 | Kalajan |
| 8,644,813 B1 | 2/2014 | Gailloux et al. |
| 8,645,518 B2 | 2/2014 | David |
| 8,655,357 B1 | 2/2014 | Gazzard et al. |
| 8,656,472 B2 | 2/2014 | McMurtry et al. |
| 8,660,853 B2 | 2/2014 | Robb et al. |
| 8,666,395 B2 | 3/2014 | Silver |
| 8,667,542 B1 | 3/2014 | Bertz et al. |
| 8,670,334 B2 | 3/2014 | Keohane et al. |
| 8,675,852 B2 | 3/2014 | Maes |
| 8,676,682 B2 | 3/2014 | Kalliola |
| 8,676,925 B1 | 3/2014 | Liu et al. |
| 8,693,323 B1 | 4/2014 | McDysan |
| 8,694,772 B2 | 4/2014 | Kao et al. |
| 8,700,729 B2 | 4/2014 | Dua |
| 8,701,015 B2 | 4/2014 | Bonnat |
| 8,705,361 B2 | 4/2014 | Venkataraman et al. |
| 8,706,863 B2 | 4/2014 | Fadell |
| 8,713,535 B2 | 4/2014 | Malhotra et al. |
| 8,713,641 B1 | 4/2014 | Pagan et al. |
| 8,719,397 B2 | 5/2014 | Levi et al. |
| 8,719,423 B2 | 5/2014 | Wyld |
| 8,724,486 B2 | 5/2014 | Seto et al. |
| 8,725,899 B2 | 5/2014 | Short et al. |
| 8,730,842 B2 | 5/2014 | Collins et al. |
| 8,731,519 B2 | 5/2014 | Flynn et al. |
| 8,732,808 B2 | 5/2014 | Sewall et al. |
| 8,739,035 B2 | 5/2014 | Trethewey |
| 8,744,339 B2 | 6/2014 | Halfmann et al. |
| 8,761,711 B2 | 6/2014 | Grignani et al. |
| 8,780,857 B2 | 7/2014 | Balasubramanian et al. |
| 8,787,249 B2 | 7/2014 | Giaretta et al. |
| 8,792,857 B2 | 7/2014 | Cai et al. |
| 8,793,304 B2 | 7/2014 | Lu et al. |
| 8,798,610 B2 | 8/2014 | Prakash et al. |
| 8,799,440 B2 | 8/2014 | Zhou et al. |
| 8,804,695 B2 | 8/2014 | Branam |
| 8,811,338 B2 | 8/2014 | Jin et al. |
| 8,811,991 B2 | 8/2014 | Jain et al. |
| 8,818,394 B2 | 8/2014 | Bienas et al. |
| 8,819,253 B2 | 8/2014 | Simeloff et al. |
| 8,825,109 B2 | 9/2014 | Montemurro et al. |
| 8,826,411 B2 | 9/2014 | Moen et al. |
| 8,831,561 B2 | 9/2014 | Sutaria et al. |
| 8,838,752 B2 | 9/2014 | Lor et al. |
| 8,843,849 B2 | 9/2014 | Neil et al. |
| 8,845,415 B2 | 9/2014 | Lutnick et al. |
| 8,849,297 B2 | 9/2014 | Balasubramanian |
| 8,855,620 B2 | 10/2014 | Sievers et al. |
| 8,862,751 B2 | 10/2014 | Faccin et al. |
| 8,863,111 B2 | 10/2014 | Selitser et al. |
| 8,875,042 B2 | 10/2014 | LeJeune et al. |
| 8,880,047 B2 | 11/2014 | Konicek et al. |
| 8,891,483 B2 | 11/2014 | Connelly et al. |
| 8,898,748 B2 | 11/2014 | Burks et al. |
| 8,908,516 B2 | 12/2014 | Tzamaloukas et al. |
| 8,929,374 B2 | 1/2015 | Tonsing et al. |
| 8,930,238 B2 | 1/2015 | Coffman et al. |
| 8,930,551 B2 | 1/2015 | Pandya et al. |
| 8,943,551 B2 | 1/2015 | Ganapathy et al. |
| 8,948,726 B2 | 2/2015 | Smith et al. |
| 8,949,382 B2 | 2/2015 | Cornett et al. |
| 8,949,597 B1 | 2/2015 | Reeves et al. |
| 8,955,038 B2 | 2/2015 | Nicodemus et al. |
| 8,966,018 B2 | 2/2015 | Bugwadia et al. |
| 8,971,912 B2 | 3/2015 | Chou et al. |
| 8,977,284 B2 | 3/2015 | Reed |
| 8,995,952 B1 | 3/2015 | Baker et al. |
| 9,002,342 B2 | 4/2015 | Tenhunen et al. |
| 9,014,973 B2 | 4/2015 | Ruckart |
| 9,015,331 B2 | 4/2015 | Lai et al. |
| 9,026,100 B2 | 5/2015 | Castro et al. |
| 9,030,934 B2 | 5/2015 | Shah et al. |
| 9,049,010 B2 | 6/2015 | Jueneman et al. |

(56) References Cited

U.S. PATENT DOCUMENTS

| | | |
|---|---|---|
| 9,064,275 B1 | 6/2015 | Lu et al. |
| 9,105,031 B2 | 8/2015 | Shen et al. |
| 9,111,088 B2 | 8/2015 | Ghai et al. |
| 9,137,286 B1 | 9/2015 | Yuan |
| 9,172,553 B2 | 10/2015 | Dawes et al. |
| 9,177,455 B2 | 11/2015 | Remer |
| 9,204,282 B2 | 12/2015 | Raleigh |
| 9,282,460 B2 | 3/2016 | Souissi |
| 9,286,469 B2 | 3/2016 | Kraemer et al. |
| 9,286,604 B2 | 3/2016 | Aabye et al. |
| 9,313,708 B2 | 4/2016 | Nam et al. |
| 9,325,737 B2 | 4/2016 | Gutowski et al. |
| 9,326,173 B2 | 4/2016 | Luft |
| 9,344,557 B2 | 5/2016 | Gruchala et al. |
| 9,363,285 B2 | 6/2016 | Kitamura |
| 9,367,680 B2 | 6/2016 | Mahaffey et al. |
| 9,413,546 B2 | 8/2016 | Meier et al. |
| 9,418,381 B2 | 8/2016 | Ahuja et al. |
| 9,451,450 B2 * | 9/2016 | Fleischman ........... H04W 8/183 |
| 9,459,767 B2 | 10/2016 | Cockcroft et al. |
| 9,501,803 B2 | 11/2016 | Bilac et al. |
| 9,544,397 B2 | 1/2017 | Raleigh et al. |
| 9,589,117 B2 | 3/2017 | Ali et al. |
| 9,609,459 B2 | 3/2017 | Raleigh |
| 9,712,476 B2 | 7/2017 | Boynton et al. |
| 9,942,796 B2 | 4/2018 | Raleigh |
| 9,986,413 B2 | 5/2018 | Raleigh |
| 10,285,025 B1 | 5/2019 | Baker et al. |
| 10,326,800 B2 | 6/2019 | Raleigh et al. |
| 10,492,102 B2 | 11/2019 | Raleigh et al. |
| 10,582,375 B2 | 3/2020 | Raleigh |
| 10,779,177 B2 | 9/2020 | Raleigh |
| 10,855,559 B2 * | 12/2020 | Raleigh ................... H04L 67/34 |
| 2001/0048738 A1 | 12/2001 | Baniak et al. |
| 2001/0053694 A1 | 12/2001 | Igarashi et al. |
| 2002/0013844 A1 | 1/2002 | Garrett et al. |
| 2002/0022472 A1 | 2/2002 | Watler et al. |
| 2002/0022483 A1 | 2/2002 | Thompson et al. |
| 2002/0049074 A1 | 4/2002 | Eisinger et al. |
| 2002/0099848 A1 | 7/2002 | Lee |
| 2002/0116338 A1 | 8/2002 | Gonthier et al. |
| 2002/0120370 A1 | 8/2002 | Parupudi et al. |
| 2002/0120540 A1 | 8/2002 | Kende et al. |
| 2002/0131404 A1 | 9/2002 | Mehta et al. |
| 2002/0138599 A1 | 9/2002 | Dilman et al. |
| 2002/0138601 A1 | 9/2002 | Piponius et al. |
| 2002/0154751 A1 | 10/2002 | Thompson et al. |
| 2002/0161601 A1 | 10/2002 | Nauer et al. |
| 2002/0164983 A1 | 11/2002 | Raviv et al. |
| 2002/0176377 A1 | 11/2002 | Hamilton |
| 2002/0188732 A1 | 12/2002 | Buckman et al. |
| 2002/0191573 A1 | 12/2002 | Whitehill et al. |
| 2002/0199001 A1 | 12/2002 | Wenocur et al. |
| 2003/0004937 A1 | 1/2003 | Kaita et al. |
| 2003/0005112 A1 | 1/2003 | Krautkremer |
| 2003/0013434 A1 | 1/2003 | Rosenberg et al. |
| 2003/0018524 A1 | 1/2003 | Fishman et al. |
| 2003/0028623 A1 | 2/2003 | Hennessey et al. |
| 2003/0046396 A1 | 3/2003 | Richter et al. |
| 2003/0050070 A1 | 3/2003 | Mashinsky et al. |
| 2003/0050837 A1 | 3/2003 | Kim |
| 2003/0076369 A1 * | 4/2003 | Resner ................... H04L 67/75 709/217 |
| 2003/0084321 A1 | 5/2003 | Tarquini et al. |
| 2003/0088671 A1 | 5/2003 | Klinker et al. |
| 2003/0133408 A1 | 7/2003 | Cheng et al. |
| 2003/0134650 A1 | 7/2003 | Sundar et al. |
| 2003/0159030 A1 | 8/2003 | Evans |
| 2003/0161265 A1 | 8/2003 | Cao et al. |
| 2003/0171112 A1 | 9/2003 | Lupper et al. |
| 2003/0182420 A1 | 9/2003 | Jones et al. |
| 2003/0182435 A1 | 9/2003 | Redlich et al. |
| 2003/0184793 A1 | 10/2003 | Pineau |
| 2003/0188006 A1 | 10/2003 | Bard |
| 2003/0188117 A1 | 10/2003 | Yoshino et al. |
| 2003/0220984 A1 | 11/2003 | Jones et al. |
| 2003/0224781 A1 | 12/2003 | Milford et al. |
| 2003/0229900 A1 | 12/2003 | Reisman |
| 2003/0233332 A1 | 12/2003 | Keeler et al. |
| 2003/0236745 A1 | 12/2003 | Hartsell et al. |
| 2004/0019539 A1 | 1/2004 | Raman et al. |
| 2004/0019564 A1 | 1/2004 | Goldthwaite et al. |
| 2004/0021697 A1 | 2/2004 | Beaton et al. |
| 2004/0024756 A1 | 2/2004 | Rickard |
| 2004/0030705 A1 | 2/2004 | Bowman-Amuah |
| 2004/0039792 A1 | 2/2004 | Nakanishi |
| 2004/0044623 A1 | 3/2004 | Wake et al. |
| 2004/0047358 A1 | 3/2004 | Chen et al. |
| 2004/0054779 A1 | 3/2004 | Takeshima et al. |
| 2004/0073672 A1 | 4/2004 | Fascenda |
| 2004/0082346 A1 | 4/2004 | Skytt et al. |
| 2004/0098715 A1 | 5/2004 | Aghera et al. |
| 2004/0102182 A1 | 5/2004 | Reith et al. |
| 2004/0103193 A1 | 5/2004 | Pandya et al. |
| 2004/0107360 A1 | 6/2004 | Herrmann et al. |
| 2004/0116140 A1 | 6/2004 | Babbar et al. |
| 2004/0127200 A1 | 7/2004 | Shaw et al. |
| 2004/0127208 A1 | 7/2004 | Nair et al. |
| 2004/0127256 A1 | 7/2004 | Goldthwaite et al. |
| 2004/0132427 A1 | 7/2004 | Lee et al. |
| 2004/0133668 A1 | 7/2004 | Nicholas, III |
| 2004/0137890 A1 | 7/2004 | Kalke |
| 2004/0165596 A1 | 8/2004 | Garcia et al. |
| 2004/0167958 A1 | 8/2004 | Stewart et al. |
| 2004/0168052 A1 | 8/2004 | Clisham et al. |
| 2004/0170191 A1 | 9/2004 | Guo et al. |
| 2004/0176104 A1 | 9/2004 | Arcens |
| 2004/0198331 A1 | 10/2004 | Coward et al. |
| 2004/0203755 A1 | 10/2004 | Brunet et al. |
| 2004/0203833 A1 | 10/2004 | Rathunde et al. |
| 2004/0225561 A1 | 11/2004 | Hertzberg et al. |
| 2004/0225898 A1 | 11/2004 | Frost et al. |
| 2004/0236547 A1 | 11/2004 | Rappaport et al. |
| 2004/0243680 A1 | 12/2004 | Mayer |
| 2004/0243992 A1 | 12/2004 | Gustafson et al. |
| 2004/0249918 A1 | 12/2004 | Sunshine |
| 2004/0255145 A1 | 12/2004 | Chow |
| 2004/0259534 A1 | 12/2004 | Chaudhari et al. |
| 2004/0260766 A1 | 12/2004 | Barros et al. |
| 2004/0267872 A1 | 12/2004 | Serdy et al. |
| 2005/0007993 A1 | 1/2005 | Chambers et al. |
| 2005/0009499 A1 | 1/2005 | Koster |
| 2005/0021995 A1 | 1/2005 | Lal et al. |
| 2005/0041617 A1 | 2/2005 | Huotari et al. |
| 2005/0048950 A1 | 3/2005 | Morper |
| 2005/0055291 A1 | 3/2005 | Bevente et al. |
| 2005/0055309 A1 | 3/2005 | Williams et al. |
| 2005/0055595 A1 | 3/2005 | Frazer et al. |
| 2005/0060266 A1 | 3/2005 | DeMello et al. |
| 2005/0060525 A1 | 3/2005 | Schwartz et al. |
| 2005/0075115 A1 | 4/2005 | Corneille et al. |
| 2005/0079863 A1 | 4/2005 | Macaluso |
| 2005/0091505 A1 | 4/2005 | Riley et al. |
| 2005/0096024 A1 | 5/2005 | Bicker et al. |
| 2005/0097516 A1 | 5/2005 | Donnelly et al. |
| 2005/0107091 A1 | 5/2005 | Vannithamby et al. |
| 2005/0108075 A1 | 5/2005 | Douglis et al. |
| 2005/0111463 A1 | 5/2005 | Leung et al. |
| 2005/0128967 A1 | 6/2005 | Scobbie |
| 2005/0135264 A1 | 6/2005 | Popoff et al. |
| 2005/0163320 A1 | 7/2005 | Brown et al. |
| 2005/0166043 A1 | 7/2005 | Zhang et al. |
| 2005/0183143 A1 | 8/2005 | Anderholm et al. |
| 2005/0186948 A1 | 8/2005 | Gallagher et al. |
| 2005/0198377 A1 | 9/2005 | Ferguson et al. |
| 2005/0216421 A1 | 9/2005 | Barry et al. |
| 2005/0228985 A1 | 10/2005 | Ylikoski et al. |
| 2005/0238046 A1 | 10/2005 | Hassan et al. |
| 2005/0239447 A1 | 10/2005 | Holzman et al. |
| 2005/0245241 A1 | 11/2005 | Durand et al. |
| 2005/0246282 A1 | 11/2005 | Naslund et al. |
| 2005/0250508 A1 | 11/2005 | Guo et al. |
| 2005/0250536 A1 | 11/2005 | Deng et al. |
| 2005/0254435 A1 | 11/2005 | Moakley et al. |

(56) References Cited

U.S. PATENT DOCUMENTS

| | | |
|---|---|---|
| 2005/0266825 A1 | 12/2005 | Clayton |
| 2005/0266880 A1 | 12/2005 | Gupta |
| 2006/0014519 A1 | 1/2006 | Marsh et al. |
| 2006/0019632 A1 | 1/2006 | Cunningham et al. |
| 2006/0020787 A1 | 1/2006 | Choyi et al. |
| 2006/0026679 A1 | 2/2006 | Zakas |
| 2006/0030306 A1 | 2/2006 | Kuhn |
| 2006/0034256 A1 | 2/2006 | Addagatla et al. |
| 2006/0035631 A1 | 2/2006 | White et al. |
| 2006/0040642 A1 | 2/2006 | Boris et al. |
| 2006/0045245 A1 | 3/2006 | Aaron et al. |
| 2006/0048223 A1 | 3/2006 | Lee et al. |
| 2006/0068796 A1 | 3/2006 | Millen et al. |
| 2006/0072451 A1 | 4/2006 | Ross |
| 2006/0072550 A1 | 4/2006 | Davis et al. |
| 2006/0072646 A1 | 4/2006 | Feher |
| 2006/0075506 A1 | 4/2006 | Sanda et al. |
| 2006/0085543 A1 | 4/2006 | Hrastar et al. |
| 2006/0093107 A1 | 5/2006 | Chien |
| 2006/0095517 A1 | 5/2006 | O'Connor et al. |
| 2006/0098627 A1 | 5/2006 | Karaoguz et al. |
| 2006/0099970 A1 | 5/2006 | Morgan et al. |
| 2006/0101507 A1 | 5/2006 | Camenisch |
| 2006/0112016 A1 | 5/2006 | Ishibashi |
| 2006/0114821 A1 | 6/2006 | Willey et al. |
| 2006/0114832 A1 | 6/2006 | Hamilton et al. |
| 2006/0126562 A1 | 6/2006 | Liu |
| 2006/0135144 A1 | 6/2006 | Jothipragasam |
| 2006/0136882 A1 | 6/2006 | Noonan et al. |
| 2006/0143066 A1 | 6/2006 | Calabria |
| 2006/0143098 A1 | 6/2006 | Lazaridis |
| 2006/0156398 A1 | 7/2006 | Ross et al. |
| 2006/0160536 A1 | 7/2006 | Chou |
| 2006/0165060 A1 | 7/2006 | Dua |
| 2006/0168128 A1 | 7/2006 | Sistla et al. |
| 2006/0173959 A1 | 8/2006 | Mckelvie et al. |
| 2006/0174035 A1 | 8/2006 | Tufail |
| 2006/0178917 A1 | 8/2006 | Merriam et al. |
| 2006/0178918 A1 | 8/2006 | Mikurak |
| 2006/0182137 A1 | 8/2006 | Zhou et al. |
| 2006/0183462 A1 | 8/2006 | Kolehmainen |
| 2006/0190314 A1 | 8/2006 | Hernandez |
| 2006/0190987 A1 | 8/2006 | Ohta et al. |
| 2006/0193280 A1 | 8/2006 | Lee et al. |
| 2006/0199608 A1 | 9/2006 | Dunn et al. |
| 2006/0200663 A1 | 9/2006 | Thornton |
| 2006/0206709 A1 | 9/2006 | Labrou et al. |
| 2006/0206904 A1 | 9/2006 | Watkins et al. |
| 2006/0218395 A1 | 9/2006 | Maes |
| 2006/0233108 A1 | 10/2006 | Krishnan |
| 2006/0233166 A1 | 10/2006 | Bou-Diab et al. |
| 2006/0236095 A1 | 10/2006 | Smith et al. |
| 2006/0242685 A1 | 10/2006 | Heard et al. |
| 2006/0258341 A1 | 11/2006 | Miller et al. |
| 2006/0274706 A1 | 12/2006 | Chen et al. |
| 2006/0277590 A1 | 12/2006 | Limont et al. |
| 2006/0291419 A1 | 12/2006 | McConnell et al. |
| 2006/0291477 A1 | 12/2006 | Croak et al. |
| 2007/0005795 A1 | 1/2007 | Gonzalez |
| 2007/0019670 A1 | 1/2007 | Falardeau |
| 2007/0022289 A1 | 1/2007 | Alt et al. |
| 2007/0025301 A1 | 2/2007 | Petersson et al. |
| 2007/0033194 A1 | 2/2007 | Srinivas et al. |
| 2007/0033197 A1 | 2/2007 | Scherzer et al. |
| 2007/0035390 A1 | 2/2007 | Thomas et al. |
| 2007/0036312 A1 | 2/2007 | Cai et al. |
| 2007/0055694 A1 | 3/2007 | Ruge et al. |
| 2007/0060200 A1 | 3/2007 | Boris et al. |
| 2007/0061243 A1 | 3/2007 | Ramer et al. |
| 2007/0061800 A1 | 3/2007 | Cheng et al. |
| 2007/0061878 A1 | 3/2007 | Hagiu et al. |
| 2007/0073899 A1 | 3/2007 | Judge et al. |
| 2007/0076616 A1 | 4/2007 | Ngo et al. |
| 2007/0093243 A1 | 4/2007 | Kapadekar et al. |
| 2007/0100981 A1 | 5/2007 | Adamczyk et al. |
| 2007/0101426 A1 | 5/2007 | Lee et al. |
| 2007/0104126 A1 | 5/2007 | Calhoun et al. |
| 2007/0104169 A1 | 5/2007 | Polson |
| 2007/0109983 A1 | 5/2007 | Shankar et al. |
| 2007/0111740 A1 | 5/2007 | Wandel |
| 2007/0130283 A1 | 6/2007 | Klein et al. |
| 2007/0130315 A1 | 6/2007 | Friend et al. |
| 2007/0140113 A1 | 6/2007 | Gemelos |
| 2007/0140145 A1 | 6/2007 | Kumar et al. |
| 2007/0140275 A1 | 6/2007 | Bowman et al. |
| 2007/0143824 A1 | 6/2007 | Shahbazi |
| 2007/0147317 A1 | 6/2007 | Smith et al. |
| 2007/0147324 A1 | 6/2007 | McGary |
| 2007/0155365 A1 | 7/2007 | Kim et al. |
| 2007/0165630 A1 | 7/2007 | Rasanen et al. |
| 2007/0168499 A1 | 7/2007 | Chu |
| 2007/0171856 A1 | 7/2007 | Bruce et al. |
| 2007/0174490 A1 | 7/2007 | Choi et al. |
| 2007/0191006 A1 | 8/2007 | Carpenter |
| 2007/0192460 A1 | 8/2007 | Choi et al. |
| 2007/0198656 A1 | 8/2007 | Mazzaferri et al. |
| 2007/0201502 A1 | 8/2007 | Abramson |
| 2007/0213054 A1 | 9/2007 | Han |
| 2007/0220251 A1 | 9/2007 | Rosenberg et al. |
| 2007/0226225 A1 | 9/2007 | Yiu et al. |
| 2007/0226775 A1 | 9/2007 | Andreasen et al. |
| 2007/0234402 A1 | 10/2007 | Khosravi et al. |
| 2007/0243862 A1 | 10/2007 | Coskun et al. |
| 2007/0248100 A1 | 10/2007 | Zuberi et al. |
| 2007/0254646 A1 | 11/2007 | Sokondar |
| 2007/0254675 A1 | 11/2007 | Zorlu Ozer et al. |
| 2007/0255769 A1 | 11/2007 | Agrawal et al. |
| 2007/0255797 A1 | 11/2007 | Dunn et al. |
| 2007/0255848 A1 | 11/2007 | Sewall et al. |
| 2007/0257767 A1 | 11/2007 | Beeson |
| 2007/0259656 A1 | 11/2007 | Jeong |
| 2007/0259673 A1 | 11/2007 | Willars et al. |
| 2007/0263558 A1 | 11/2007 | Salomone |
| 2007/0266422 A1 | 11/2007 | Germano et al. |
| 2007/0274327 A1 | 11/2007 | Kaarela et al. |
| 2007/0280453 A1 | 12/2007 | Kelley |
| 2007/0282896 A1 | 12/2007 | Wydroug et al. |
| 2007/0293191 A1 | 12/2007 | Mir et al. |
| 2007/0294395 A1 | 12/2007 | Strub et al. |
| 2007/0294410 A1 | 12/2007 | Pandya et al. |
| 2007/0297378 A1 | 12/2007 | Poyhonen et al. |
| 2007/0298764 A1 | 12/2007 | Clayton |
| 2007/0299965 A1 | 12/2007 | Nieh et al. |
| 2007/0300252 A1 | 12/2007 | Acharya et al. |
| 2008/0005285 A1 | 1/2008 | Robinson et al. |
| 2008/0005561 A1 | 1/2008 | Brown et al. |
| 2008/0010379 A1 | 1/2008 | Zhao |
| 2008/0010452 A1 | 1/2008 | Holtzman et al. |
| 2008/0018494 A1 | 1/2008 | Waite et al. |
| 2008/0020738 A1 | 1/2008 | Ho et al. |
| 2008/0022354 A1 | 1/2008 | Grewal et al. |
| 2008/0025230 A1 | 1/2008 | Patel et al. |
| 2008/0032715 A1 | 2/2008 | Jia et al. |
| 2008/0034063 A1 | 2/2008 | Yee |
| 2008/0034419 A1 | 2/2008 | Mullick et al. |
| 2008/0039102 A1 | 2/2008 | Sewall et al. |
| 2008/0049630 A1 | 2/2008 | Kozisek et al. |
| 2008/0050715 A1 | 2/2008 | Golczewski et al. |
| 2008/0051076 A1 | 2/2008 | O'Shaughnessy et al. |
| 2008/0052387 A1 | 2/2008 | Heinz et al. |
| 2008/0056273 A1 | 3/2008 | Pelletier et al. |
| 2008/0059474 A1 | 3/2008 | Lim |
| 2008/0059743 A1 | 3/2008 | Bychkov et al. |
| 2008/0060066 A1 | 3/2008 | Wynn et al. |
| 2008/0062900 A1 | 3/2008 | Rao |
| 2008/0064367 A1 | 3/2008 | Nath et al. |
| 2008/0066149 A1 | 3/2008 | Lim |
| 2008/0066150 A1 | 3/2008 | Lim |
| 2008/0066181 A1 | 3/2008 | Haveson et al. |
| 2008/0070550 A1 | 3/2008 | Hose |
| 2008/0077705 A1 | 3/2008 | Li et al. |
| 2008/0080457 A1 | 4/2008 | Cole |
| 2008/0081606 A1 | 4/2008 | Cole |
| 2008/0082643 A1 | 4/2008 | Storrie et al. |

(56) References Cited

U.S. PATENT DOCUMENTS

| | | |
|---|---|---|
| 2008/0083013 A1 | 4/2008 | Soliman et al. |
| 2008/0085707 A1 | 4/2008 | Fadell |
| 2008/0089295 A1 | 4/2008 | Keeler et al. |
| 2008/0089303 A1 | 4/2008 | Wirtanen et al. |
| 2008/0095339 A1 | 4/2008 | Elliott et al. |
| 2008/0096559 A1 | 4/2008 | Phillips et al. |
| 2008/0098062 A1 | 4/2008 | Balia |
| 2008/0109679 A1 | 5/2008 | Wright et al. |
| 2008/0120129 A1 | 5/2008 | Seubert et al. |
| 2008/0120174 A1 | 5/2008 | Li |
| 2008/0120668 A1 | 5/2008 | Yau |
| 2008/0120688 A1 | 5/2008 | Qiu et al. |
| 2008/0125079 A1 | 5/2008 | O'Neil et al. |
| 2008/0126287 A1 | 5/2008 | Cox et al. |
| 2008/0127304 A1 | 5/2008 | Ginter et al. |
| 2008/0130534 A1 | 6/2008 | Tomioka |
| 2008/0130656 A1 | 6/2008 | Kim et al. |
| 2008/0132201 A1 | 6/2008 | Karlberg |
| 2008/0132268 A1 | 6/2008 | Choi-Grogan et al. |
| 2008/0133727 A1* | 6/2008 | Belqasmi ............ H04L 41/022 709/223 |
| 2008/0134330 A1 | 6/2008 | Kapoor et al. |
| 2008/0139210 A1 | 6/2008 | Gisby et al. |
| 2008/0147454 A1 | 6/2008 | Walker et al. |
| 2008/0160958 A1 | 7/2008 | Abichandani et al. |
| 2008/0162637 A1 | 7/2008 | Adamczyk et al. |
| 2008/0162704 A1 | 7/2008 | Poplett et al. |
| 2008/0164304 A1 | 7/2008 | Narasimhan et al. |
| 2008/0166993 A1 | 7/2008 | Gautier et al. |
| 2008/0167027 A1 | 7/2008 | Gautier et al. |
| 2008/0167033 A1 | 7/2008 | Beckers |
| 2008/0168275 A1 | 7/2008 | DeAtley et al. |
| 2008/0168523 A1 | 7/2008 | Ansari et al. |
| 2008/0177998 A1 | 7/2008 | Apsangi et al. |
| 2008/0178300 A1 | 7/2008 | Brown et al. |
| 2008/0181117 A1 | 7/2008 | Acke et al. |
| 2008/0183812 A1 | 7/2008 | Paul et al. |
| 2008/0184127 A1 | 7/2008 | Rafey et al. |
| 2008/0189760 A1 | 8/2008 | Rosenberg et al. |
| 2008/0201266 A1 | 8/2008 | Chua et al. |
| 2008/0207167 A1 | 8/2008 | Bugenhagen |
| 2008/0212470 A1 | 9/2008 | Castaneda et al. |
| 2008/0212751 A1 | 9/2008 | Chung |
| 2008/0219268 A1 | 9/2008 | Dennison |
| 2008/0221951 A1 | 9/2008 | Forth et al. |
| 2008/0222692 A1 | 9/2008 | Andersson et al. |
| 2008/0225748 A1 | 9/2008 | Khemani et al. |
| 2008/0229385 A1 | 9/2008 | Feder et al. |
| 2008/0229388 A1 | 9/2008 | Maes |
| 2008/0235511 A1 | 9/2008 | O'Brien et al. |
| 2008/0240373 A1 | 10/2008 | Wilhelm |
| 2008/0250053 A1 | 10/2008 | Aaltonen et al. |
| 2008/0256593 A1 | 10/2008 | Vinberg et al. |
| 2008/0259924 A1 | 10/2008 | Gooch et al. |
| 2008/0262798 A1 | 10/2008 | Kim et al. |
| 2008/0263348 A1 | 10/2008 | Zaltsman et al. |
| 2008/0268813 A1 | 10/2008 | Maes |
| 2008/0270212 A1 | 10/2008 | Blight et al. |
| 2008/0279216 A1 | 11/2008 | Sharif-Ahmadi et al. |
| 2008/0282319 A1 | 11/2008 | Fontijn et al. |
| 2008/0291872 A1 | 11/2008 | Henriksson |
| 2008/0293395 A1 | 11/2008 | Mathews et al. |
| 2008/0298230 A1 | 12/2008 | Luft et al. |
| 2008/0305793 A1 | 12/2008 | Gallagher et al. |
| 2008/0311885 A1 | 12/2008 | Dawson et al. |
| 2008/0313315 A1 | 12/2008 | Karaoguz et al. |
| 2008/0313730 A1 | 12/2008 | Iftimie et al. |
| 2008/0316923 A1 | 12/2008 | Fedders et al. |
| 2008/0318547 A1 | 12/2008 | Ballou et al. |
| 2008/0318550 A1 | 12/2008 | DeAtley |
| 2008/0319879 A1 | 12/2008 | Carroll et al. |
| 2008/0320497 A1 | 12/2008 | Tarkoma et al. |
| 2009/0005000 A1 | 1/2009 | Baker et al. |
| 2009/0005005 A1 | 1/2009 | Forstall et al. |
| 2009/0006116 A1 | 1/2009 | Baker et al. |
| 2009/0006200 A1 | 1/2009 | Baker et al. |
| 2009/0006229 A1 | 1/2009 | Sweeney et al. |
| 2009/0013157 A1 | 1/2009 | Beaule |
| 2009/0016310 A1 | 1/2009 | Rasal |
| 2009/0017809 A1 | 1/2009 | Jethi et al. |
| 2009/0036111 A1 | 2/2009 | Danford et al. |
| 2009/0042536 A1 | 2/2009 | Bernard et al. |
| 2009/0044185 A1 | 2/2009 | Krivopaltsev |
| 2009/0046707 A1 | 2/2009 | Smires et al. |
| 2009/0046723 A1 | 2/2009 | Rahman et al. |
| 2009/0047989 A1 | 2/2009 | Harmon et al. |
| 2009/0048913 A1 | 2/2009 | Shenfield et al. |
| 2009/0049156 A1 | 2/2009 | Aronsson et al. |
| 2009/0049518 A1 | 2/2009 | Roman et al. |
| 2009/0054030 A1 | 2/2009 | Golds |
| 2009/0065571 A1 | 3/2009 | Jain |
| 2009/0066999 A1 | 3/2009 | Ito |
| 2009/0067372 A1 | 3/2009 | Shah et al. |
| 2009/0068984 A1 | 3/2009 | Burnett |
| 2009/0070379 A1 | 3/2009 | Rappaport |
| 2009/0077622 A1 | 3/2009 | Baum et al. |
| 2009/0079699 A1 | 3/2009 | Sun |
| 2009/0113514 A1 | 4/2009 | Hu |
| 2009/0125619 A1 | 5/2009 | Antani |
| 2009/0132860 A1 | 5/2009 | Liu et al. |
| 2009/0149154 A1 | 6/2009 | Bhasin et al. |
| 2009/0157792 A1 | 6/2009 | Fiatal |
| 2009/0163173 A1 | 6/2009 | Williams |
| 2009/0172077 A1 | 7/2009 | Roxburgh et al. |
| 2009/0180391 A1 | 7/2009 | Petersen et al. |
| 2009/0181662 A1 | 7/2009 | Fleischman et al. |
| 2009/0197585 A1 | 8/2009 | Aaron |
| 2009/0197612 A1 | 8/2009 | Kiiskinen |
| 2009/0203352 A1 | 8/2009 | Fordon et al. |
| 2009/0217065 A1 | 8/2009 | Araujo, Jr. |
| 2009/0217364 A1 | 8/2009 | Salmela et al. |
| 2009/0219170 A1 | 9/2009 | Clark et al. |
| 2009/0248883 A1 | 10/2009 | Suryanarayana et al. |
| 2009/0254857 A1 | 10/2009 | Romine et al. |
| 2009/0257379 A1 | 10/2009 | Robinson et al. |
| 2009/0262715 A1 | 10/2009 | Juang |
| 2009/0271514 A1 | 10/2009 | Thomas et al. |
| 2009/0282127 A1 | 11/2009 | Leblanc et al. |
| 2009/0286507 A1 | 11/2009 | O'Neil et al. |
| 2009/0287921 A1 | 11/2009 | Zhu et al. |
| 2009/0288140 A1 | 11/2009 | Huber et al. |
| 2009/0291665 A1 | 11/2009 | Gaskarth et al. |
| 2009/0299857 A1 | 12/2009 | Brubaker |
| 2009/0307696 A1 | 12/2009 | Vals et al. |
| 2009/0307746 A1 | 12/2009 | Di et al. |
| 2009/0315735 A1 | 12/2009 | Bhavani et al. |
| 2009/0320110 A1 | 12/2009 | Nicolson et al. |
| 2010/0017506 A1 | 1/2010 | Fadell |
| 2010/0020822 A1 | 1/2010 | Zerillo et al. |
| 2010/0027469 A1 | 2/2010 | Gurajala et al. |
| 2010/0027559 A1 | 2/2010 | Lin et al. |
| 2010/0030890 A1 | 2/2010 | Dutta et al. |
| 2010/0041364 A1 | 2/2010 | Lott et al. |
| 2010/0041365 A1 | 2/2010 | Lott et al. |
| 2010/0041391 A1 | 2/2010 | Spivey et al. |
| 2010/0042675 A1 | 2/2010 | Fujii |
| 2010/0043068 A1 | 2/2010 | Varadhan et al. |
| 2010/0069074 A1 | 3/2010 | Kodialam et al. |
| 2010/0071053 A1 | 3/2010 | Ansari et al. |
| 2010/0075666 A1 | 3/2010 | Garner |
| 2010/0077035 A1 | 3/2010 | Li et al. |
| 2010/0080202 A1 | 4/2010 | Hanson |
| 2010/0082431 A1 | 4/2010 | Ramer et al. |
| 2010/0088387 A1 | 4/2010 | Calamera |
| 2010/0103820 A1 | 4/2010 | Fuller et al. |
| 2010/0113020 A1 | 5/2010 | Subramanian et al. |
| 2010/0121744 A1 | 5/2010 | Belz et al. |
| 2010/0131584 A1 | 5/2010 | Johnson |
| 2010/0142478 A1 | 6/2010 | Forssell et al. |
| 2010/0144310 A1 | 6/2010 | Bedingfield |
| 2010/0151866 A1 | 6/2010 | Karpov et al. |
| 2010/0153781 A1 | 6/2010 | Hanna |
| 2010/0167696 A1 | 7/2010 | Smith et al. |
| 2010/0183132 A1 | 7/2010 | Satyavolu et al. |

(56) References Cited

U.S. PATENT DOCUMENTS

| | | |
|---|---|---|
| 2010/0188975 A1 | 7/2010 | Raleigh |
| 2010/0188990 A1 | 7/2010 | Raleigh |
| 2010/0188992 A1 | 7/2010 | Raleigh |
| 2010/0188994 A1 | 7/2010 | Raleigh |
| 2010/0190469 A1 | 7/2010 | Vanderveen et al. |
| 2010/0191576 A1 | 7/2010 | Raleigh |
| 2010/0191612 A1 | 7/2010 | Raleigh |
| 2010/0191846 A1 | 7/2010 | Raleigh |
| 2010/0192170 A1 | 7/2010 | Raleigh |
| 2010/0192212 A1 | 7/2010 | Raleigh |
| 2010/0195503 A1 | 8/2010 | Raleigh |
| 2010/0197268 A1 | 8/2010 | Raleigh |
| 2010/0198698 A1 | 8/2010 | Raleigh et al. |
| 2010/0198939 A1 | 8/2010 | Raleigh |
| 2010/0235329 A1 | 9/2010 | Koren et al. |
| 2010/0241544 A1 | 9/2010 | Benson et al. |
| 2010/0248719 A1 | 9/2010 | Scholaert |
| 2010/0284327 A1 | 11/2010 | Miklos |
| 2010/0284388 A1 | 11/2010 | Fantini et al. |
| 2010/0287599 A1 | 11/2010 | He et al. |
| 2010/0311402 A1 | 12/2010 | Srinivasan et al. |
| 2010/0325420 A1 | 12/2010 | Kanekar |
| 2011/0004917 A1 | 1/2011 | Saisa et al. |
| 2011/0013569 A1 | 1/2011 | Scherzer et al. |
| 2011/0019574 A1 | 1/2011 | Malomsoky et al. |
| 2011/0081881 A1 | 4/2011 | Baker et al. |
| 2011/0082790 A1 | 4/2011 | Baker et al. |
| 2011/0110309 A1 | 5/2011 | Bennett |
| 2011/0126141 A1 | 5/2011 | King et al. |
| 2011/0145920 A1 | 6/2011 | Mahaffey et al. |
| 2011/0159818 A1 | 6/2011 | Scherzer et al. |
| 2011/0173678 A1 | 7/2011 | Kaippallimalil et al. |
| 2011/0177811 A1 | 7/2011 | Heckman et al. |
| 2011/0182220 A1 | 7/2011 | Black et al. |
| 2011/0185202 A1 | 7/2011 | Black et al. |
| 2011/0244837 A1 | 10/2011 | Murata et al. |
| 2011/0249668 A1 | 10/2011 | Milligan et al. |
| 2011/0264923 A1 | 10/2011 | Kocher et al. |
| 2011/0277019 A1 | 11/2011 | Pritchard, Jr. |
| 2012/0011017 A1 | 1/2012 | Wolcott et al. |
| 2012/0020296 A1 | 1/2012 | Scherzer et al. |
| 2012/0144025 A1 | 6/2012 | Melander et al. |
| 2012/0166364 A1 | 6/2012 | Ahmad et al. |
| 2012/0196644 A1 | 8/2012 | Scherzer et al. |
| 2012/0238287 A1 | 9/2012 | Scherzer |
| 2013/0029653 A1 | 1/2013 | Baker et al. |
| 2013/0058274 A1 | 3/2013 | Scherzer et al. |
| 2013/0065555 A1 | 3/2013 | Baker et al. |
| 2013/0072177 A1 | 3/2013 | Ross et al. |
| 2013/0084835 A1 | 4/2013 | Scherzer et al. |
| 2013/0144789 A1 | 6/2013 | Aaltonen et al. |
| 2013/0225151 A1 | 8/2013 | King et al. |
| 2013/0326356 A9 | 12/2013 | Zheng et al. |
| 2014/0073291 A1 | 3/2014 | Hildner et al. |
| 2014/0241342 A1 | 8/2014 | Constantinof |
| 2015/0181628 A1 | 6/2015 | Haverinen et al. |

FOREIGN PATENT DOCUMENTS

| | | |
|---|---|---|
| CN | 1345154 A | 4/2002 |
| CN | 1508734 A | 6/2004 |
| CN | 1538730 A | 10/2004 |
| CN | 1567818 A | 1/2005 |
| CN | 101035308 A | 3/2006 |
| CN | 1801829 A | 7/2006 |
| CN | 1802839 A | 7/2006 |
| CN | 1889777 A | 7/2006 |
| CN | 101155343 B | 9/2006 |
| CN | 1867024 A | 11/2006 |
| CN | 1878160 A | 12/2006 |
| CN | 1937511 A | 3/2007 |
| CN | 101123553 A | 9/2007 |
| CN | 101080055 A | 11/2007 |
| CN | 101115248 A | 1/2008 |
| CN | 101127988 A | 2/2008 |
| CN | 101183958 A | 5/2008 |
| CN | 101335666 A | 12/2008 |
| CN | 101341764 A | 1/2009 |
| CN | 101815275 A | 8/2010 |
| EP | 1098490 A2 | 5/2001 |
| EP | 1247411 A2 | 10/2002 |
| EP | 1289326 A1 | 3/2003 |
| EP | 1463238 | 9/2004 |
| EP | 1503548 A1 | 2/2005 |
| EP | 1545114 A1 | 6/2005 |
| EP | 1739518 | 1/2007 |
| EP | 1772988 | 4/2007 |
| EP | 1850575 A1 | 10/2007 |
| EP | 1887732 A1 | 2/2008 |
| EP | 1942698 A1 | 7/2008 |
| EP | 1978772 | 10/2008 |
| EP | 2007065 A1 | 12/2008 |
| EP | 2026514 A1 | 2/2009 |
| JP | 3148713 B2 | 3/2001 |
| JP | 2005339247 A | 12/2005 |
| JP | 2006041989 | 2/2006 |
| JP | 2006155263 A | 6/2006 |
| JP | 2006197137 | 7/2006 |
| JP | 2006344007 A | 12/2006 |
| JP | 2007318354 A | 12/2007 |
| JP | 2008301121 A | 12/2008 |
| JP | 2009111919 | 5/2009 |
| JP | 2009212707 A | 9/2009 |
| JP | 2009218773 | 9/2009 |
| JP | 2009232107 A | 10/2009 |
| KR | 20040053858 A | 6/2004 |
| KR | 100658566 B1 | 5/2010 |
| WO | 1998058505 | 12/1998 |
| WO | 1999027723 | 6/1999 |
| WO | 1999065185 A3 | 5/2001 |
| WO | 0208863 | 1/2002 |
| WO | 2002045315 A2 | 6/2002 |
| WO | 2002067616 A1 | 8/2002 |
| WO | 2002093877 A1 | 11/2002 |
| WO | 03017065 A2 | 2/2003 |
| WO | 2003014891 | 2/2003 |
| WO | 2003017063 A2 | 2/2003 |
| WO | 2003017065 A2 | 2/2003 |
| WO | 2003058880 A1 | 7/2003 |
| WO | 2004028070 A1 | 4/2004 |
| WO | 2004064306 A2 | 7/2004 |
| WO | 2004095753 A3 | 1/2005 |
| WO | 2005008995 | 1/2005 |
| WO | 2005053335 A1 | 6/2005 |
| WO | 2005083934 A1 | 9/2005 |
| WO | 2006004467 A1 | 1/2006 |
| WO | 2006004784 A1 | 1/2006 |
| WO | 2006012610 A2 | 2/2006 |
| WO | 2006050758 A1 | 5/2006 |
| WO | 2006077481 A1 | 7/2006 |
| WO | 2006093961 A1 | 9/2006 |
| WO | 2006120558 | 11/2006 |
| WO | 2006130960 A1 | 12/2006 |
| WO | 2007001833 A2 | 1/2007 |
| WO | 2007014630 A1 | 2/2007 |
| WO | 2007018363 A1 | 2/2007 |
| WO | 2007053848 A1 | 5/2007 |
| WO | 2007068288 | 6/2007 |
| WO | 2007097786 A | 8/2007 |
| WO | 2007107701 A2 | 9/2007 |
| WO | 2007120310 | 10/2007 |
| WO | 2007124279 | 11/2007 |
| WO | 2007126352 | 11/2007 |
| WO | 2007129180 A2 | 11/2007 |
| WO | 2007133844 A | 11/2007 |
| WO | 2004077797 A3 | 2/2008 |
| WO | 2008017837 A1 | 2/2008 |
| WO | 2008051379 A2 | 5/2008 |
| WO | 2008066419 A1 | 6/2008 |
| WO | 2008080139 A1 | 7/2008 |
| WO | 2008080430 A1 | 7/2008 |
| WO | 2008099802 A1 | 8/2008 |
| WO | 2009002949 A2 | 12/2008 |
| WO | 2009008817 A1 | 1/2009 |

(56) References Cited

FOREIGN PATENT DOCUMENTS

| WO | 2009002949 A3 | 3/2009 |
|---|---|---|
| WO | 2006073837 A3 | 4/2009 |
| WO | 2007069245 A3 | 4/2009 |
| WO | 2009091295 A1 | 7/2009 |
| WO | 2010088413 A1 | 8/2010 |
| WO | 2010128391 A2 | 11/2010 |
| WO | 2010128391 A3 | 1/2011 |
| WO | 2011002450 A1 | 1/2011 |

OTHER PUBLICATIONS

Ruckus Wireless—White Paper; "Smarter Wi-Fi for Mobile Operator Infrastructures" 2010.
Sabat, "The evolving mobile wireless value chain and market structure," Nov. 2002.
Sadeh et al., "Understanding and Capturing People's Privacy Policies in a Mobile Social Networking Application," ISR School of Computer Science, Carnegie Mellon University, 2007.
Schiller et al., "Location-Based Services," The Morgan Kaufmann Series in Data Management Systems, 2004.
Sharkey, "Coding for Life-Battery Life, That Is," May 27, 2009.
Steglich, Stephan, "1-Centric User Interaction," Nov. 21, 2003.
Sun et al., "Towards Connectivity Management Adaptability: Context Awareness in Policy Representation and End-to-end Evaluation Algorithm," Dept. of Electrical and Information Engineering, Univ. of Oulu, Finland, 2004.
Van Eijk, et al., "GigaMobile, Agent Technology for Designing Personalized Mobile Service Brokerage," Jul. 1, 2002.
VerizonWireless.com news, "Verizon Wireless Adds to Portfolio of Cosumer-Friendly Tools With Introduction of Usage Controls, Usage Controls and Chaperone 2.0 Offer Parents Full Family Security Solution," Aug. 18, 2008.
Windows? Power Management, published Apr. 2009.
Wireless Broadband Alliance, "WISPr 2.0, Apr. 8, 2010"; Doc. Ref. No. WBA/RM/WISPr, Version 01.00.
Zhu et al., "A Survey of Quality of Service in IEEE 802.11 Networks," IEEE Wireless Communications, Aug. 2004.
"Ads and movies on the run," the Gold Coast Bulletin, Southport, Qld, Jan. 29, 2008.
"ASA/PIX: Allow Split Tunneling for VPN Clients on the ASA Configuration Example," Document ID 70917, Jan. 10, 2008.
"Communication Concepts for Mobile Agent Systems," by Joachim Baumann et al.; Inst. of Parallel and Distributed High-Performance Systems, Univ. of Stuttgart, Germany, pp. 123-135, 1997.
"End to End QoS Solution for Real-time Multimedia Application;" Computer Engineering and Applications, 2007, 43 (4):155-159, by Tan Zu-guo, Wang Wen-juan; Information and Science School, Zhanjian Normal College, Zhan jiang, Guangdong 524048, China.
"Jentro Technologies launches Zenlet platform to accelerate location-based content delivery to mobile devices," The Mobile Internet, Boston, MA, Feb. 2008.
"The Construction of Intelligent Residential District in Use of Cable Television Network," Shandong Science, vol. 13, No. 2, Jun. 2000.
3rd Generation Partnership Project, "Technical Specification Group Services and System Aspects; General Packet Radio Service (GPRS) Enhancements for Evolved Universal Terrestrial Radio Access Network (E-UTRAN) Access," Release 8, Document No. 3GPP TS 23.401, V8.4.0, Dec. 2008.
3rd Generation Partnership Project, "Technical Specification Group Services and System Aspects; Policy and Charging Control Architecture," Release 8, Document No. 3GPP TS 23 203, V8.4.0, Dec. 2008.
Accuris Networks, "The Business Value of Mobile Data Offload—a White Paper", 2010.
Ahmed et al., "A Context-Aware Vertical Handover Decision Algorithm for Multimode Mobile Terminals and Its Performance," BenQ Mobile, Munich Germany; University of Klagenfurt, Klagenfurt, Austria; 2006.
Alonistioti et al., "Intelligent Architectures Enabling Flexible Service Provision and Adaptability," 2002.
Amazon Technologies, Inc., "Kindle™ User's Guide," 3rd Edition, Copyright 2004-2009.
Android Cupcake excerpts, The Android Open Source Project, Feb. 10, 2009.
Anton, B. et al., "Best Current Practices for Wireless Internet Service Provider (WISP) Roaming"; Release Date Feb. 2003, Version 1.0; Wi-Fi Alliance—Wireless ISP Roaming (WISPr).
Blackberry Mobile Data System, version 4.1, Technical Overview, 2006.
Byrd, "Open Secure Wireless," May 5, 2010.
Chandrasekhar et al., "Femtocell Networks: A Survey," Jun. 28, 2008.
Chaouchi et al., "Policy Based Networking in the Integration Effort of 4G Networks and Services," 2004 IEEE.
Cisco Systems, Inc., "Cisco Mobile Exchange (CMX) Solution Guide: Chapter 2—Overview of GSM, GPRS, and UMTS," Nov. 4, 2008.
Client Guide for Symantec Endpoint Protection and Symantec Network Access Control, 2007.
Dikaiakos et al., "A Distributed Middleware Infrastructure for Personalized Services," Nov. 24, 2003.
Dixon et al., Triple Play Digital Services: Comcast and Verizon (Digital Phone, Television, and Internet), Aug. 2007.
Droid Wall 1.3.7 description 20100428 obtained from https://www.freewarelovers.com/android/apps/droid-wall.
Ehnert, "Small application to monitor IP trafic on a Blackberry—1.01.03 ", Mar. 27, 2008; http://www.ehnert.net/MiniMoni/.
European Commission, "Data Roaming Tariffs—Transparency Measures," obtained from EUROPA—Europe's Information Society Thematic Portal website, Jun. 24, 2011: "http://ec.europa.eu/information_society/activities/roaming/data/measures/index_en.htm.".
Farooq et al., "An IEEE 802.16 WiMax Module for the NS-3 Simulator," Mar. 2-6, 2009.
Fujitsu, "Server Push Technology Survey and Bidirectional Communication in HTTP Browser," Jan. 9, 2008 (JP).
Han et al., "Information Collection Services for Qos-Aware Mobile Applications," 2005.
Hartmann et al., "Agent-Based Banking Transactions & Information Retrieval—What About Performance Issues?" 1999.
Hewlett-Packard Development Company, LP, "IP Multimedia Services Charging," white paper, Jan. 2006.
Hossain et al., "Gain-Based Selection of Ambient Media Services in Pervasive Environments," Mobile Networks and Applications. Oct. 3, 2008.
Jing et al., "Client-Server Computing in Mobile Environments," GTE Labs. Inc., Purdue University, ACM Computing Surveys, vol. 31, No. 2, Jun. 1999.
Kasper et al., "Subscriber Authentication in mobile cellular Networks with virtual software SIM Credentials using Trusted Computing," Fraunhofer-Institute for Secure Information Technology SIT, Darmstadt, Germany; ICACT 2008.
Kassar et al., "An overview of vertical handover decision strategies in heterogeneous wireless networks," ScienceDirect, University Pierre & Marie Curie, Paris, France, Jun. 5, 2007.
Kim, "Free wireless a high-wire act; MetroFi needs to draw enough ads to make service add profits," San Francisco Chronicle, Aug. 21, 2006.
Knight et al., "Layer 2 and 3 Virtual Private Networks: Taxonomy, Technology, and Standarization Efforts," IEEE Communications Magazine, Jun. 2004.
Koutsopoulou et al., "Charging, Accounting and Billing Management Schemes In Mobile Telecommunication Networks and the Internet," IEEE Communications Surveys & Tutorials, First Quarter 2004, vol. 6, No. 1.
Koutsopoulou et al., "Middleware Platform for the Support of Charging Reconfiguration Actions," 2005.
Kuntze et al., "Trustworthy content push," Fraunhofer-Institute for Secure Information Technology SIT; Germany; WCNC 2007 proceedings, IEEE.

(56) References Cited

OTHER PUBLICATIONS

Kyriakakos et al., "Ubiquitous Service Provision in Next Generation Mobile Networks," Proceedings of the 13th IST Mobile and Wireless Communications Summit, Lyon, France, Jun. 2004.
Li, Yu, "Dedicated E-Reading Device: The State of the Art and The Challenges," Scroll, vol. 1, No. 1, 2008.
Loopt User Guide, metroPCS, Jul. 17, 2008.
Muntermann et al., "Potentiale und Sicherheitsanforderungen mobiler Finanzinformationsdienste und deren Systeminfrastrukturen," Chair of Mobile Commerce & Multilateral Security, Goethe Univ. Frankfurt, 2004.
NetLimiter Lite 4.0.19.0; http://www.heise.de/download/netlimiter-lite-3617703.html from vol. 14/2007.
Nilsson et al., "A Novel MAC Scheme for Solving the QoS Parameter Adjustment Problem in IEEE802.11e EDCA," Feb. 2006.
Nuzman et al., "A compund model for TCP connection arrivals for LAN and WAN applications," Oct. 22, 2002.
Open Mobile Alliance (OMA), Push Architecture, Candidate Version 2.2; Oct. 2, 2007; OMA-AD-Push-V2_2-20071002-C.
Oppliger, Rolf, "Internet Security: Firewalls and Bey," Communications of the ACM, May 1997, vol. 40. No. 5.
Rao et al., "Evolution of Mobile Location-Based Services," Communication of the ACM, Dec. 2003.
Richtel, "Cellphone consumerism; If even a debit card is too slow, now you have a new way to act on impulse [National Edition]," National Post, Canada, Oct. 2, 2007.

\* cited by examiner

ADAPTIVE AMBIENT SERVICES

BACKGROUND

With the advent of mass market digital communications, applications and content distribution, many access networks such as wireless networks, cable networks and DSL (Digital Subscriber Line) networks are pressed for user capacity, with, for example, EVDO (Evolution-Data Optimized), HSPA (High Speed Packet Access), LTE (Long Term Evolution), WiMax (Worldwide Interoperability for Microwave Access), DOCSIS, DSL, and Wi-Fi (Wireless Fidelity) becoming user capacity constrained. In the wireless case, although network capacity will increase with new higher capacity wireless radio access technologies, such as MIMO (Multiple-Input Multiple-Output), and with more frequency spectrum and cell splitting being deployed in the future, these capacity gains are likely to be less than what is required to meet growing digital networking demand.

Similarly, although wire line access networks, such as cable and DSL, can have higher average capacity per user compared to wireless, wire line user service consumption habits are trending toward very high bandwidth applications and content that can quickly consume the available capacity and degrade overall network service experience. Because some components of service provider costs go up with increasing bandwidth, this trend will also negatively impact service provider profits.

BRIEF DESCRIPTION OF THE DRAWINGS

Various embodiments of the invention are disclosed in the following detailed description and the accompanying drawings.

DETAILED DESCRIPTION

Figure 1:
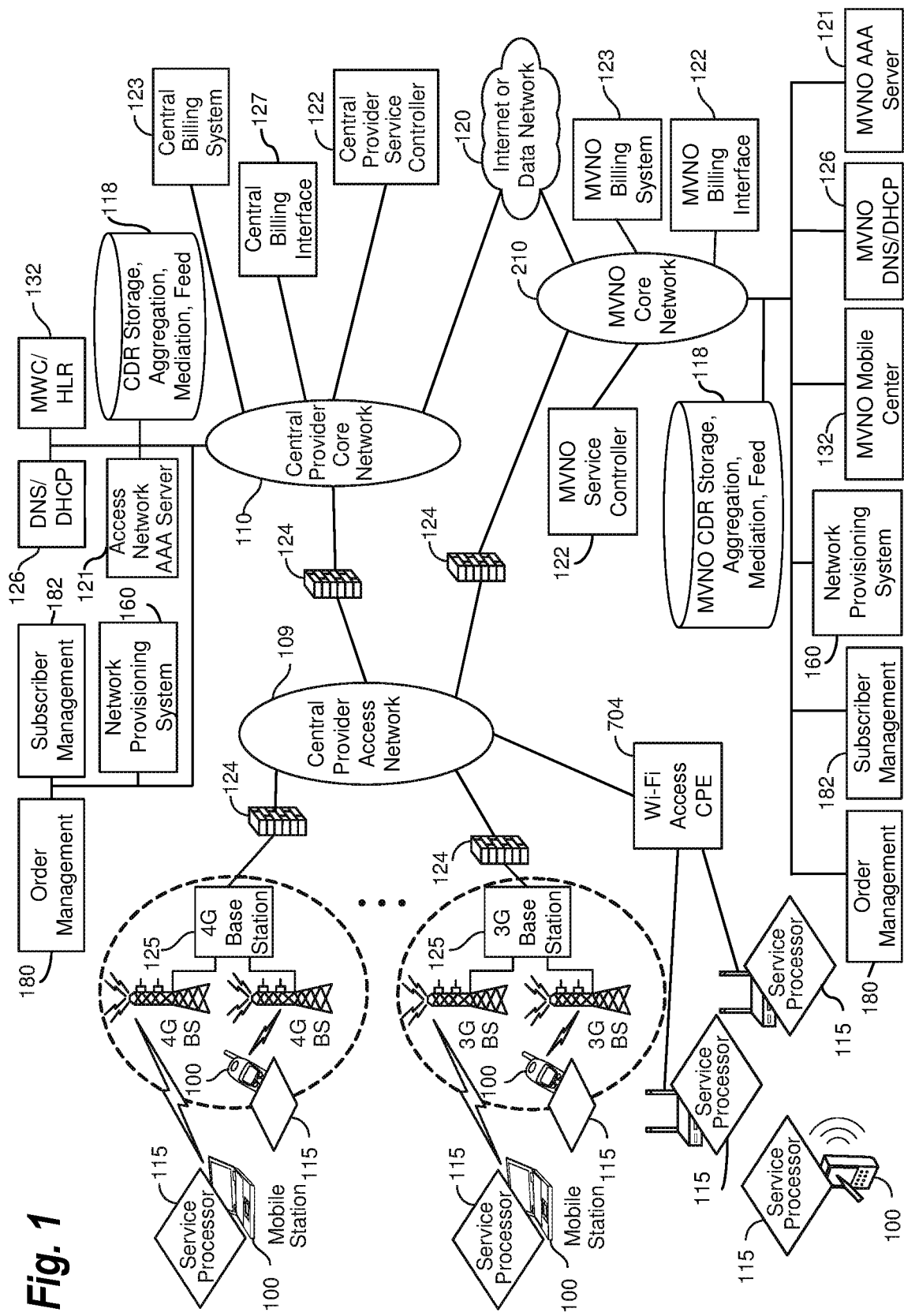
FIG. 1 illustrates a wireless network architecture for providing adaptive ambient service in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some embodiments, adaptive ambient services for a device (e.g., any type of device capable of communicating with a wireless network) or use of a service on a wireless network are provided. In some embodiments, an ambient experience is the user experience that is available at the time the device is sold in the event the user has not yet signed up for a service plan or the device is not sold with a prepaid service plan or other required service plan. In some embodiments, an ambient service generally refers to a set of application access, network destinations, sources, and/or traffic control rules to enable an ambient service experience, and, in some embodiments, also includes a set of billing rules to keep an accounting of service usage for different service usages (e.g., various bill by account rules or service usage accounts). For example, the ambient experience can be defined by an ambient service profile, an ambient service plan, the other service usage activity control policies, and/or the ambient service or ambient experience bill-by-account usage accounting and/or billing policies in effect in the network, on the device, on an intermediate networking device, or any combination thereof.

For example, if a service processor (e.g., on the device, the intermediate networking device, or both) is used in large part to define the ambient service profile, then the initial provisioning and activation settings in the service processor, and possibly a service controller in the network, can define the user service upgrade offering choices, network destination access control possibilities, traffic control policies, mobile commerce transaction capabilities (e.g., which transaction websites, WAP sites or portals the user can access to purchase information, content, music, games and/or eBooks), possibly free news or weather or other modest bandwidth Internet services that are provided free of charge to entice the user into using/upgrading the service or using the transactions or viewing advertisements, what advertisements are displayed to the user or what advertisement based websites the user is exposed to, certain applications may have access while others are blocked (e.g., Internet based text services have access but email downloads do not), or various other example service capabilities related to, for example, any set of application access, destinations, sources, traffic control rules to enable an ambient service experience, and/or a set of billing rules to keep an accounting of service usage for different service usages (e.g., various bill by account rules or service usage accounts). Examples of the type of useful services that can be enabled with the ambient service techniques disclosed herein include the following embodiments. In some embodiments, a content purchasing service (e.g., books, news, magazines, music, video, games, and mobile applications) is facilitated in which the device access is partially, largely, or entirely limited to the device or network based applications, source/destination addresses, and/or content transfers required to properly implement the service, in which other applications, source/destination addresses and/or content types are partly, largely, or entirely blocked. In some embodiments, such ambient services can have service usage monitoring and accounting that is reported for one or more individual ambient services. For example, the service usage for a book storefront browsing and download service can be separately accounted for while other services such as a general Internet shopping or auction service, a music service, a picture upload and store/print service, a search and/or advertisement service can also each have individual service usage accounting, or in some cases, groups of services can have aggregate service usage accounting. In some embodiments, an ambient service is provided for the device prior to the time a user has paid for permanent or full time access services, which, for example, can include a service selection platform for allowing the device user to access certain limited network functions and/or resources, and to access those network resources necessary to choose a pay-for-service plan option. In some embodiments, the individual and/or group ambient service usage accounting can be transformed into one or more billing records in which the service usage for each ambient service is billed to an entity, which can be the business entity that provides the ambient service experience and/or transaction platform, or the end user, or the central service provider, or an MVNO service provider, or a distribution partner, or an OEM, or another entity interested in paying for one or more ambient services.

In some embodiments, allowing some or all of these services, and blocking or throttling other ambient user service attempts (e.g., unpaid large file size Internet downloads or uploads or movie viewing or other access that would consume bandwidth and cause the ambient service to be a potential source of losses for the service provider) is made possible, for example, by various service profile control capabilities of the service processor and/or the service controller or using various other techniques. In some bill by account embodiments, as described herein, in which each service activity can, for example, be separately tracked with the service monitor and other agents and server functions to produce a billing offset that allows categorization and mediation of different billing entities (accounts) provides the capability for the service provider to individually account for the costs of each ambient service element. For example, this allows for business models in which the free access to the end user can be paid for or partially paid for by one or more service provider partners who are billed for service access using the bill by account capabilities (e.g., the transaction partners can pay for user access to their transaction experience and perhaps pay a revenue share for transaction billing, the advertising sponsored website partners pay for their access service share).

While the service control capabilities of the service processor and the bill by account service cost sharing and transaction revenue sharing in some cases can create a profitable ambient business model, in other cases, the ambient services can be a potential source of losses for the service provider. Accordingly, in some embodiments, the ambient service capabilities can be modified over time to reduce service cost to the service provider or VSP based on a variety of decision factors. For example, the user can have one level of traffic control for a period of time, and if the user has not signed up for service by the end of the period or if the user is no longer in good standing (e.g., based on various service usage criteria) for use of the service, the ambient service access is reduced (e.g., the transmission speed can be reduced or throttled, and/or the total volume of data transmitted can be reduced or throttled, possibly additionally according to time of day parameters and/or network busy state parameters) by changing the service control policy settings in the service processor, and the service level can be further reduced over time if the user continues to not sign up for service or the user does not create much transaction revenue. In some embodiments, this can limit or prevent users from "camping" on free ambient services without generating any meaningful revenue to fund the service, or viewing any advertising to fund the service. In some embodiments, a user can be throttled in such a manner until the user executes a "useful activity" or a "preferred activity" (e.g., a purchase, viewing advertising, answering a questionnaire, signing up for a service, accepting a beta trial, and/or earning valued customer points), and after a useful or preferred activity occurs, then the access capabilities of the device are increased. As another example, various recursive throttling algorithms can be utilized to one or more of the service activities offered in ambient service mode so that the user experiences what full speed service is like, and if the user continues consuming appreciable bandwidth with the service activity, then the activity is throttled back to reduce costs until or unless the user selects a pay-for-service plan (or accumulates sufficient service access points as described herein). In these and other similar examples, the service processor or service controller can issue the user a notification explaining that their service is currently free so their usage is being throttled, and if they desire to receive better service, service plan upgrade offers can be delivered to the user interface (UI). In some embodiments, the level of access (e.g., ambient service bandwidth and/or transfer limits, reachable addresses beyond the ambient service, and/or bandwidth or transfer limits for open Internet usage and/or email usage, text usage) is increased as the user increases the number of useful or preferred activities (e.g., the user accumulates "service access points," which are then spent on access activities). It will now be apparent to one of ordinary skill in the art that the various ambient service parameters including various provisioning and activation processes used to provide an ambient service, can also be managed by various virtual service provider (VSP) techniques. For example, this allows the same service controllers and service processor solutions to be used to define a wide range of ambient experiences for various device groups or user groups that are controlled by different VSPs.

Similarly, rather than controlling ambient service profile settings using the device assisted services functions and/or VSP functions to control the service controller, service processor, provisioning and activation settings, various other embodiments call for the ambient service profile settings to be controlled by various network based service activity control equipment as similarly described herein and/or by various intermediate networking devices. For example, depending on the level of service control and service monitoring sophistication (e.g., advanced DPI (Deep Packet Inspection), TCP (Transmission Control Protocol) session aware techniques, or other service aware techniques), some, much, most or all of the above described ambient services functionality can be implemented using network based service controls and various VSP management and control techniques. Similarly, in some embodiments, service processor, provisioning and activation settings, and the ambient service profile settings can also be (at least in part) controlled by various intermediate networking devices. In some embodiments, network equipment that can provide ambient service controls include, for example, service gateways, routers, charging functions, HLRs, home agents, proxy servers, and other network equipment as would be apparent to one of ordinary skill in the art.

Whether the ambient service monitoring and control apparatus is implemented with device assisted service techniques, network based techniques, or a combination of both, various embodiments described herein provide for adaptive ambient service embodiments that address the dynamic (e.g., non-static) nature of Internet service access needs (e.g., allowable source/destination and/or application lists, blocked source/destination and/or application lists, traffic control policies for each source/destination and/or application).

Providing an ambient service profile for an ambient service can be complicated by the variable nature of network addresses and offered services such as, for example, the Internet. For example, a central service provider, MVNO provider or VSP may desire to provide ambient service access to a given web site partner's web service, in exchange for a business deal with the website partner that motivates the service provider to provide the ambient access. In this example, the ambient access is intended to enable access (either wide open or throttled) to the website partner's collection of URLs (and possibly one or more applications) associated with the service, while blocking or differentially throttling access to other network destinations and/or applications not associated with the web site partner services. A problem can arise in this example whenever the website partner changes the addresses and/or domains associated with the website services, because any static access list and access list policies generally makes a static list impractical. In such cases, the adaptive ambient service embodiments described herein provide a solution to these and other problems, whether the adaptive ambient access controls and/or traffic controls are implemented with device assisted service apparatus, network based apparatus, or a combination of both.

As another example, an ambient service profile for a transaction service provider can include that service provider's domain or web site as an allowed destination. However, there are often inline advertisements provided by ad servers and/or partner sites that should also be included in the set of allowed destinations in the ambient service profile, and these are often dynamic or frequently changing. As another example, an ambient service provider may not want to allow access to sites that typically involve relatively high data usage (e.g., streaming and/or downloading of video content), while allowing other sites that result in less bandwidth intensive service usage activities. As another example, during a session a user may attempt to surf out of the ambient service, such as when the user attempts to access a website or service that is not an allowed or pre-approved destination in the ambient service profile (e.g., a search site can be the pre-approved ambient service, but the ambient service partner paying for the search service access may desire to also allow and pay for user click-through to search results and/or advertising offers, or, for example, an ambient shopping service sponsor may desire to also pay for click-through to vendor partners sites to provide a purchase transaction opportunity to the user). Moreover, the defined ambient service profile quickly stagnates as various applications and destinations, for example, change over time or on each request/usage (e.g., new applications become available and/or web site content and link changes occur daily if not hourly and/or are dynamically generated using well known web site techniques). Thus, what is needed are adaptive techniques for providing an adaptive ambient service.

Accordingly, in some embodiments, adaptive ambient services using an adaptive ambient service profile are provided. In some embodiments, a flexible and efficient adaptive ambient service control is provided by using an intelligent element in the network that performs one or more of the following functions: (1) beginning with an initial list of allowable ambient service device access behaviors (e.g., addresses/URLs, applications and/or content types, in some cases, with a set of traffic control policies that are differentiated as discussed above), (2) as the user accesses the ambient service, determine if the access behavior of the device is within or outside of the desired ambient service access and/or traffic control policies (e.g., determine if the access behavior is properly associated with the desired ambient services and/or service policies), (3) for those access behaviors that are within the desired ambient service policies, expand the list of allowable ambient service device access behaviors to include the new behaviors that are desired and/or preferred (e.g., new sub-domains, advertising content sources, transaction partner addresses, and/or desired surf-outs), (4) for those device access behaviors that are outside of the desired/preferred ambient service policies (e.g., are not associated or beneficially associated with the desired/preferred ambient service), expand the list of blocked or differentially throttled ambient service device access behaviors to include the new behaviors that are undesired or less desired (e.g., not preferred). In some embodiments, the intelligent network element used to adapt the ambient service control is included in one or more network equipment functions (e.g., service gateways, routers, charging gateways, HLRs, AAA, base station, service controller, and/or other network equipment functions). In some embodiments the intelligent network element used to adapt the ambient service control is included in the device and/or intermediate networking device service processor. In some embodiments, the intelligent network element used to adapt the ambient service control is included in a combination of the device (and/or intermediate networking device) and one or more network equipment functions.

In some embodiments, a flexible and efficient adaptive ambient service is provided using a baseline (e.g., a basic starting point) of an adaptive ambient service profile that includes default or previously defined (e.g., by an ambient service provider, network provider, VSP, or another entity) allowable access list and disallowed access list for the ambient service, such as to various applications, destinations, sources, traffic control rules, and/or bill by account rules or a combination thereof. In some embodiments, the ambient service profile is an automated and a self-evolving service profile using various techniques, such as those described herein.

In some embodiments, an adaptive ambient service includes providing an ambient service profile. In some embodiments, the ambient service profile includes ambient service allowed access rules and ambient service disallowed access rules. In some embodiments, the ambient service profile further includes ambient service monitored access rules, in which access to, for example, certain applications or destinations is allowed but is considered suspect or unknown, and thus, such access is monitored (e.g., until that application or destination is reclassified under an ambient service allowed access rule or ambient service disallowed access rule). In some embodiments, the ambient service allowed/disallowed/monitored access rules include IP addresses, domains (e.g., URLs for web sites), or any other unique network destination or application or source identifiers. In some embodiments, the ambient service rules provide differentiated traffic control rules. In some embodiments, the differentiated traffic control rules provide differentiated bandwidth and/or total data transfer limits according to traffic control policy elements, such as activities associated with the main ambient service functions (e.g., the main partner website or a transaction service), activities associated with secondary ambient service functions (e.g., a secondary surf-out website or a less desired service activity), activities transferring different content types, activities associated with different applications, activities based on time of day, activities based on network busy state, activities that require higher or lower QOS (Quality Of Service), and/or other activities.

In some embodiments, the ambient service allowed access rules and/or ambient service disallowed access rules are pushed to (e.g., published, at predefined times, during low service usage times or periods of low service usage activities, or upon request) the device or the intermediate networking device (e.g., any type of networking device capable of communicating with a device and a network, including a wireless network, example intermediate networking devices include a femto cell, or any network communication device that translates the wireless data received from the device to a network, such as an access network) from the network (e.g., an element in the network that securely provides such data, such as a service controller for the ambient service). In some embodiments, the ambient service allowed access rules and/or ambient service disallowed access rules are pulled by (e.g., at predefined times, during low service usage times or periods of low service usage activities, or upon request) the device or the intermediate networking device from the network (e.g., an element in the network that securely provides such data, such as a service controller for the ambient service).

In some embodiments, the device or intermediate networking device includes techniques for automatically adapting the service profile based on ambient service usage and thereby updates the ambient service allowed access rules, the ambient service monitored access rules, and/or ambient service disallowed access rules locally. Device access activities that fall into the monitored access rules are those activities that are determined not to be disallowed (as of that point in time) and are allowed to take place while the intelligent adaptive service element tests the activities on the monitored access rules list to determine if they should be moved to the allowed access rules list, should be moved to the disallowed access rules list, or should remain on the monitored access rules list for further testing and/or observation. In this way, a useful and friendly user experience can be maintained as the adaptive ambient service rules undergo "training" to accommodate dynamic changes to the ambient service sites/applications. The device or intermediate networking device can then periodically provide the updated ambient service allowed access rules, ambient service monitored access rules, and/or ambient service disallowed access rules with the network using various network communication techniques, such as those described herein. In some embodiments, the device periodically synchronizes its locally stored ambient service allowed access rules, ambient service monitored access rules, and/or ambient service disallowed access rules with the network using various network communication techniques, such as those described herein. In some embodiments, the training for one or more of the three lists occurs on the device. In some embodiments, the training for one or more of the three lists occurs in the network. In some embodiments, the training for one or more of the three lists occurs partly on the device and partly in the network (e.g., depending, in some cases, on the device (such as the computing/memory capacity of the device), network bandwidth, and/or any other architecture criteria).

In some embodiments, various techniques are used for providing the adaptive ambient service. Generally, in some embodiments, a requested use of the ambient service is analyzed to determine its association with the ambient service. In some embodiments, service usage traffic patterns are analyzed. In some embodiments, the requested use of the ambient service is determined to be associated or within the ambient service by querying the ambient service (e.g., a server or network function for assisting in managing the ambient service/ambient service profile(s) and/or responding to such ambient service confirmation queries). In some embodiments, the requested used of the service is analyzed by testing the requested application, destination, and/or source. In some embodiments, access for an activity not already on the allowed list or the disallowed list is initially allowed (and in some embodiments, placed on the monitoring list) if the access is associated with a TCP session and/or socket already in progress that is associated with an allowed ambient service. In some embodiments, access for an activity not already on the allowed list or the disallowed list is initially allowed (and in some embodiments, placed on the monitoring list) if the access is associated with an application already associated with and/or connected to an allowed ambient service. In some embodiments, access for an activity not already on the allowed list or the disallowed list is initially allowed (and in some embodiments, placed on the monitoring list) if the access is associated with a URL referral from an allowed URL (e.g., a URL included in an allowed list of URLs). In some embodiments, access for an activity not already on the allowed list or the disallowed list is initially allowed (and in some embodiments, placed on the monitoring list) if the access is associated with a traffic usage pattern that is within certain pre-set/predefined parameters and/or satisfies other criteria for the ambient service.

In some embodiments, device assisted services (DAS) techniques for providing an activity map for classifying or categorizing service usage activities to associate various monitored activities (e.g., by URL, by network domain, by website, by network traffic type, by application or application type, and/or any other service usage activity categorization/classification) with associated IP addresses are provided. In some embodiments, a policy control agent (not shown), service monitor agent 1696, or another agent or function (or combinations thereof) of the service processor 115 provides a DAS activity map. In some embodiments, a policy control agent, service monitor agent, or another agent or function (or combinations thereof) of the service processor provides an activity map for classifying or categorizing service usage activities to associate various monitored activities (e.g., by Uniform Resource Locator (URL), by network domain, by website, by network traffic type, by application or application type, and/or any other service usage activity classification/categorization) with associated IP addresses. In some embodiments, a policy control agent, service monitor agent, or another agent or function (or combinations thereof) of the service processor determines the associated IP addresses for monitored service usage activities using various techniques to snoop the DNS request(s) (e.g., by performing such snooping techniques on the device 100 the associated IP addresses can be determined without the need for a network request for a reverse DNS lookup). In some embodiments, a policy control agent, service monitor agent, or another agent or function (or combinations thereof) of the service processor records and reports IP addresses or includes a DNS lookup function to report IP addresses or IP addresses and associated URLs for monitored service usage activities. For example, a policy control agent, service monitor agent, or another agent or function (or combinations thereof) of the service processor can determine the associated IP addresses for monitored service usage activities using various techniques to perform a DNS lookup function (e.g., using a local DNS cache on the monitored device 100). In some embodiments, one or more of these techniques are used to dynamically build and maintain a DAS activity map that maps, for example, URLs to IP addresses, applications to IP addresses, content types to IP addresses, and/or any other categorization/classification to IP addresses as applicable. In some embodiments, the DAS activity map is used for various DAS traffic control and/or throttling techniques as described herein with respect to various embodiments. In some embodiments, the DAS activity map is used to provide the user various UI related information and notification techniques related to service usage as described herein with respect to various embodiments. In some embodiments, the DAS activity map is used to provide service usage monitoring, prediction/estimation of future service usage, service usage billing (e.g., bill by account and/or any other service usage/billing categorization techniques), DAS techniques for ambient services usage monitoring, DAS techniques for generating micro-CDRs (e.g., also referred to as service usage partition, service usage recording partition, service charging bucket, device generated CDRs, such as in the case where the device and not a network component are generating the usage records, ambient usage records, specialized service usage records, or other terms to indicate a service usage data record generated to provide a more refined or detailed breakdown of service usage for the device), and/or any of the various other DAS related techniques as described herein with respect to various embodiments.

In some embodiments, various techniques are used for providing the adaptive ambient service that allows for a surf-out option (e.g., to an advertisement web site or to a web site in a search result, such as a search engine's paid search result or a search engine's organic search result). In some embodiments, a surf-out option is managed using a second set of rules in the ambient service profile for the surf-out option. In some embodiments, initial allowance of a surf-out website access is based on a main ambient website generating the surf-out (e.g. with a user click), or referring the surf-out. In some embodiments, once the main ambient service creates a surf-out that will be accounted to the main ambient service usage accounting, the surf-out website access rules are constructed according to a set of temporary allowance rules. These temporary allowance rules allow the main ambient service partner to sponsor the surf-out without the danger of the surf-out website becoming a permanent allowed ambient service that the main ambient service partner must sponsor indefinitely. For example, the temporary surf-out rules can then include one or more of the three access list types, such as an allowed access list, a disallowed access list, and a monitoring access list, as similarly discussed above, and similar types of adaptive rules can be applied to create one or more of the lists. In some embodiments, differences with the temporary surf-out rules include limitations based on, for example, a total time allowed for access to the surf-out site, rules based on limiting total data transfer or transfer bandwidth, rules on content type, rules on either allowing or disallowing a secondary surf-out (or beyond secondary to third tier, or through multiple/additional tiers/degrees of separation), and/or allowing or disallowing advertising sources. For example, as similar to other ambient access list rules, the surf-out rules can also be modified based on time of day, user priority, user class, user service plan, user useful activity points, and/or network busy state.

In some embodiments, once the content offered to the user is no longer associated with the main ambient service allowed or monitoring access list, the surf-out option is limited to one or more the following: a limitation on the number of new user actions or choices; a limitation on the number of new web pages or portal pages; a limitation on the number of new URLs or sub-URLs, domains or sub domains; a limitation on the existence or type of advertisements; a limitation on the existence or type or size of certain content; a limitation on the number of new addresses; a limitation on the type of file downloads; a limitation on the number of file downloads; a limitation on the activities of a given application; a limitation on the time for the surf-out sequence; and/or a limitation on the total data transfer for the surf-out sequence. In some embodiments, once one or more of these established limitations is exceeded, then the surf-out sequence is disallowed or differentially traffic controlled or throttled in some way using, for example, the various techniques described herein. In some embodiments, the differential throttling successively reduces the allowed connection bandwidth for the ambient service surf-out sequence based on a length of time from the point at which the surf-out sequence branched from the main ambient service allowed or monitored/monitoring access list, the number of user activities since the surf-out sequence branched from the main ambient service allowed or monitored/monitoring access list, the number of web pages selected since the surf-out sequence branched from the main ambient service allowed or monitored/monitoring access list, the total data transferred since the surf-out sequence branched from the main ambient service allowed or monitored/monitoring access list, the number of new URLs or domains since the surf-out sequence branched from the main ambient service allowed or monitored/monitoring access list. In some embodiments, after the surf-out activities or sequence is disallowed or differentially traffic controlled or throttled, once the user again utilizes the ambient service in a manner that is directly associated with the main ambient service allowed access list or monitoring access list, and the main ambient service experience again provides a surf-out or click through option for the same or similar surf-out experience, then the ambient surf-out limitations, for example, can be reset, removed, reduced and/or modified so that the user can again continue the same or similar surf-out experience. In some embodiments, the surf-out sequence is stored in an access list so that the surf-out sequence is remembered (e.g., stored for) the next time a similar sequence is selected from the main ambient service allowed or monitoring lists, and there may be differential service allowances applied to the surf-out sequence.

For example, there are many advantageous application settings, service models and service business models for which this type of capability and various techniques to limit surf-out sequences and, in some cases, to then "refresh" or remove limitations or modify the limitations for the same or a similar surf-out sequence is valuable. An example is provided and one reasonably skilled in the art can appreciate how this can be applied to many more examples. For example, an Internet search service provider can be an ambient service partner that sponsors ambient service access to their search website. A search website is generally not of much value unless the user can click-through to other web sites offered up in user click through options based on search results. Thus, in this example, it is important to allow the surf-out option. In some embodiments, the search provider charges differentially for paid or sponsored search results, banners or click-throughs offered up as part of an ambient service so that, for example, the search result sponsor can help to bear the costs of ambient access in the bill by account setting. However, once the user has selected a surf-out option, it is important to make sure the surf-out sequence does not become an unlimited access allowance for the user to then surf the Internet for any purpose as this would result in completely unlimited Internet access, which the search service provider and/or the search service sponsors would be billed for. Thus, in some embodiments, it is important to limit the "search sequence tree" so that the "branches" of the surf-out sequence do not progress too far from the main "trunk" of the main ambient service. For example, the surf-out sequence "branches" can be limited in many ways, and the above embodiments are provided as examples, but at this point one skilled in the art will recognize that many more specific embodiments are possible, in which an aspect of many of the embodiments described herein is the ability to identify and allow a surf-out sequence that is not on the main ambient service allowed or monitoring list, establish a process for temporarily allowing certain types of surf-out sequence(s), and then properly limiting the surf-out sequence branches using various criteria and techniques.

In some embodiments, the surf-out option is implemented on a service processor (on a device and/or an intermediate networking device) with device assisted services. In some embodiments, the surf-out option is implemented with a combination of a service processor and a service controller. In some embodiments, the surf-out option is implemented with the various service control and monitoring verification techniques.

In some embodiments, the surf-out option is billed to a main ambient service provider or a secondary ambient service partner (e.g., based on a referring URL, such as that provided by a search engine for a search result and/or a sponsored search result). In some embodiments, the surf-out option is restricted to the associated user session. In some embodiments, the surf-out option is restricted to the associated application. In some embodiments, the surf-out option is limited by time, data usage, or any other criteria. In some embodiments, the surf-out option is controlled or restricted based on a user's current standing (e.g., good standing for service usage/billing or other purposes/criteria). In some embodiments, the user's standing is determined based on various criteria (e.g., purchase behavior, ad click through behavior, user account standing, user browsing behavior, user service data usage, reward points, or any other criteria). In some embodiments, in which a search engine is generating the click through for the surf-out session/activities, only sponsored search results for which the search provider is getting paid for displaying the search result are allowed in the ambient service for search out and/or, in some embodiments, only the sponsored search results are displayed at all.

In some embodiments, both sponsored search and un-sponsored search are displayed and allowed.

In some embodiments, there is an identifier communicated from the device (e.g., a unique application identifier, an agent header, such as in an HTML header, a cookie, such as in an HTML cookie, or a communication handshake sequence, or other secure token or secure handshake technique) to the ambient service provider (e.g., a web service or web site) that identifies the device communication traffic as being associated with an ambient service. In some embodiments, the ambient service partner can interpret the identifier to ascertain that the communication is being sponsored within an ambient service model. In some embodiments, once the ambient service partner determines that the communication is associated with an ambient service model, any aspect of any combination of the ambient service experience, service interface (e.g., web pages or portal pages) look and feel, service interface (e.g., web pages or portal pages) complexity and/or content, offered content, content resolution, offered advertising, advertising resolution, transaction offers, transaction offer content or resolution, offered service bandwidth, total data transfer delivered, surf-out options, or other aspects of the ambient service experience served up by the ambient service partner can be tailored to optimize the offered ambient service experience. In some embodiments, the ambient service partner will optimize the offered ambient service experience in this way to reduce total bandwidth delivered in cases for which the ambient service partner or some other entity is paying for the ambient service access using, for example, various bill by account techniques or using other techniques.

In some embodiments, the surf-out option is associated with a token (e.g., in a request header or some other secure or encrypted token or cookie associated with the session request) for an ambient service provider or ambient service partner, so that the surf-out session can be billed to that ambient service provider or ambient service partner, respectively. In such embodiments, the ambient service web site can receive a token request and provided that the website provides a valid token then the access to the ambient service session is allowed. In this way, a highly scalable ambient service system can be provided to any web site service partner who subscribes to the token service. In some embodiments, user information is also included in the token request to the web site provider, so that the web site provider can determine if the user is worth paying the ambient service access fees for.

In some embodiments, a token is used to identify, enable, account for, and/or establish billing for the ambient service access associated with a main ambient service and not just the surf-out sequences. In general, whenever a token enabled ambient service embodiment is discussed herein, one of ordinary skill in the art will appreciate that the token ambient service technology can be utilized for either a main ambient service or an ambient service surf-out sequence.

In some embodiments, a proxy server or router is provided, and the ambient service provider monitors, accounts, controls, and/or optimizes the service usage through the proxy server or router (e.g., using the adaptive ambient service profile and/or any of the techniques described herein). In some embodiments, the proxy server or router implements the various techniques described herein (e.g., determines if the requested access is within the ambient service profile or belongs on the monitoring or disallowed lists, whether the requested access is compliant with a surf-out option, whether the user is in good standing, whether the requested access is associated with a referring URL, adapts one or more of the three access lists, and/or whether the requested access is associated with a token for an ambient service provider or ambient service provider). For example, in some embodiments, the proxy server or router manages the secure token protocol for the surf-out option, as described herein. In some embodiments, the proxy server or router manages the bill by account for the various adaptive ambient service techniques and/or the billing of ambient service providers/partners for the adaptive ambient service provided for the surf-out option, as described herein. Each of these various techniques is further described below.

In some embodiments, a proxy network device (e.g., a proxy server or router) is provided, and the ambient service (e.g., service processor and/or service controller) directs the wireless communications device traffic to the proxy network device. In some embodiments, a proxy network device facilitates the ambient service (e.g., and/or a non-ambient service), including, for example, monitoring, accounting, controlling, providing security control, and/or optimizing the service usage through the proxy network device (e.g., using the adaptive ambient service profile and/or other associated service profile and/or any of the techniques described herein).

In some embodiments, a proxy server or router is provided (e.g., by the central provider, by the MVNO, or by the associated ambient service provider, such as an Amazon proxy server/router, or by another associated ambient service provider), and the ambient service (e.g., service processor and/or service controller) directs the wireless communications device traffic destined for the specific ambient service to the proxy server or router that supports that ambient service. In some embodiments, the proxy server or router facilitates the ambient service, including, for example, monitoring the service usage through the proxy server or router (e.g., to count bytes/data service usage levels or any other relevant metric by service/activity using the adaptive ambient service profile and/or any of the techniques described herein).

In some embodiments, a proxy server or router is provided, the service is initially an ambient service that a user subsequently upgrades to another service (e.g., any form of a non-ambient service plan) and/or the device/user initially is configured or selected another service (e.g., any form of a non-ambient service plan that provides for another/non-ambient service(s)). In some embodiments, the service (e.g., service processor and/or service controller) also directs the wireless communications devices to the proxy server or router. In some embodiments, the proxy server or router facilitates the service, including, for example, monitoring/security control the service usage through the proxy server or router (e.g., to count bytes/data service usage levels or any other relevant metric by service/activity using the associated service profile and/or any of the techniques described herein). In some embodiments, the proxy server or router facilitates the service, including, for example, monitoring, accounting, controlling, security control, and/or optimizing the service usage through the proxy server or router (e.g., using the associated service profile and/or any of the techniques described herein).

In some embodiments, one or more service gateways (or router), in some cases in conjunction with a charging gateway, HLR, AAA server, base station, or other network function/element/device (any combination of these elements being a "gateway embodiment"), is provided, and the ambient service provider monitors, accounts, controls, and/or optimizes the service usage through a gateway embodiment (e.g., using the adaptive ambient service profile and/or any of the techniques described herein). In some embodiments, a gateway embodiment implements the various techniques described herein (e.g., determines if the requested access is within the ambient service profile or belongs on the monitoring or disallowed lists, whether the requested access is compliant with a surf-out option, whether the user is in good standing, whether the requested access is associated with a referring URL, adapts one or more of the three access lists, and/or whether the requested access is associated with a token for an ambient service provider or ambient service provider). For example, in some embodiments, a gateway embodiment manages the secure token protocol for the surf-out option, as described herein. In some embodiments, a gateway embodiment manages the bill by account for the various adaptive ambient service techniques and/or the billing of ambient service providers/partners for the adaptive ambient service provided for the surf-out option, as described herein. Each of these various techniques is further described below.

In some embodiments, an adaptive ambient service includes implementing an ambient service profile for assisting control of a communications device use of an ambient service on a wireless network, in which the ambient service profile includes various service policy settings, and in which the ambient service profile is associated with an ambient service plan that provides for initial access to the ambient service with limited service capabilities prior to activation of a new service plan; monitoring use of the ambient service based on the ambient service profile; and adapting the ambient service profile based on the monitored use of the ambient service. In some embodiments, these techniques are performed by the communications device (e.g., using a service processor), a network element/function (e.g., using a service controller, proxy server, and/or other network elements/functions/devices), and/or an intermediate networking communications device and, in some embodiments in various combinations with each other and/or with other functions/elements on the network/in communication with the network. In some embodiments, the service policy settings include one or more of the following: access control settings, traffic control settings, billing system settings, user notification with acknowledgement settings, user notification with synchronized service usage information, user privacy settings, user preference settings, authentication settings, admission control settings, application access settings, content access settings, transaction settings, and network or device management communication settings.

In some embodiments, the ambient service profile is implemented at least in part by a proxy server, in which the monitored use of the ambient service based on the ambient service profile is performed at least in part by the proxy server, and in which the proxy server communicates the ambient service traffic to the communications device. In some embodiments, the ambient service plan allows for access to the ambient service with limited service capabilities that are limited based on one or more of the following: period of time, network address, service type, content type, application type, QOS class, time of day, network capacity (e.g., network busy state), bandwidth, and data usage. In some embodiments, the ambient service plan is a low cost or free trial service plan that is bundled or provided as an option for purchase at a point of sale of the communications device. In some embodiments, the communications device is activated prior to a point of sale of the communications device, and the ambient service plan is associated with the communications device during activation. In some embodiments, the ambient service plan is associated with the communications device during one or more of the following: a manufacture of the communications device, a distribution of the communications device, or a point of sale of the communications device. In some embodiments, the ambient service plan includes an option to purchase a new service plan for the communications device, in which the new service plan includes additional service capabilities. In some embodiments, the ambient service profile is programmable by one or more of the following: a manufacturer, a service provider, a distributor, a virtual service provider, and a device manager.

In some embodiments, the ambient service is a transaction based service, in which service usage for the ambient service by the communications device is not billed, and in which electronic commerce based transactions performed using the communications device are billed as transaction based charges. In some embodiments, the ambient service is a transaction based service, in which electronic commerce based transactions performed using the communications device are billed as transaction based charges, and in which at least a portion of service usage costs are billed to one or more of the following: an advertiser, a transaction provider, a mobile virtual network operator, a virtual service provider, and an ambient service provider.

In some embodiments, the communications device is a mobile communications device or an intermediate networking device, and the ambient service includes one or more Internet based services. In some embodiments, the communications device is a mobile communications device, and the ambient service includes one or more Internet based services, and the mobile communications device includes one or more of the following: a mobile phone, a PDA, an eBook reader, a music device, an entertainment/gaming device, a computer, laptop, a netbook, a tablet, and a home networking system. In some embodiments, the communications device includes a modem, and the processor is located in the modem.

In some embodiments, the implementation of the first service profile is verified based on one or more of the following: device based service usage information and network based service usage information. In some embodiments, the ambient service profile is adapted and/or updated based on updates received from the network.

FIG. 1 illustrates a wireless network architecture for providing adaptive ambient service in accordance with some embodiments. As shown, FIG. 1 includes a 4G/3G/2G wireless network operated by, for example, a central provider. As shown, various wireless devices 100 are in communication with base stations 125 for wireless network communication with the wireless network, and other devices 100 are in communication with Wi-Fi Access Points (APs) or Mesh 702 for wireless communication to Wi-Fi Access CPE 704 in communication with central provider access network 109. In some embodiments, each of the wireless devices 100 includes a service processor 115 (as shown), and each service processor connects through a secure control plane link to a service controller 122. In some embodiments, the network based service usage information (e.g., network based CDRs) is obtained from one or more network elements and/or assisted by device based service usage information (e.g., device assisted CDRs). As shown, an MVNO core network 210 also includes a CDR storage, aggregation, mediation, feed 118, a MVNO billing interface 122, and a MVNO billing system 123 (and other network elements as shown in FIG. 1). Those of ordinary skill in the art will appreciate that various other network architectures can be used for providing adaptive ambient services, and FIG. 1 is illustrative of just one such example network architecture for providing the adaptive ambient service techniques described herein.

In some embodiments, the various techniques for adaptive ambient services are performed (e.g., at least in part) on the device (e.g., device 100) and/or on an intermediate networking device (e.g., using a service processor 115 and an ambient service profile). For example, the various techniques for adaptive ambient services can be performed on a processor of the device, and the ambient service profile can be securely stored locally on the device using various techniques for secure execution and storage.

In some embodiments, the various techniques for adaptive ambient services are performed on the device or on the intermediate networking device with assistance or verification from the network (e.g., a service controller 122 executed on any network element, in which the service controller 122 is in secure communication with the device/intermediate networking device, including the service processor 115 executed on the device/intermediate networking device). In some embodiments, adaptive ambient services are performed on the device or on the intermediate networking device with assistance or verification from the network (e.g., using a service controller for maintaining a centralized set of ambient service allowed access rules and/or ambient service disallowed access rules, and a superset of all ambient service monitored access rules, working cross device population). In some embodiments, the service controller 122 or other network element(s) assist the device for implementing these techniques for adaptive ambient services (e.g., cross device, cross URL/domain usage patterns/monitoring, publishing centralized set of ambient service allowed access rules, ambient service monitored access rules, and/or ambient service disallowed access rules, including, for example, compromised and/or hacked URLs). In some embodiments, the service controller 122 or other network element(s) assist the device for implementing these techniques for adaptive ambient services by verifying the device maintained set of ambient service allowed access rules, ambient service monitored access rules, and/or ambient service disallowed access rules. In some embodiments, the service controller 122 or other network element(s) assist the device for implementing these techniques for adaptive ambient services by verifying the device monitored service usage with CDR service usage using various techniques, for example, such as those described herein. In some embodiments, the service controller 122 or other network element(s) assist the device for implementing these techniques for adaptive ambient services by verifying the device monitored service usage by IP address (e.g., using CDR by traffic destination).

In some embodiments the various techniques for adaptive ambient services are performed on the network (e.g., a gateway, router or any other network element using, for example, deep packet inspection (DPI) on the monitored (non-encrypted) network traffic).

As shown in FIG. 1, a CDR storage, aggregation, mediation, feed 118 (e.g., service usage 118, including a billing aggregation data store and rules engine) is a functional descriptor for, in some embodiments, a device/network level service usage information collection, aggregation, mediation, and reporting function located in one or more of the networking equipment boxes attached to one or more of the sub-networks shown in FIG. 1 (e.g., central provider access network 109 and/or central provider core network 110), which is in communication with the service controller 122, and a central billing interface 127. As shown in FIG. 1, service usage 118 is shown as a function in communication with the central provider core network 110. In some embodiments, the CDR storage, aggregation, mediation, feed 118 function is located elsewhere in the network or partially located in elsewhere or integrated with/as part of other network elements. In some embodiments, CDR storage, aggregation, mediation, feed 118 functionality is located or partially located in the AAA server 121 and/or the mobile wireless center/Home Location Register (HLR) 132 (as shown, in communication with a DNS/DHCP server 126). In some embodiments, service usage 118 functionality is located or partially located in the base station, base station controller and/or base station aggregator, collectively referred to as base station 125 in FIG. 1. In some embodiments, CDR storage, aggregation, mediation, feed 118 functionality is located or partially located in a networking component in the central provider access network 109, a networking component in the core network 110, the central billing system 123, the central billing interface 127, and/or in another network component or function. This discussion on the possible locations for the network based and device based service usage information collection, aggregation, mediation, and reporting function (e.g., CDR storage, aggregation, mediation, feed 118) can be generalized as described herein and as shown in the other figures described herein as would be apparent to one of ordinary skill in the art. Also as shown in FIG. 1, the service controller 122 is in communication with the central billing interface 123 (also sometimes referred to as the external billing management interface or billing communication interface) 127, which is in communication with the central billing system 123. As shown, an order management 180 and subscriber management 182 are also in communication with the central provider core network 110 for facilitating order and subscriber management of services for the devices 100 in accordance with some embodiments.

In some embodiments, the CDR storage, aggregation, mediation, feed 118 (and/or other network elements or combinations of network elements) provides a device/network level service usage information collection, aggregation, mediation, and reporting function. In some embodiments, the CDR storage, aggregation, mediation, feed 118 (and/or other network elements or combinations of network elements) collects device generated usage information for one or more devices on the wireless network (e.g., devices 100); and provides the device generated usage information in a syntax and a communication protocol that can be used by the wireless network to augment or replace network generated usage information for the one or more devices on the wireless network. In some embodiments, the syntax is a charging data record (CDR), and the communication protocol is selected from one or more of the following: 3GPP, 3GPP2, or other communication protocols. In some embodiments, the CDR storage, aggregation, mediation, feed 118 (and/or other network elements or combinations of network elements) includes a service usage data store (e.g., a billing aggregator) and a rules engine for aggregating the collected device generated usage information. In some embodiments, the syntax is a charging data record (CDR), and the network device is a CDR feed aggregator, and the CDR storage, aggregation, mediation, feed 118 (and/or other network elements or combinations of network elements) also aggregates CDRs for the one or more devices on the wireless network; applies a set of rules to the aggregated CDRs using a rules engine (e.g., bill by account, transactional billing, and/or any other billing or other rules for service usage information collection, aggregation, mediation, and reporting), and communicates a new set of CDRs for the one or more devices on the wireless network to a billing interface or a billing system (e.g., providing a CDR with a billing offset by account/service). In some embodiments, the CDR storage, aggregation, mediation, feed 118 (and/or other network elements or combinations of network elements) communicates a new set of CDRs for the one or more devices on the wireless network to a billing interface or a billing system. In some embodiments, the CDR storage, aggregation, mediation, feed 118 (and/or other network elements or combinations of network elements) communicates with a service controller to collect the device generated usage information for the one or more devices on the wireless network. In some embodiments, the CDR storage, aggregation, mediation, feed 118 (and/or other network elements or combinations of network elements) communicates with a service controller, in which the service controller is in communication with a billing interface or a billing system. In some embodiments, the CDR storage, aggregation, mediation, feed 118 (and/or other network elements or combinations of network elements) communicates the device generated usage information to a billing interface or a billing system. In some embodiments, the CDR storage, aggregation, mediation, feed (and/or other network elements or combinations of network elements) communicates with a transport gateway and/or a Radio Access Network (RAN) gateway to collect the network generated usage information for the one or more devices on the wireless network. In some embodiments, the service controller 122 communicates the device generated service usage information to the CDR storage, aggregation, mediation, feed 118 (and/or other network elements or combinations of network elements).

In some embodiments, the CDR storage, aggregation, mediation, feed 118 (and/or other network elements or combinations of network elements) performs rules for performing a bill by account aggregation and mediation function. In some embodiments, the service controller 122 in communication with the CDR storage, aggregation, mediation, feed 118 (and/or other network elements or combinations of network elements) performs a rules engine for aggregating and mediating the device generated usage information. In some embodiments, a rules engine device in communication with the CDR storage, aggregation, mediation, feed 118 (and/or other network elements or combinations of network elements) performs a rules engine for aggregating and mediating the device generated usage information.

In some embodiments, the rules engine is included in (e.g., integrated with/part of) the CDR storage, aggregation, mediation, feed 118. In some embodiments, the rules engine and associated functions, as discussed herein, is a separate function/device. In some embodiments, the service controller 122 performs some or all of these rules engine based functions, as discussed herein, and communicates with the central billing interface 127. In some embodiments, the service controller 122 performs some or all of these rules engine based functions, as discussed herein, and communicates with the central billing system 123.

In some embodiments, duplicate CDRs are sent from the network equipment to the billing system 123 that is used for generating service billing. In some embodiments, duplicate CDRs are filtered to send only those CDRs/records for devices controlled by the service controller and/or service processor (e.g., the managed devices). For example, this approach can provide for the same level of reporting, lower level of reporting, and/or higher level of reporting as compared to the reporting required by the central billing system 123.

In some embodiments, a bill-by-account billing offset is provided. For example, bill-by-account billing offset information can be informed to the central billing system 123 by providing a CDR aggregator feed that aggregates the device based service usage data feed to provide a new set of CDRs for the managed devices to the central billing interface 127 and/or the central billing system 123. In some embodiments, transaction billing is provided using similar techniques. For example, transaction billing log information can be provided to the central billing interface 127 and/or the central billing system 123.

In some embodiments, the rules engine (e.g., performed by the service usage 118 or another network element, as described herein) provides a bill-by-account billing offset. For example, device generated service usage information (e.g., device assisted charging data records (CDRs)) includes a transaction type field (e.g., indicating a type of service for the associated service usage information). The rules engine can apply a rule or a set of rules based on the identified service associated with the device generated usage information to determine a bill-by-account billing offset (e.g., a new CDR can be generated to provide the determined bill-by-account billing offset). For example, the determined bill-by-account billing offset can be provided as a credit to the user's service usage account (e.g., a new CDR can be generated with a negative offset for the user's service usage account, such as for network chatter service usage, or transactional service usage, or for any other purposes based on one or more rules performed by the rules engine).

As another example, for a transactional service, a first new CDR can be generated with a negative offset for the user's service usage account for that transactional service related usage, and a second new CDR can be generated with a positive service usage value to charge that same service usage to the transactional service provider (e.g., Amazon, eBay, or another transactional service provider). In some embodiments, the service controller 122 generates these two new CDRs, and the service usage 118 stores, aggregates, and communicates these two new CDRs to the central billing interface 127. In some embodiments, the service controller 122 generates these two new CDRs, and the service usage 118 stores, aggregates, and communicates these two new CDRs to the central billing interface 127, in which the central billing interface 127 applies rules (e.g., performs the rules engine for determining the bill-by-account billing offset).

In some embodiments, the service controller 122 sends the device generated CDRs to the rules engine (e.g., service usage 118), and the rules engine applies one or more rules, such as those described herein and/or any other billing/service usage related rules as would be apparent to one of ordinary skill in the art. In some embodiments, the service controller 122 generates CDRs similar to other network elements, and the rules (e.g., bill-by-account) are performed in the central billing interface 127. For example, for the service controller 122 to generate CDRs similar to other network elements, in some embodiments, the service controller 122 is provisioned on the wireless network and behaves substantially similar to other CDR generators on the network) as would be apparent to one of ordinary skill in the art.

In some embodiments, the service controller 122 is provisioned as a new type of networking function that is recognized as a valid and secure source for CDRs by the other necessary elements in the network (e.g., the Service Usage History/CDR Aggregation and Mediation Server 118). In some embodiments, where the network necessary apparatus will only recognize CDRs from certain types of networking equipment (e.g. RAN Gateway 410 or Transport Gateway 420), then the Service Controller 122 can provide authentication credentials to the other networking equipment that indicate it is one of the approved types of equipment. In some embodiments, the link between the Service Controller 122 and the necessary CDR aggregation and mediation equipment is secured, authenticated, encrypted and/or signed.

In some embodiments, the CDR storage, aggregation, mediation, feed 118 discards the network based service usage information (e.g., network based CDRs) received from one or more network elements. In these embodiments, the service controller 122 can provide the device based service usage information (e.g., device assisted/based CDRs) to the CDR storage, aggregation, mediation, feed 118 (e.g., the CDR storage, aggregation, mediation, feed 118 can just provide a store, aggregate, and communication function(s)), and the device based service usage information is provided to the central billing interface 127 or the central billing system 123.

In some embodiments, the device assisted/based CDRs and/or new CDRs generated based on execution of a rules engine as described herein is provided only for devices that are managed and/or based on device group, service plan, or any other criteria, categorization, and/or grouping, such as based on ambient service or ambient service provider.

Figure 2:
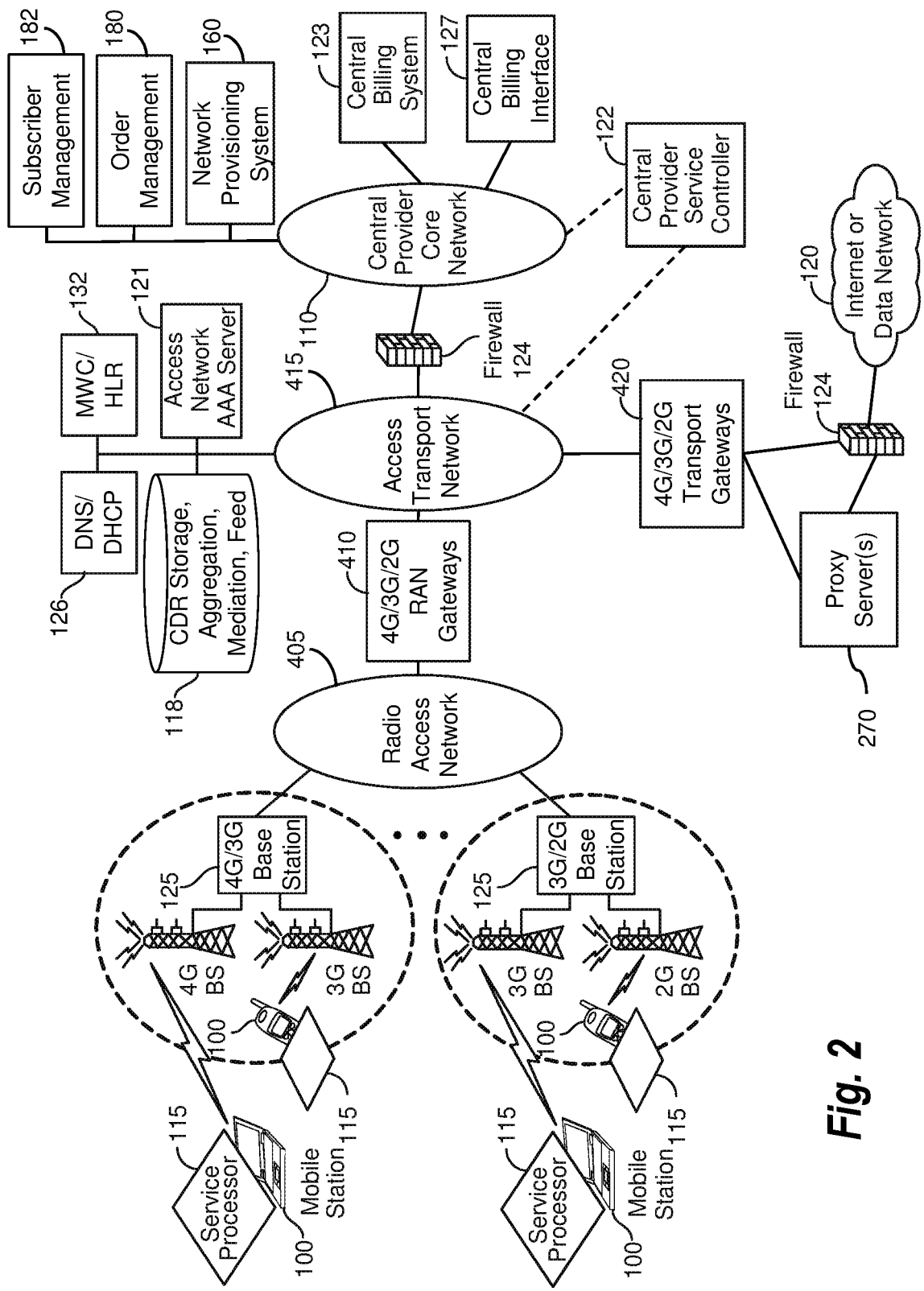
FIG. 2 illustrates a wireless network architecture for providing adaptive ambient service including a proxy server in accordance with some embodiments.

FIG. 2 illustrates a wireless network architecture for providing adaptive ambient service including a proxy server in accordance with some embodiments. As shown, FIG. 2 includes a proxy server 270 in communication with a 4G/3G/2G wireless network operated by, for example, a central provider. In some embodiments, each of the wireless devices 100 includes a service processor 115 (as shown), and each service processor connects through a secure control plane link to a service controller 122. In some embodiments, the network based service usage information (e.g., CDRs) is obtained from Radio Access Network (RAN) gateway(s) 410 and/or transport gateway(s) 420.

Referring now to the 4G/3G/2G access network as shown in FIG. 2, the 4G/3G and 3G/2G base stations/nodes 125 are in communication with a 4G/3G/2G Radio Access Network (RAN) gateway 410 via a radio access network 405, which are in communication with a 4G/3G/2G transport gateway 420 via an access transport network 415. The central provider core network 110 is in network communication with the access transport network 415 (e.g., via a dedicated/leased line, and as shown, via a firewall 124). The Internet 120 is available via a firewall 124 and the transport gateway(s) 420, as shown. Also, as shown, a network apparatus provisioning system 160, order management 180, and subscriber management 182 are in communication with the central provider core network 110. As shown, a AAA server 121, a mobile wireless center/Home Location Register (HLR) 132, a DNS/DHCP 126, and CDR storage, aggregation, mediation, feed 118 are also in communication with the access transport network 415. The central billing system 123 and the central billing interface 127 are shown in communication with the central provider core network 110.

In some embodiments, the various techniques for adaptive ambient services are performed using the proxy server 270. For example, the ambient service provider can provide the proxy server 270, and the ambient service provider monitors, accounts, controls, and/or optimizes the service usage through the proxy server 270 (e.g., using the adaptive ambient service profile and/or any of the techniques described herein). In some embodiments, the central service provider provides the proxy server 270, and the ambient service provider is provided access to monitor, account, control, and/or optimize the service usage through the proxy server 270 (e.g., using the adaptive ambient service profile and/or any of the techniques described herein).

Figure 3:
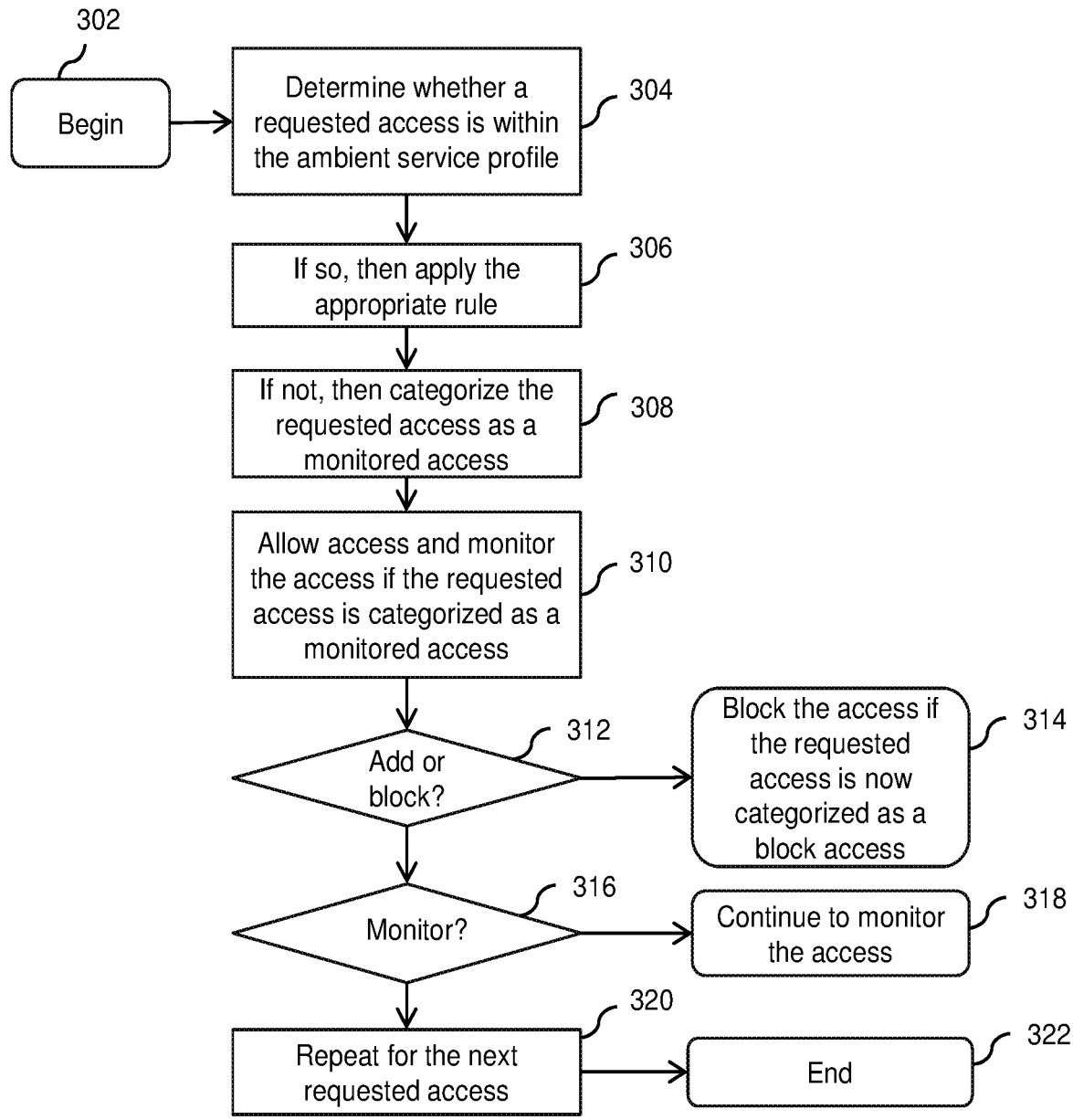
FIG. 3 illustrates a flow diagram for providing adaptive ambient service in accordance with some embodiments.

FIG. 3 illustrates a flow diagram for providing adaptive ambient service in accordance with some embodiments. At 302, the process for an adaptive ambient service begins. At 304, whether a requested access is within the ambient service profile, such as within the ambient service allowed access rules, the ambient service monitoring access rules, and/or ambient service disallowed access rules, is determined. At 306, if the requested access is within the ambient service profile, then the appropriate rule is applied, such as the appropriate ambient service allowed access rule, ambient service monitoring access rule, and/or ambient service disallowed access rule. At 308, if not (e.g., the requested access is not within the ambient service profile, such as not categorized within any of the ambient service profile rules), then categorize the requested access as a monitored access. In some embodiments, a requested access that is not otherwise known or categorized in the ambient service profile, is allowed and then monitored (e.g., trusted and then verified through monitoring and other techniques, such as the various other techniques described herein). At 310, if the requested access is categorized as monitored access, then allow the requested access and monitor the requested access. At 312, determine whether the requested access can now be added or blocked based on the monitored access. At 314, if the requested access can now be blocked, then block the requested access and update the ambient service profile accordingly (e.g., add the requested access to the ambient service blocked access rules). Similarly, if the requested access can now be added, then continue to allow the requested access and update the ambient service profile accordingly (e.g., add the requested access to the ambient service allowed access rules). At 316, determine whether to continue to monitor the requested access (e.g., if the requested access is still in progress, and the requested access has not been otherwise categorized as allowed or blocked ambient service access, then continue to monitor), and if so, continue to monitor the requested access at 318 (e.g., if and until a determination of whether to allow and/or block such access using the various techniques described herein). At 320, the process is repeated for the next requested access. At 322, the process is completed.

Figure 4:
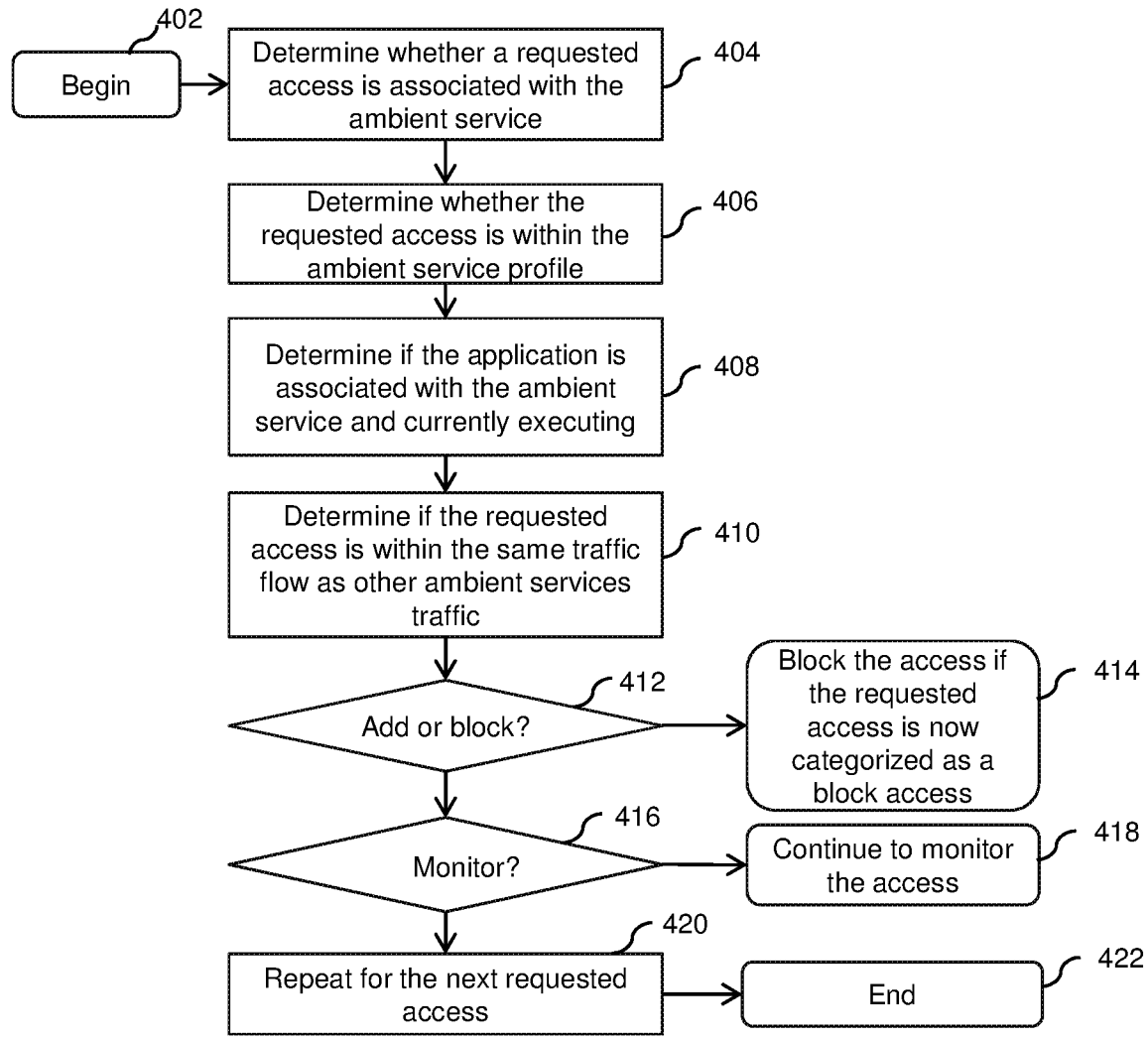
FIG. 4 illustrates another flow diagram for providing adaptive ambient service in accordance with some embodiments.

FIG. 4 illustrates another flow diagram for providing adaptive ambient service in accordance with some embodiments. At 402, the process for an adaptive ambient service begins. At 404, whether a requested access is associated with the ambient service is determined. As described herein with respect to FIG. 4, there are various techniques for testing the association of the requested access with the ambient service. For example, at 406, whether the requested access is within the ambient service profile, such as within the ambient service allowed access rules, the ambient service monitoring access rules (also sometimes referred to herein as monitored access rules), and/or ambient service disallowed access rules, is determined. At 408, whether the requested access to an application is tested to determine whether the application is associated with the ambient service and whether the application is currently executing. At 410, whether the requested access is within the same traffic flow as other ambient services traffic is determined (e.g., using various device based, device assisted and/or network based (such as DPI) traffic monitoring techniques). Various other techniques can also be employed for testing the association of the requested access with the ambient service. For example, incoming traffic can be tagged (e.g., using a referred URL or an HREF or an IMAGE HTML tag); and/or the domain object management (DOM) tree can be analyzed to determine a links model of a requested web page or other techniques can be utilized to determine the links model of the requested web page. As another example, the content of the requested access (e.g., web page content) can be analyzed to determine if it is associated with the ambient service (e.g., using various content relevancy techniques). As another example, a reverse lookup to the requested network destination (e.g., URL, associated domain, sub-domain, ad server domain, or other destination or source) can be determined to test the association of the requested access with the ambient service. At 412, based on the above testing of the association of the requested access with the ambient service, determine whether the requested access can now be added or blocked based on the monitored access. At 414, if the requested access can now be blocked, then block the requested access and update the ambient service profile accordingly (e.g., add the requested access to the ambient service blocked access rules). Similarly, if the requested access can now be added, then continue to allow the requested access and update the ambient service profile accordingly (e.g., add the requested access to the ambient service allowed access rules). At 416, determine whether to continue to monitor/test the association of the requested access with the ambient service (e.g., if the requested access is still in progress, and the requested access has not been otherwise categorized as allowed or blocked ambient service access, then continue to perform the testing analysis), and if so, continue to perform the monitor/testing analysis of the requested access at 418. At 420, the process is repeated for the next requested access. At 422, the process is completed.

Figure 5:
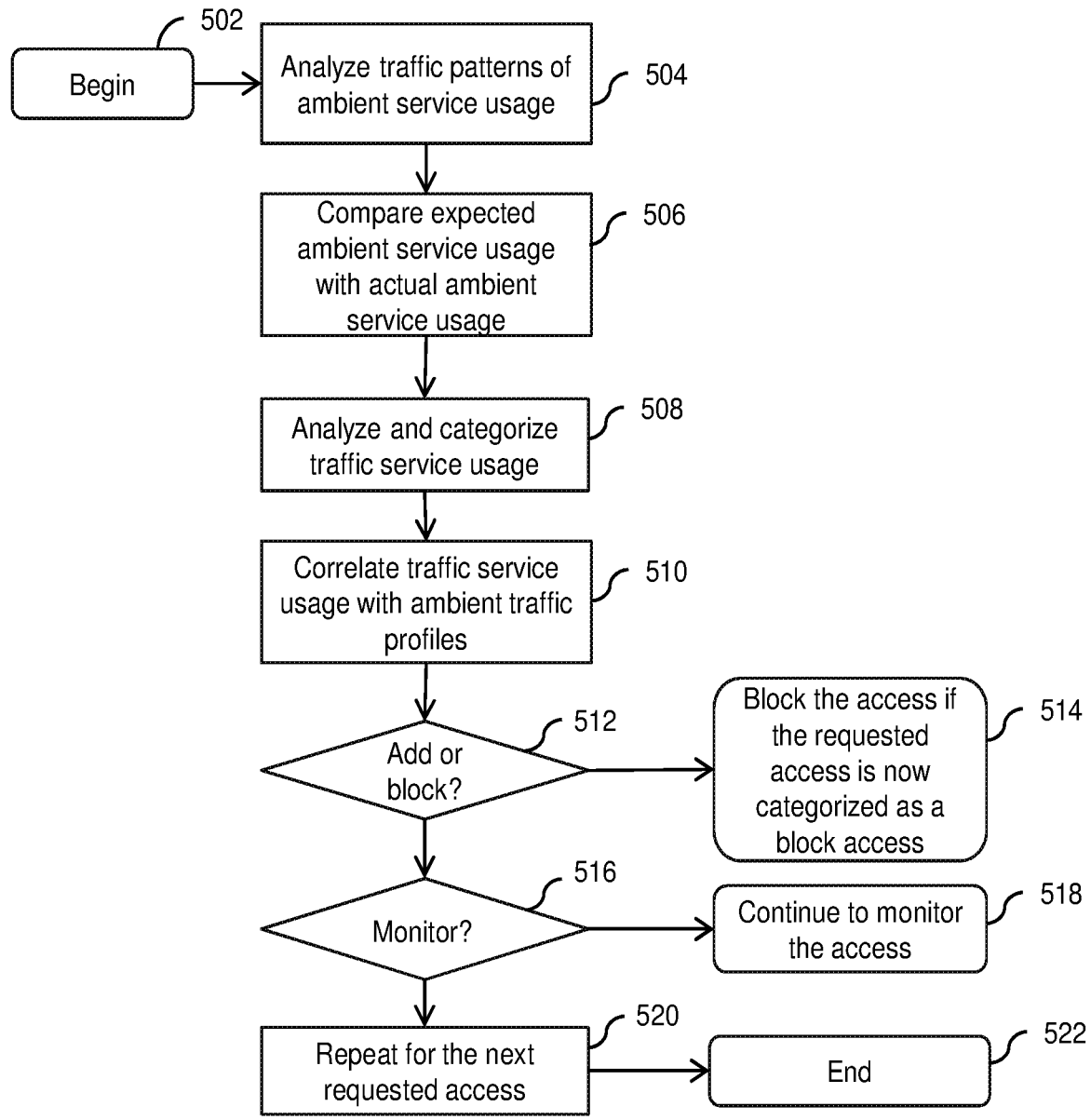
FIG. 5 illustrates another flow diagram for providing adaptive ambient service in accordance with some embodiments.

FIG. 5 illustrates another flow diagram for providing adaptive ambient service in accordance with some embodiments. At 502, the process for an adaptive ambient service begins. At 504, traffic patterns of ambient service usage are analyzed. As described herein with respect to FIG. 5, there are various techniques for testing and analyzing the ambient service usage traffic patterns to determine whether the access should be allowed, blocked, or is otherwise deemed suspicious or otherwise not known/categorized, and thus, should be monitored (e.g., using the monitoring access rules). For example, at 506, expected ambient service usage is compared with the actual ambient service usage (e.g., using various ambient service usage monitoring techniques, as described herein and/or using other techniques). In some embodiments, the expected versus actual ambient service usage is analyzed and can be further categorized as described below. At 508, the ambient service traffic usage is analyzed and categorized. In some embodiments, the ambient service traffic usage is categorized by one or more of the following: total traffic, by application, by destination (e.g., URL, domain, sub-domain, or other unique identifier), by traffic flow, by network socket, by time of day, by ambient service profile categorization (e.g., ambient service allowed access, ambient service monitored access, and/or ambient service blocked/disallowed access rules), by web browsing traffic patterns, by content download patterns, and/or using any other categorizations or patterns. In some embodiments, the ambient service traffic usage is aggregated (e.g., across user or user group), and statistical analysis techniques are used to identify categories of allowable or suspect or should be disallowed access service usage requests/patterns (e.g., very infrequently requested access for high data bandwidth ambient service usage can be deemed suspect or automatically categorized as disallowed). At 510, the ambient service traffic usage is correlated with various ambient traffic profiles. For example, buying patterns can be correlated with content download patterns (e.g., a power use categorization versus a seldom/never purchases user categorization can be used to provide different ambient service profiles and/or throttling techniques based on such categorizations for the various ambient service users).

Various other techniques can also be employed for testing the ambient service usage traffic to provide adaptive ambient services as will now be apparent to one of ordinary skill in the art in view of the embodiments and examples described herein. At 512, based on the above testing of the association of the requested access with the ambient service, determine whether the requested access can now be added or blocked based on the monitored access. At 514, if the requested access can now be blocked, then block the requested access and update the ambient service profile accordingly (e.g., add the requested access to the ambient service blocked access rules). Similarly, if the requested access can now be added, then continue to allow the requested access and update the ambient service profile accordingly (e.g., add the requested access to the ambient service allowed access rules). At 516, determine whether to continue to monitor/test the association of the requested access with the ambient service (e.g., if the requested access is still in progress, and the requested access has not been otherwise categorized as allowed or blocked ambient service access, then continue to perform the testing analysis), and if so, continue to perform the monitor/testing analysis of the requested access at 518. At 520, the process is repeated for the next requested access. At 522, the process is completed.

Figure 6:
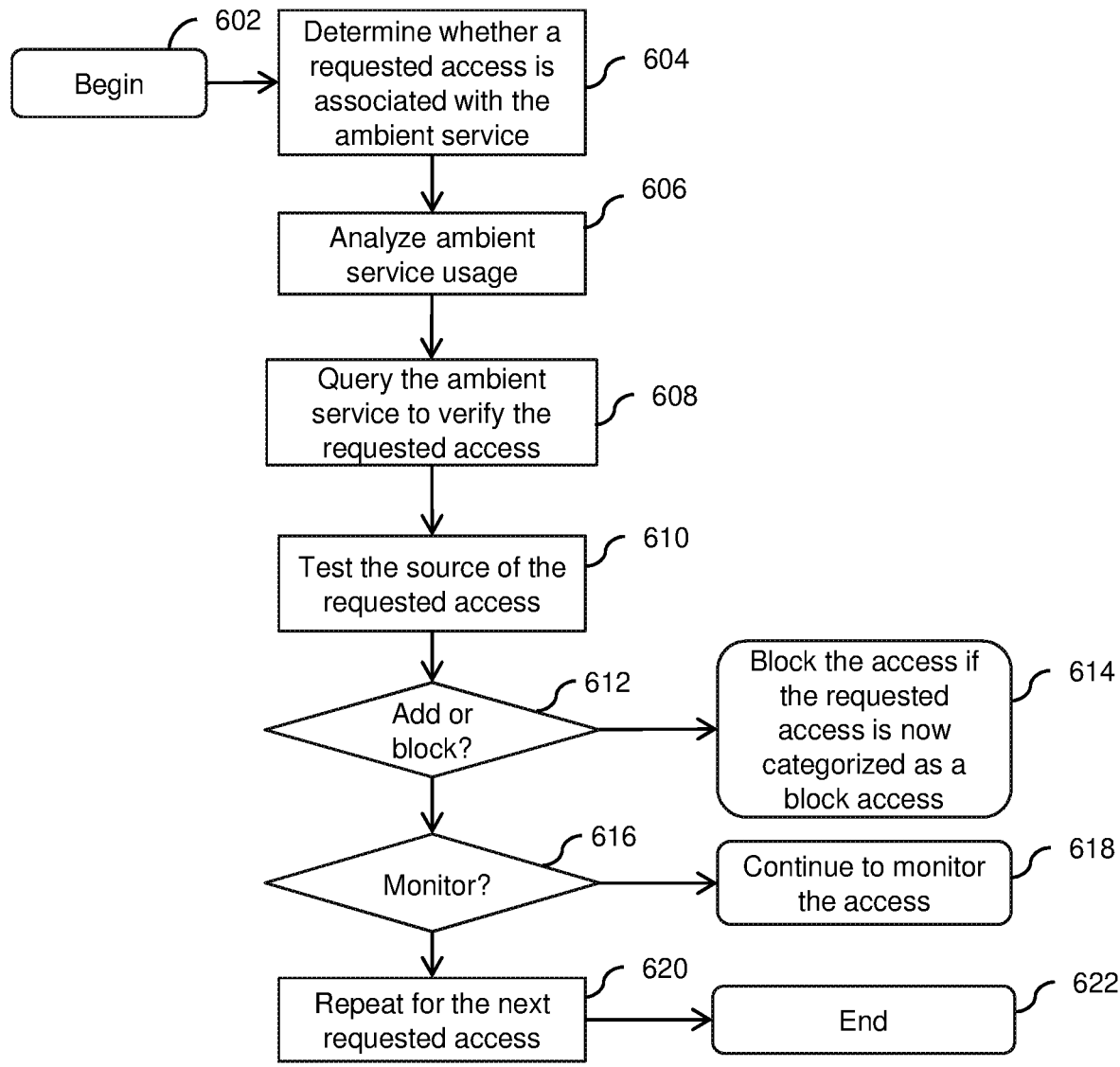
FIG. 6 illustrates another flow diagram for providing adaptive ambient service in accordance with some embodiments.

FIG. 6 illustrates another flow diagram for providing adaptive ambient service in accordance with some embodiments. In some embodiments, a combination of various techniques are used for providing adaptive ambient services, such as those described below with respect to FIG. 6. In some embodiments, a subset of these various techniques are employed using various combinations of such techniques or individual techniques. At 602, the process for an adaptive ambient service begins. At 604, whether a requested access is associated with the ambient service is determined (e.g., as similarly described above with respect to FIG. 4). At 606, the ambient service usage is analyzed (e.g., as similarly described above with respect to FIG. 5). At 608, the ambient service is queried to verify the requested access (e.g., if the requested access is not in the ambient service profile or otherwise suspicious or covered by a monitored access rule, then the ambient service can be queried for more information as to whether this requested access is associated with the ambient service usage or should otherwise be allowed). In some embodiments, various requested accesses can be allowed for certain users or for certain requests to allow for monitoring or testing but denied for other users/requests. In some embodiments, the device or intermediate networking device based ambient service profile settings (e.g., local ambient service profile rules, categorizations, settings, and/or other data) are provided to the ambient service provider for further analysis and to correlate various access requests with the ambient service (e.g., monitored access requests can be confirmed as approved or not, that is associated with the ambient service or otherwise permissible, or not, as deemed by the ambient service provider using various techniques). At 610, the source of the requested access is analyzed. In some embodiments, the source of the requested access is itself tested using various techniques (e.g., search engine/web crawler techniques or DOM techniques to determine whether certain web based requests are associated with the ambient service; or to verify with a secondary source such as an ad server; or to verify ownership of certain network domains by the ambient service provider or associated advertiser).

Various other techniques can also be employed for providing adaptive ambient services as will now be apparent to one of ordinary skill in the art in view of the embodiments and examples described herein. At 612, based on the above testing of the association of the requested access with the ambient service, determine whether the requested access can now be added or blocked based on the monitored access. At 614, if the requested access can now be blocked, then block the requested access and update the ambient service profile accordingly (e.g., add the requested access to the ambient service blocked access rules). Similarly, if the requested access can now be added, then continue to allow the requested access and update the ambient service profile accordingly (e.g., add the requested access to the ambient service allowed access rules). At 616, determine whether to continue to monitor/test the association of the requested access with the ambient service (e.g., if the requested access is still in progress, and the requested access has not been otherwise categorized as allowed or blocked ambient service access, then continue to perform the testing analysis), and if so, continue to perform the monitor/testing analysis of the requested access at 618. At 620, the process is repeated for the next requested access. At 622, the process is completed.

Figure 7:
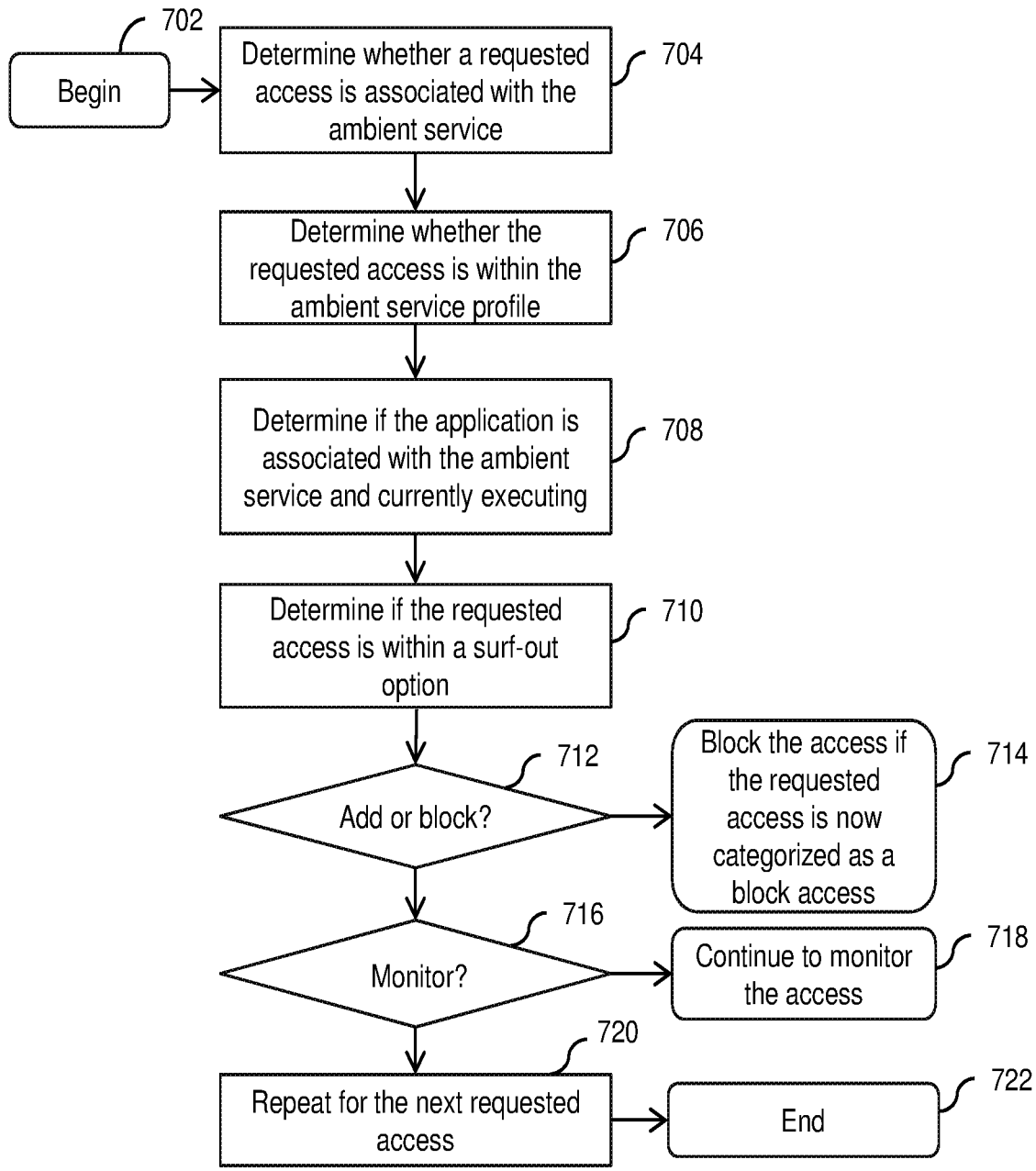
FIG. 7 illustrates a flow diagram for providing adaptive ambient service for a surf-out option in accordance with some embodiments.

FIG. 7 illustrates a flow diagram for providing adaptive ambient service for a surf-out option in accordance with some embodiments. At 702, the process for an adaptive ambient service begins. At 704, whether a requested access is associated with the ambient service is determined. As described herein with respect to FIG. 7, there are various techniques for testing the association of the requested access with the ambient service. For example, at 706, whether the requested access is within the ambient service profile, such as within the ambient service allowed access rules, the ambient service monitored access rules, and/or ambient service disallowed access rules, is determined. At 708, whether the requested access to an application is tested to determine whether the application is associated with the ambient service and whether the application is currently executing. At 710, whether the requested access is within a surf-out option is determined (e.g., using various surf-out option based techniques as described herein). At 712, based on the determination of the association of the requested access with the ambient service (e.g., using various association techniques, as described herein), determine whether the requested access can now be added or blocked based on the monitored access. At 714, if the requested access can now be blocked, then block the requested access and update the ambient service profile accordingly (e.g., add the requested access to the ambient service blocked access rules). Similarly, if the requested access can now be added, then continue to allow the requested access and update the ambient service profile accordingly (e.g., add the requested access to the ambient service allowed access rules). At 716, determine whether to continue to monitor/test the association of the requested access with the ambient service (e.g., if the requested access is still in progress, and the requested access has not been otherwise categorized as allowed or blocked ambient service access, then continue to perform the testing analysis), and if so, continue to perform the monitor/testing analysis of the requested access at 718. At 720, the process is repeated for the next requested access. At 722, the process is completed.

In some embodiments, it may not be possible to accurately identify every network service access attempt or service usage (e.g., or traffic access) as belonging to a given service usage partition (e.g., a given ambient service usage, background network chatter usage, user service plan usage, emergency service usage, and/or other type of service usage). As used herein, the terms service usage partition, service usage recording partition, service charging bucket, and micro-CDRs are used interchangeably. Accordingly, it is desirable to provide a service charging bucket for traffic that is allowed and not definitively identified as belonging to a known service charging bucket. This allows for techniques to employ an "allow but verify" approach to traffic that is likely to be legitimately associated with an ambient service or a user service or a network service that is intended to be allowed, but is not definitively identified as being associated with an allowed service.

As an example, there may be a web site access associated with an ambient service that does not have a reference identifier or other traffic parameter that allows the service processor to associate it with the correct ambient service. In this case, a set of rules can be applied to determine if it is likely that the web site access is a legitimate access given the access control policies that are in place, and if it is the access can be allowed and the traffic usage either recorded in the ambient service charging bucket that it is suspected to be associated with, or the traffic usage can be charged to a network chatter service usage bucket, or the traffic usage can be charged to the user service usage bucket, or the traffic usage may be recorded in a "not classified but allowed" service charging bucket. In some embodiments, in which such traffic is charged to the "not classified but allowed" service usage charging bucket, additional verification measures are employed to ensure that the amount of traffic that is not classified but allowed does not grow too large or become a back-door for service usage errors. For example, the access control policy rules for allowing unclassified traffic can be relatively loose as long as the amount of service usage charges accumulating in the not classified charging bucket remains within certain bounds, and/or the rate of service usage charged to the not classified bucket remains within certain bounds, but if the not classified traffic becomes large or the rate of not classified traffic growth becomes large then the rules governing when to allow not classified traffic can be tightened.

As another example, a browser application can access a web site that is known to be an ambient service website, and that web site might serve back a series of traffic flows, some of which are associated with the ambient service website through URL identifiers that are known to be part of the website, and other traffic can be associated with the ambient service website by virtue of a referring website tag or header, and some traffic can be returned to the same application with a relatively close time proximity to the other traffic as being identified as ambient traffic. In this example, as long as the not classified traffic service charging bucket does not exceed a given pre-set policy limit on its size, and/or does not grow faster than a given pre-set policy rate, and/or is received within a certain pre-set policy period of time difference from the time that other ambient service charging bucket traffic is received, then the not classified traffic is continued to be allowed. However, if the not classified traffic amount or rate of growth exceeds the pre-set policy limits, or if the period of time between when verified ambient service traffic is received and the not classified traffic is received exceeds policy limits, then the not classified traffic can be blocked or other action can be taken to further analyze the not classified traffic.

In some embodiments, it is important to provide a hierarchy of service usage charging rules for the various service usage partitions on a device. As an example, for a given service plan there can be two ambient service charging buckets, a network chatter (e.g., or network overhead) service charging bucket, and a user service plan service charging bucket and it is desirable to make sure that no ambient services or network overhead service or unclassified service is charged to the user service plan, and it is also desirable to ensure that all known ambient service traffic is charged to the appropriate ambient service partner, and it is desirable to ensure that no network overhead service or unclassified service is charged to ambient service partners. In such situations, a service charging bucket hierarchy can be provided as follows: determine if a traffic flow (e.g., or socket) is associated with network overhead, and if so allow it and charge that service bucket, then determine if a traffic flow (or socket) is associated with ambient service #1, and if so allow it and charge that service bucket, then determine if a traffic flow (or socket) is associated with ambient service #2, and if so allow it and charge that service bucket, then determine if a traffic flow (or socket) is associated with not classified traffic, and if so allow it and charge that service bucket, then if the traffic is not associated with any of the above service charging buckets allow it and charge it to the user service plan charging bucket. In another example, if the user has not yet chosen to pay for a user service plan, then the same hierarchical access control and service charging policy can be used except the final step would be: then if the traffic is not associated with any of the above service charging buckets block the traffic. Hierarchical service charging bucket identification such as depicted in these examples can be a crucial aspect of a robust access control policy and/or service charging policy system. Many other access control policy hierarchies and service charging bucket policy hierarchies will now be apparent to one of ordinary skill in the art.

In some embodiments, the not classified traffic is charged according to service charging rules that rely on the most likely candidate service charging bucket for the traffic. As another example, if the not classified traffic is being delivered to the same application as other known ambient service traffic and the time difference between delivery of the known ambient service traffic and the not classified traffic is small, then the not classified traffic can be charged to the ambient service in accordance with a pre-set charging policy rule specifying these conditions. Other embodiments that will now be apparent to one of ordinary skill in the art. For example, another charging rule for not classified traffic could be to perform a pro-rata allocation of the not classified traffic to all of the other service charging buckets with the pro-rata allocation being based on the percentage of the total traffic used by the device for each service charging bucket. As another example, the not classified traffic can be charged to a subset of the service charging buckets for the device (e.g., all ambient services plus the network overhead service) in accordance with the pro-rata share for each service included in the pro-rata split.

In some embodiments, the user service plan agreement is structured so that the user acknowledges that ambient services in which the access connection to the service is sponsored, paid for, and/or partially subsidized by an entity other than the user are a benefit to the user, and/or the user acknowledges that there is no inherent right to free ambient services, and that the service usage accounting system may not always properly characterize usage for a sponsored or subsidized ambient service (e.g., or some other specialized service) in the correct accounting service charging bucket, and, thus, the user service plan account can be charged and/or billed with some of this traffic. By having the user acknowledge a service use agreement of this form then some ambient traffic can be charged to the user service plan account, including, for example, allowed but not classified traffic, excess ambient service usage beyond pre-set policy limits, ambient service usage during busy network periods or on congested network resources, and/or other criteria/measures. In some embodiments, the user might be notified that they are being charged for service activities that are sometimes subsidized or free to the user. As discussed above, it is important to ensure that a not classified service charging bucket does not become a back door for service charging errors or hacking. It will now be apparent to one of ordinary skill in the art that the not classified service usage charges can be verified in a variety of manners, including, for example, observing the size of the not classified service charging bucket as compared to other service usage charges on the device (e.g., total device service usage, ambient service usage, user bucket service usage, and/or other criteria/measures), capping the not classified bucket, and/or capping the rate of growth of the not classified bucket.

In some embodiments, it is important to verify not only that the total device service usage amount is correct, but that the service usage is being reported in the proper service charging buckets. For example, if the service processor software can be hacked so that it correctly reports the total service usage, but reports user service plan traffic under one or more ambient service buckets, then simply verifying that the total amount of service usage is correct will not be sufficient to prevent the device from obtaining free user service that can be charged to ambient service partners. There are a variety of direct and indirect embodiments to accomplish this verification of service charging bucket divisions. For example, in direct verification embodiments, one or more alternative measures of service usage are employed to cross-check the accuracy of the service charging bucket divisions. In indirect embodiments one of two classes of verification are employed: the size and rate of growth for service charging buckets is analyzed and compared to a pre-set group of policies to detect and/or modify service charging bucket growth that is out of policy; and/or the proper operation of the service processor elements involved in service charging bucket partitioning is verified.

Various embodiments involving direct verification of service charging bucket usage and/or accounting include the use of network based service usage measures such as CDRs, IPDRs, flow data records (e.g., FDRs—detailed reports of service usage for each service flow, such as network socket connection, opened and used to transmit data to or from the device), accounting records, interim accounting records or other similar usage records to verify that the device is within service policy and/or the device based service usage reports are accurate. Use of such network generated service usage records to directly verify service charging and/or proper service usage policy adherence are described herein. When network address destination and/or source information is available in these records, as described herein, this can be used in some embodiments to verify the service charging bucket accounting provided by the device service processor. In some embodiments, some types of service usage records include real-time data but not necessarily all of the useful information needed to help verify service charging bucket accounting, while other types of service usage records provide more detail (e.g., IP address for destination and source) but do not always arrive in real-time. For example, in some embodiments, FDRs are created each time a new service flow (e.g., network socket connection) is opened and then closed. At the time the service flow is closed, a (e.g., possibly time stamped) data usage record indicating source address, destination address and amount of data transmitted is created and sent to a charging aggregation function in the network. The charging aggregation function can then forward the FDRs to the service controller for verification or direct accounting of service charging bucket accounting. By comparing the FDR addresses with known ambient service traffic address associations, the partitioning of service charging buckets between one or more ambient services and other services such as a user service plan service charging bucket may be verified. However, in some cases it can be a long period of time for an FDR to be generated when a device service flow (e.g., socket) remains open for a long period of time, as in the case for example with a long file download, a peer to peer connection with a socket keep alive, or a proxy server service with a socket keep alive. In such cases, it can be disadvantageous to have large amounts of data to be transferred without an FDR to confirm device service processor based reports, and in some cases this can provide an opportunity for service processor service reporting hacks. This can be remedied in a variety of ways by using other network reported service usage information to augment the FDR information. For example, start and stop accounting records can sometimes be obtained in some embodiments from a network element such as a service gateway or the AAA servers (e.g., or other network equipment elements depending on the network architecture). Although start and stop records do not possess the detail of service usage information that FDRs, CDRs, IPDRs, interim accounting records or other service usage records posses, they do inform the service controller that a device is either connected to the network or has stopped connecting. If a device is connected to the network and is not transmitting device usage reports or heartbeats, then the service controller is alerted that an error or hacking condition is likely. As another example of how two or more types of network reported service usage information may be used to create a better real time or near real-time check on device service usage, if both FDRs and start/stop accounting records are available, the service controller can send a stop-then-resume service command to the device (e.g., or alternatively send a stop then resume service command to a network equipment element), which will cause the device to terminate all open service flows before re-initiating them, and once the service flows are stopped then the FDR flow records will be completed and transmitted for any service flows that were in process but unreported when the stop service command was issued. This will cause any long term open socket file transfers to be reported in the FDR flow records thus plugging the potential back door hole in the FDR service usage accounting verification method.

As another example showing how multiple types of network generated service usage accounting records may be used to complement each other and strengthen the verification of service charging bucket accounting partitions, interim data records can be used with FDRs. Interim data records are available in accordance with some embodiments, in which the interim data records are generated on a regularly scheduled basis by a network element (e.g., gateway, base station, HLR, AAA, and/or other network element/function). Interim data records are typically near real time records that report the aggregate traffic usage for the device as of a point in time, but often do not include traffic address information or other traffic details. In embodiments in which both interim accounting records and FDRs are available, when the interim accounting records are indicating service usage that is not being reported in the FDR stream this is evidence that a device has one or more long term socket connections that are open and are not terminating. In this case, the service controller can verify that the device based usage reports are properly accounting for the total amount of service usage reported by the interim accounting records, and/or the service controller can force an FDR report for the open sockets by issuing a stop-resume service command as similarly discussed above.

As described herein, other embodiments involving direct verification of service charging bucket accounting can be provided. One example is to route ambient service traffic to a proxy server or router programmed to support only the network access allowed for the ambient service and to account for the ambient service usage. Additional proxy servers or routers can be similarly programmed for each ambient service that is part of the device service plan, and in some embodiments, another proxy server or router is programmed to support traffic control and account for the user service plan service access. By comparing the service usage accounting for each of these proxy servers or routers, the device generated service charging bucket accounting can be directly verified. In some embodiments, the usage accounting provided by the proxy servers or routers is used directly for service usage accounting.

In some embodiments, ambient service partner feedback is used to verify service charging bucket accounting. For example, web servers used by ambient service partners to provide ambient services can identify a user device based on header information embedded in the HTML, traffic, and then account for either the service used by the device during the ambient service sessions or account for the number of transactions the user completes. If service usage is recorded, then it can be reported to the service controller and be used directly to verify ambient service charging bucket accounting. If transactions are all that are recorded, then this can be reported to the service controller and the amount of ambient service used by the device can be compared with the number of transactions completed to determine if the ambient service usage is reasonable or should be throttled or blocked. It will now be apparent to one of ordinary skill in the art that other embodiments can be provided that employ more than one type of network generated service usage records to verify service usage accounting and/or verify service charging bucket accounting.

Other embodiments involving indirect methods for verifying or controlling service charging bucket accounting include monitoring the size and/or growth rate of ambient service usage. In some embodiments, the access control policy rules call for restricting a given ambient service access when the amount of service usage charges accumulating in the ambient service charging bucket exceed a pre-set policy limit, and/or when the rate of service usage for the ambient service exceeds a pre-set policy limit. For example, once these limits are reached, the ambient service can be throttled back for a period of time, blocked for a period of time, or charged to the user service plan charging bucket. In some embodiments, before these actions are taken the user UI can be used to notify the user of the service policy enforcement action. In some embodiments, indirect verification of service charging bucket accounting includes the various techniques described herein for verifying proper operation of the service processor agent software and/or protecting the service processor agent software from errors, manipulation, or hacking.

In some embodiments, the device service processor directs traffic destined for a given ambient service to a proxy server or router programmed to support that ambient service, and any traffic control policies and/or access control policies for the ambient service are implemented in the proxy server or router. For example, in such embodiments the proxy server or router can be programmed to only allow access to one or more ambient services that are authorized by the device service plan, with the proxy server or router controlling device access so that other network destinations cannot be reached. Continuing this example embodiment, the proxy server or router can account for the ambient service usage in an ambient service charging bucket as discussed elsewhere. In such proxy server or router ambient service control embodiments, the same traffic association techniques described elsewhere that allow incoming traffic associated with an ambient service website or other service to be identified, allowed or blocked, potentially throttled, and accounted for in a service charging bucket can be implemented in the proxy server or router programming. Such proxy server or router embodiments can also implement user service plan service charging buckets, user service plan traffic controls, and user service plan access control as discussed herein. In some embodiments, the proxy server or router analyzes the HTML traffic content of the traffic flows as described herein to perform such associations, traffic control and/or service usage accounting. Similarly, in some embodiments, a proxy server or router can provide the "surf-out" capabilities described herein by performing the same surf-out traffic associations (e.g., HTML branch reference associations and/or other branch associations) described herein. It will now be apparent to one of ordinary skill in the art that many of the adaptive ambient service control and service usage charging functions described herein for a service processor can be readily implemented with a proxy server or router that is appropriately programmed.

In some embodiments, routing of device traffic for one or more ambient services and/or user service plan services to a proxy server or router is accomplished by the device service processor using the device service processor traffic control embodiments described herein. In some embodiments, routing of device traffic for one or more ambient services and/or user service plan services to a proxy server or router is accomplished by dedicated network equipment such as the gateways (e.g. SGSN, GGSN, PDSN, or PDN), home agents, HLRs or base stations, with the network equipment being provisioned by a service controller (e.g., or other interchangeable network element with similar functions for this purpose) to direct the device traffic to the proxy server or router. In some embodiments, the ambient service traffic or the user service plan traffic is controlled by the proxy server according to a service plan policy set supplied by the service controller (e.g., or equivalent network function for this purpose). The traffic control service policy thus implemented by the proxy server can control traffic based on one or more of the following: period of time, network address, service type, content type, application type, QoS class, time of day, network busy state, bandwidth, and data usage.

In some embodiments, a proxy server or router is used to verify accounting for a given service, for example, an ambient service. In some embodiments, this is accomplished by the device service processor directing the desired service flows to a proxy server or router programmed to handle the desired service flows, with the proxy server or router being programmed to only allow access to valid network destinations allowed by the access control policies for the desired service, and the proxy server or router also being programmed to account for the traffic usage for the desired services. In some embodiments, the proxy service usage accounting may then be used to verify device based service usage accounting reported by the service processor. In some embodiments, the accounting thus reported by the proxy server or router can be used directly to account for service usage, such as ambient service usage or user service plan service usage.

In some embodiments, in which a proxy server is used for device service usage accounting, the proxy server maintains a link to the device service notification UI via a secure communication link, such as the heartbeat device link described herein. For example, the proxy server or router can keep track of device service usage versus service plan usage caps/limits and notify the user device UI through the device communication link (e.g., heartbeat link) between the service controller and the device. In some embodiments, the proxy server/router communicates with a device UI in a variety of ways, such as follows: UI connection through a device link (e.g., heartbeat link), through a device link connected to a service controller (e.g., or other network element with similar function for this purpose), presenting a proxy web page to the device, providing a pop-up page to the device, and/or installing a special portal mini-browser on the device that communicates with the proxy server/router. In some embodiments, the UI connection to the proxy server/router is used as a user notification channel to communicate usage notification information, service plan choices, or any of the multiple services UI embodiments described herein.

In some embodiments for the proxy server/router techniques for implementing service traffic/access controls and/or service charting bucket accounting, it is desirable to have the same information that is available to the service processor on the device, including, for example, application associated with the traffic, network busy state, QoS level, or other information about the service activity that is available at the device. For example, such information can be used to help determine traffic control rules and/or special services credit is due (e.g., ambient services credit). In some embodiments, information available on the device can be communicated to the proxy server/router and associated with traffic flows or service usage activities in a variety of ways. For example, side information can be transmitted to the proxy server/router that associates a traffic flow or service activity flow with information available on the device but not readily available in the traffic flow or service activity flow itself. In some embodiments, such side information may be communicated over a dedicated control channel (e.g., the device control link or heartbeat link), or in a standard network connection that in some embodiments can be secure (e.g., TLS/SSL, or a secure tunnel). In some embodiments, the side information available on the device can be communicated to the proxy server/router via embedded information in data (e.g., header and/or stuffing special fields in the communications packets). In some embodiments, the side information available on the device can be communicated to the proxy server/router by associating a given secure link or tunnel with the side information. In some embodiments, the side information is collected in a device agent or device API agent that monitors traffic flows, collects the side information for those traffic flows, and transmits the information associated with a given flow to a proxy server/router. It will now be apparent to one of ordinary skill in the art that other techniques can be used to communicate side information available on the device to a proxy server/router.

For example, just as the hierarchy of charging rules can be important for implementations in which the service processor is creating the service charging bucket accounting, it can also important in implementations that use a proxy server or router for service charging bucket accounting. Accordingly, various embodiments described herein for creating a hierarchy of service usage charging rules can be applied to proxy server or proxy router embodiments. It will be apparent to one of ordinary skill in the art that the service charging bucket embodiments and traffic control and access control embodiments described herein for allowed but not classified buckets apply equally to the proxy server/router embodiments. For example, pre-defined service policy rules can be programmed into the proxy server/router to control the traffic flows and/or place usage limits or access limits on an ambient service, or a user service plan service. It will also now be apparent to one of ordinary skill in the art that the embodiments described herein disclosing an initial allowed service access list, temporarily allowing additional service activities until they are determined to be allowed or not allowed, expanding the allowed service activity list, maintaining a not allowed service activity list and expanding the not allowed service activity list also apply equally to proxy server/router embodiments. Similarly, it will now be apparent to one of ordinary skill in the art that the proxy/server router embodiments can be employed to directly generate the service charging bucket (or micro-CDR) usage reports used to provide further detail and/or billing capabilities for service usage. In some embodiments, in which the device service processor directs traffic to a proxy server/router, there are advantageous design feature embodiments available that can reduce the need to provision network to detect and force specialized device service traffic to the appropriate proxy server/router. For example, this can be done by creating a "usage credit" system for the services supported by the proxy server/outer. Total service usage is counted on the one hand by the device service processor, or by other network equipment, or by both. Credit on the other hand for ambient service or other specialized access service usage that is not charged to the user is then provided for services that the device directs through the proxy server/router destination (e.g., URL or route hop) supporting the particular ambient service or other specialized access service. If the device correctly directs traffic to the proxy server/router, then the counting and/or access rules are correctly implemented by the proxy server/router. The service can be thus controlled and/or accounted for. When the service is accounted for, the proxy server/router reports the service charging bucket accounting back to the service controller (e.g., or other network equipment responsible for service charging bucket/micro CDR mediation) and the user service plan service charging bucket account can be credited for the services. Traffic that reaches the proxy server/router is controlled by the access rules and/or traffic control rules and/or QoS control rules of the proxy server/router programming, so there is no question regarding the type of service that is supported with the service charging buckets that are reported to mediation functions (e.g., mediation functions can be performed by one or more of service controller, usage mediation, billing, AAA, and/or HLR/home agent). As the proxy server/router is in the network and can be physically secured and protected from hacking, there is high confidence that the service control and/or charging rules intended for ambient services or some other specialized service are properly implemented and that the proxy server/router connection is being used for the intended service and not some other unintended hacked service. If the device is somehow hacked or otherwise in error so that the traffic is not directed through the appropriate proxy server/router, then the proxy server/router does not log the traffic in micro CDRs/buckets and no specialized service usage credit is sent to the mediation functions, so there is no usage credit deducted from the device user service plan service usage totals. Thus, the user pays for the services when the device is hacked to avoid the proxy server/router. The user account service agreement can specify that if the user tampers with software and traffic is not routed to servers then credit will not be provided and user plan will be charged.

In some proxy server/router embodiments, the usage credit is sometimes recorded by the proxy server/router detecting which device is performing the access. Device identification can be accomplished in a variety of ways including a header/tag inserted into the traffic by the device, a route in the network specified for that device, a secure link (e.g., TLS/SSL, IP Sec, or other secure tunnel), a unique device IP address or other credential (e.g., where proxy server/router has access to an active IP address look up function), a unique proxy server/router address and/or socket for the device.

In some embodiments, the coordination of the device service controller traffic control elements with a proxy server/outer can make it simpler to locate, install, provision and operate the proxy servers. The proxy server/routers do not need to be located "in line" with the access network because it is the device's responsibility to make sure the traffic is routed to the servers/routers or else there is not credit and the user account is charged. In some embodiments, this makes it unnecessary or reduces the need to force device traffic routes in carrier network. In some embodiments, the proxy server/routers can be located in carrier network or on the Internet. If the proxy server/routers are on Internet, then traffic can be authenticated in a firewall before being passed to server/routers to enhance security to attack.

In some embodiments, the service charging bucket recording software in the proxy server/router can be programmed into an ambient service partners network equipment directly thus eliminating the need for special apparatus. The ambient service partners equipment (e.g., a web server, load balancer or router) can recognize the device using one of the techniques described above, aggregate the device service charging bucket accounting, and periodically send the usage accounting to the service controller or other network service usage mediation function.

Programming and/or provisioning the types of ambient services, user service plan services and/or specialized services disclosed in various embodiments described herein can be a complex process. In some embodiments, a simplified user programming interface, also referred to herein as a service design interface, is used to program the necessary policy settings for such services is desirable. For example, a service design interface is provided that organizes and/or categorizes the various policy settings that are required to set up an ambient service (e.g., or other service) including one or more of the following: a policy list of service activities that are allowed under the ambient service (e.g., or other service), access control policies, rules for implementing and/or adapting an allowed list of network destinations, rules for implementing and/or adapting a blocked list of network destinations, service charging bucket policies, user notification policies, service control, and/or service charging bucket verification policies, actions to be taken upon verification errors. In some embodiments, the required information for one or more of these policy sets is formatted into a UI that organizes and simplifies the programming of the policies. In some embodiments, the UI is partly graphical to help the user understand the information and what settings need to be defined in order to define the service. In some embodiments, the UI is created with an XML, interface. In some embodiments, the UI is offered via a secure web connection. In some embodiments, a basic service policy for an ambient service (e.g., or another service) is created that includes one or more of the above service policy settings, and then this service policy set becomes a list or an object that can be replicated and used in multiple service plan policy set definitions (e.g., "dragged and dropped" in a graphical UI). In some embodiments, the resulting set of policies created in this service design interface are then distributed to the necessary policy control elements in the network and/or on the device that act in coordination to implement the service policy set for a given device group. For example, if a service processor is used in conjunction with a service controller, then the service design interface can load the service policy settings subsets that need to be programmed on the service controller and the device service processor into the service controller, and the service controller loads the service controller policy settings subset into the service controller components that control the policies and loads the device policy settings subset to the devices that belong to that device group. In embodiments in which a proxy server/router is used to help control and account for services, in some embodiments, the service design interface loads the service policy settings subsets that need to be programmed on the proxy server/router into the proxy server/router. In embodiments where other network equipment (e.g., gateways, base stations, service usage recording/aggregation/feed equipment, AAA, home agent/HLR, mediation system, and/or billing system) need to be provisioned or programmed, in some embodiments, the service design interface also loads the appropriate device group policy subsets to each of the equipment elements. Accordingly, various techniques can be used as described herein to greatly simplify the complex task of translating a service policy set or service plan into all the myriad equipment and/or device settings, programming, and/or provisioning commands required to correctly implement the service. It will now be apparent to one of ordinary skill in the art that various of these techniques can similarly be used for the VSP service design interface.

Those of ordinary skill in the art will appreciate that various other rules can be provided for the rules engine as described herein. Those of ordinary skill in the art will also appreciate that the functions described herein can be implemented using various other network architectures and network implementations (e.g., using various other networking protocols and corresponding network equipment and techniques).

Although the foregoing embodiments have been described in some detail for purposes of clarity of understanding, the invention is not limited to the details provided. There are many alternative ways of implementing the invention. The disclosed embodiments are illustrative and not restrictive.

INCORPORATION BY REFERENCE

This application incorporates by reference the following US patent applications for all purposes: application Ser. No. 12/695,020, entitled ADAPTIVE AMBIENT SERVICES, filed Jan. 27, 2010; application Ser. No. 12/380,780, entitled AUTOMATED DEVICE PROVISIONING AND ACTIVATION, filed Mar. 2, 2009; provisional Application No. 61/206,354, entitled SERVICES POLICY COMMUNICATION SYSTEM AND METHOD, filed Jan. 28, 2009; provisional Application No. 61/206,944, entitled SERVICES POLICY COMMUNICATION SYSTEM AND METHOD, filed Feb. 4, 2009; provisional Application No. 61/207,393, entitled SERVICES POLICY COMMUNICATION SYSTEM AND METHOD, filed Feb. 10, 2009; provisional Application No. 61/207,739, entitled SERVICES POLICY COMMUNICATION SYSTEM AND METHOD, filed Feb. 13, 2009; provisional Application No. 61/275,208, entitled ADAPTIVE AMBIENT SERVICES, filed Aug. 25, 2009; and provisional Application No. 61/237,753, entitled ADAPTIVE AMBIENT SERVICES, filed Aug. 28, 2009.

What is claimed is:

1. A proxy server for providing a wireless ambient service to a mobile end-user device operating on a Wireless Wide Area Network (WWAN), the proxy server comprising:
a processor configured to:
receive wireless ambient service Internet access requests from the mobile end-user device operating on the WWAN;
apply an ambient service policy to the wireless ambient service Internet access requests to (i) allow a first one of the Internet access requests based on a primary policy of the ambient service policy, and (ii) allow a second one of the Internet access requests, not allowable by the primary policy, based on a secondary policy of the ambient service policy and an association with the first one of the Internet access requests;
responsive to the second one of the Internet access requests, obtain at least some Internet data from an Internet destination other than the proxy server; and
serve the at least some Internet data responsive to the second one of the Internet access requests to the mobile end-user device.

2. The proxy server of claim 1, wherein the mobile end-user device operates on the WWAN of a wireless service provider network, and the proxy server operates outside of the wireless service provider network.

3. The proxy server of claim 1, wherein the processor is further configured to:
when a third one of the Internet access requests is not allowable by the ambient service policy, serve a notification result to the mobile end-user device.

4. The proxy server of claim 3, wherein the notification result comprises a service activation page.

5. The proxy server of claim 1, wherein the processor is further configured to:
limit use of the wireless ambient service by the mobile end-user device to access content allowed by the secondary policy.

6. The proxy server of claim 5, wherein limiting the use of the wireless ambient service comprises limiting a total time allowed for the mobile end-user device to access the content allowed by the secondary policy.

7. The proxy server of claim 5, wherein limiting the use of the wireless ambient service comprises limiting an amount of wireless data that the mobile end-user device can use to access the content allowed by the secondary policy.

8. The proxy server of claim 5, wherein limiting the use of the wireless ambient service comprises limiting a number of new user actions, new web pages, new uniform resource locators, new domains, new sub-domains, or new addresses that the mobile end-user device can utilize to access the content allowed by the secondary policy.

9. The proxy server of claim 5, wherein limiting the use of the wireless ambient service comprises resetting a policy limit when the mobile end-user device initiates a third one of the Internet access requests allowed by the primary policy.

10. The proxy server of claim 1, wherein the association with the first one of the Internet access requests comprises an association between the second one of the Internet access requests and a device application.

11. A method for use by a proxy server for providing a wireless ambient service to a mobile end-user device operating on a Wireless Wide Area Network (WWAN), the method comprising:
receiving wireless ambient service Internet access requests from the mobile end-user device operating on the WWAN;
applying an ambient service policy to the wireless ambient service Internet access requests to (i) allow a first one of the Internet access requests based on a primary policy of the ambient service policy, and (ii) allow a second one of the Internet access requests, not allowable by the primary policy, based on a secondary policy of the ambient service policy and an association with the first one of the Internet access requests;
responsive to the second one of the Internet access requests, obtaining at least some Internet data from an Internet destination other than the proxy server; and
serving the at least some Internet data responsive to the second one of the Internet access requests to the mobile end-user device.

12. The method of claim 11, wherein the mobile end-user device operates on the WWAN of a wireless service provider network, and the proxy server operates outside of the wireless service provider network.

13. The method of claim 11, further comprising: when a third one of the Internet access requests is not allowable by the ambient service policy, serving a notification result to the mobile end-user device.

14. The method of claim 13, wherein the notification result comprises a service activation page.

15. The method of claim 11, further comprising: limiting use of the wireless ambient service by the mobile end-user device to access content allowed by the secondary policy.

16. The method of claim 15, wherein limiting the use of the wireless ambient service comprises limiting a total time allowed for the mobile end-user device to access the content allowed by the secondary policy.

17. The method of claim 15, wherein limiting the use of the wireless ambient service comprises limiting an amount of wireless data that the mobile end-user device can use to access the content allowed by the secondary policy.

18. The method of claim 15, wherein limiting the use of the wireless ambient service comprises limiting a number of new user actions, new web pages, new uniform resource locators, new domains, new sub-domains, or new addresses that the mobile end-user device can utilize to access the content allowed by the secondary policy.

19. The method of claim 15, wherein limiting the use of the wireless ambient service comprises resetting a policy limit when the mobile end-user device initiates a third one of the Internet access requests allowed by the primary policy.

20. The method of claim 11, wherein the association with the first one of the Internet access requests comprises an association between the second one of the Internet access requests and a device application associated with the ambient service.

\* \* \* \* \*

UNITED STATES PATENT AND TRADEMARK OFFICE
CERTIFICATE OF CORRECTION

PATENT NO. : 11,750,477 B2  
APPLICATION NO. : 17/106648  
DATED : September 5, 2023  
INVENTOR(S) : Raleigh et al.

Page 1 of 1

It is certified that error appears in the above-identified patent and that said Letters Patent is hereby corrected as shown below:

In the Claims

Column 36, Line 11, "requests with a device application" should be --requests with a device application associated with the ambient service--.

Signed and Sealed this  
Twenty-fourth Day of October, 2023

Katherine Kelly Vidal  
*Director of the United States Patent and Trademark Office*